(12) United States Patent
Oshima et al.

(10) Patent No.: US 9,438,340 B2
(45) Date of Patent: *Sep. 6, 2016

(54) COMMUNICATION METHOD

(71) Applicant: PANASONIC INTELLECTUAL PROPERTY CORPORATION OF AMERICA, Torrance, CA (US)

(72) Inventors: Mitsuaki Oshima, Kyoto (JP); Koji Nakanishi, Kanagawa (JP); Hideki Aoyama, Osaka (JP); Chikara Yoshida, Kanagawa (JP); Shigehiro Iida, Tokyo (JP); Shinsuke Ogata, Osaka (JP); Kengo Miyoshi, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/936,765

(22) Filed: Nov. 10, 2015

(65) Prior Publication Data

US 2016/0065307 A1    Mar. 3, 2016

Related U.S. Application Data

(63) Continuation of application No. 14/296,814, filed on Jun. 5, 2014, now Pat. No. 9,225,420.

(60) Provisional application No. 61/907,497, filed on Nov. 22, 2013.

(51) Int. Cl.
*H04B 10/116* (2013.01)
*H04B 10/60* (2013.01)
(Continued)

(52) U.S. Cl.
CPC ............ *H04B 10/116* (2013.01); *H04B 10/60* (2013.01); *H04N 5/2353* (2013.01); *H04N 5/23245* (2013.01)

(58) Field of Classification Search
CPC .. H04B 10/116; H04B 10/60; H04N 5/2353; H04N 5/23245
USPC .......................................................... 398/172
See application file for complete search history.

(56) References Cited

U.S. PATENT DOCUMENTS 7,308,194 B2    12/2007  Iizuka et al.
2002/0167701 A1  11/2002  Hirata
(Continued)

FOREIGN PATENT DOCUMENTS

EP        2747308       6/2014
JP      2002-290335    10/2002
(Continued)

OTHER PUBLICATIONS

International Search Report and Written Opinion of the International Searching Authority in PCT/JP2014/002801, mailed Aug. 12, 2014.

*Primary Examiner* — Leslie Pascal
(74) *Attorney, Agent, or Firm* — Greenblum & Bernstein, P.L.C.

(57) ABSTRACT

A communication method for obtaining information from a subject includes obtaining image information of the subject in an image information-taking mode, obtaining visible light data of the subject in a visible light communication mode, and setting a shutter speed and an international organization for standardization (ISO) speed rating or a gain value for the visible light communication mode. The visible light communication mode is a different mode from the image information-taking mode. Also, in the setting, the shutter speed for the visible light communication mode is set to be faster than a shutter speed for the image information-taking mode, and the ISO speed rating or the gain value for the visible light communication mode is set to be greater than an ISO speed rating or a gain value for the image information-taking mode.

6 Claims, 79 Drawing Sheets

(51) Int. Cl.
*H04N 5/232* (2006.01)
*H04N 5/235* (2006.01)

(56) References Cited

U.S. PATENT DOCUMENTS

| | | | | |
|---|---|---|---|---|
| 2005/0265731 | A1* | 12/2005 | Keum | H04B 10/114 398/183 |
| 2006/0239675 | A1* | 10/2006 | Iizuka | H04B 10/1125 396/287 |
| 2007/0282908 | A1* | 12/2007 | Van der Meulen | G06F 17/30997 |
| 2009/0027511 | A1 | 1/2009 | Kouno | |
| 2011/0191211 | A1* | 8/2011 | Lin | G06F 17/30265 705/27.2 |
| 2012/0194699 | A1 | 8/2012 | Kouno | |
| 2013/0083208 | A1* | 4/2013 | Koh | H04N 5/232 348/207.2 |
| 2014/0178080 | A1* | 6/2014 | Chen | H04B 10/116 398/172 |

FOREIGN PATENT DOCUMENTS

| | | | |
|---|---|---|---|
| JP | 2006-020294 | | 1/2006 |
| JP | 2006-270732 | | 10/2006 |
| JP | 2008-258987 | | 10/2008 |
| JP | 2008258987 A | * | 10/2008 |
| JP | 2009-206620 | | 9/2009 |
| TW | EP 2747308 A1 | * 6/2014 | ........... H04B 10/116 |

* cited by examiner

FIG. 6

| Model name | Set parameter |
|---|---|
| Model A | {"exposure-compensation", "-2.0"}, {"iso-gain", "x8"}, {"shutter-speed", "1/15000"} |
| Model B | {"exposure-compensation", "-2.0"}, {"white-balance", "daylight"}, {"scene-mode", "sports"}, {"effect", "mono"}, {"iso", "1600"} |

FIG. 9

```
<vlc_id>VLC0001</vlc_id>
<type>signage</type>
<subtype>building_wall</subtype>
<address>1-23-3 Izumi, East Ward, Nagoya-city, Aichi, 460-0003</address>
<latitude>35.174177</latitude>
<longitude>136.90902</longitude>
<direction>220.0</direction>
```

FIG. 10

```
<vlc_id>VLC0001</vlc_id>
```

FIG. 11

| IFD tag | Content | Specific example (Example of taking picture) |
|---|---|---|
| ImageWidth | Image width | 640 |
| ImageLength | Image length | 960 |
| Orientation | Image orientation | 1 |
| DateTime | File change date and time | 2013/11/18 12:33:30+0900 |
| FocalLength | Focal length | 4.3 mm |
| FNumber | F number | 1/2.4 |
| ISOSpeedRatings | ISO speed ratings | 200 |
| ExporureTime | Exposure time | 1/60 sec |
| GpsLatitudeRef | North latitude or south latitude | N |
| GPSLatitude | Latitude | 35.173817 |
| GPSLongitudeRef | East longitude or west longitude | E |
| GPSLongitude | Longitude | 136.908653 |

FIG. 12

| IFD tag | Content | Specific example (Example of taking picture) |
|---|---|---|
| UserComments | Visible light identifier<br>Subject data | <vlc_id>VLC0001</vlc_id><br><type>signage</type><br><subtype>building_wall</subtype><br><formatted_address>1-23-3 Izumi, East Ward, Nagoya-city, Aichi, 460-0003</formatted_address><br><subject_name>Nagoya Panasonic building</subject_name> |
| SubjectArea | Subject area | (220,516-309,705) |
| SubjectLocation | Subject location | <latitude>35.174177</latitude><br><longitude>136.90902</longitude> |
| SubjectDistance | Subject distance | 61.49 m |
| GPSImgDirectionRef | Unit of direction of captured image | N2E |
| GPSImgDirection | Picture-taking direction | 53.5 |

FIG. 16

$$\vec{p} = M\vec{l}d'$$

$$M = \begin{bmatrix} e_x & e_y & e_z \\ n_x & n_y & n_z \\ g_x & g_y & g_z \end{bmatrix}$$

$$d' = \frac{d}{\vec{g} \cdot \vec{l}}$$

$$\vec{l} = \begin{bmatrix} \sin\theta_x \\ \sin\theta_y \\ \sqrt{1.0 - (\sin^2\theta_x + \sin^2\theta_y)} \end{bmatrix}$$

$$\theta_x = \tan^{-1}\left(t_x \tan\left(\frac{angle\_h}{2}\right)\right)$$

$$\theta_y = \tan^{-1}\left(t_y \tan\left(\frac{angle\_v}{2}\right)\right)$$

$$t_x = \frac{2c\_x - w}{w}$$

$$t_y = \frac{2c\_y - h}{h}$$

--- angle_v : Vertical view angle angle_h : Horizontal view angle d : Vertical distance from mobile phone to ceiling

FIG. 47

| Mobile device ID | The number of rounds of play | The number of players |
|---|---|---|
| xxx.xxx.xxx.xxx | 2 | 1 |
| (End of queue) | | |
| | | |
| (Head of queue) | | |
| YYY.YYY.YYY.YYY | 1 | 2 |
| zzzzzz.zzz.zzz | 1 | 1 |

| Mobile terminal ID | Credit card information | Balance (yen) |
|---|---|---|
| XXX.XXX.XXX.XXX | AAA1-BBB1-CCC1-DDD1 M1-Y1 | 1,000 |
| YYY.YYY.YYY.YYY | AAA2-BBB2-CCC2-DDD2 M2-Y2 | 2,000 |
| ZZZ.ZZZ.ZZZ.ZZZ | AAA3-BBB3-CCC3-DDD3 M3-Y3 | 5,000 |

$\vec{p}$: position_based_on_light_position $\vec{p} = M\vec{l}d'$ $M = \begin{bmatrix} e_x & e_y & e_z \\ n_x & n_y & n_z \\ g_x & g_y & g_z \end{bmatrix}$ $d' = \dfrac{d}{\vec{g} \cdot \vec{l}}$ $\vec{l} = \begin{bmatrix} \sin\theta_x \\ \sin\theta_y \\ \sqrt{1.0 - (\sin^2\theta_x + \sin^2\theta_y)} \end{bmatrix}$ $\theta_x = \tan^{-1}\left(t_x \tan\left(\dfrac{\text{angle}_h}{2}\right)\right)$ $\theta_y = \tan^{-1}\left(t_y \tan\left(\dfrac{\text{angle}_v}{2}\right)\right)$ $t_x = \dfrac{2c_x - w}{w}$ $t_y = \dfrac{2c_y - h}{h}$

COMMUNICATION METHOD

CROSS REFERENCE TO RELATED APPLICATION

The present application is a continuation of U.S. application Ser. No. 14/296,814 filed on Jun. 5, 2014, which claims the benefit of U.S. Provisional Patent Application No. 61/907,497 filed on Nov. 22, 2013. The entire disclosures of the above-identified applications, including the specification, drawings and claims are incorporated herein by reference in their entireties.

FIELD

The present disclosure relates to methods of communication between mobile terminals, such as smartphones, tablets, and mobile phones, and devices, such as air conditioners, lighting devices, and rice cookers.

BACKGROUND

To home networks of recent years, a home-electric-appliance cooperation function has been introduced with which various home electric appliances are connected to a network by a home energy management system (HEMS) having a function of managing power usage for addressing an environmental issue, turning power ON and OFF from outside a house, and the like, in addition to cooperation of AV home electric appliances by internet protocol (IP) connection using an Ethernet (registered trademark) or a wireless local area network (LAN). However, computational performance of some home electric appliances is not sufficient to provide a communication function, and it is hard to provide some home electric appliances with a communication function in terms of cost.

In order to solve such a problem, Patent Literature 1 discloses a technique of efficiently establishing inter-device communication between limited transmission devices by performing communication using plural monochromatic light sources of illumination light among optical spatial transmission devices which transmit information to free space.

CITATION LIST

Patent Literature

Japanese Unexamined Patent Application Publication No. 2002-290335

SUMMARY

Technical Problem

However, the above existing scheme is limited to cases where the device to which the scheme is applied has three monochromatic light sources such as lighting. The present disclosure provides a communication method that solves such a problem and enables communication between various devices including a low computational performance device.

Solution to Problem

A communication method according to an aspect of the present disclosure is a communication method for obtaining information from a subject, including: taking a picture of the subject in a picture-taking mode, thereby obtaining image data; performing, after the taking, visible light communication in a visible light communication mode, thereby obtaining visible light data of the subject, the visible light communication mode being a different mode from the picture-taking mode; and embedding the visible light data obtained, into the image data, and thus saving the visible light data obtained.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

According to the present disclosure, a communication method can be provided which enables communication between various devices including a low computational performance device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 illustrates an example of set parameters in a camera control processing unit in a visible light reception process in Embodiment 1.

FIG. 9 illustrates an example of the visible light data received in the visible light reception process in Embodiment 1.

FIG. 10 illustrates an example of the visible light data received in the visible light reception process in Embodiment 1.

FIG. 11 illustrates an example of picture-taking parameters stored by a picture-taking processing unit in Embodiment 1.

FIG. 12 illustrates an example of metadata added by a whole control unit in Embodiment 1.

FIG. 16 illustrates an example of a computational expression for determining a relative location of the mobile terminal to the subject in Embodiment 1.

FIG. 47 illustrates an example of information stored in a request information storage unit in Embodiment 5.

FIG. 52 illustrates an example of information stored in a payment information storage unit in Embodiment 5.

FIG. 63 illustrates an example of a computational expression for determining a relative location of the mobile terminal to a subject in Embodiment 6.

Figure 1:
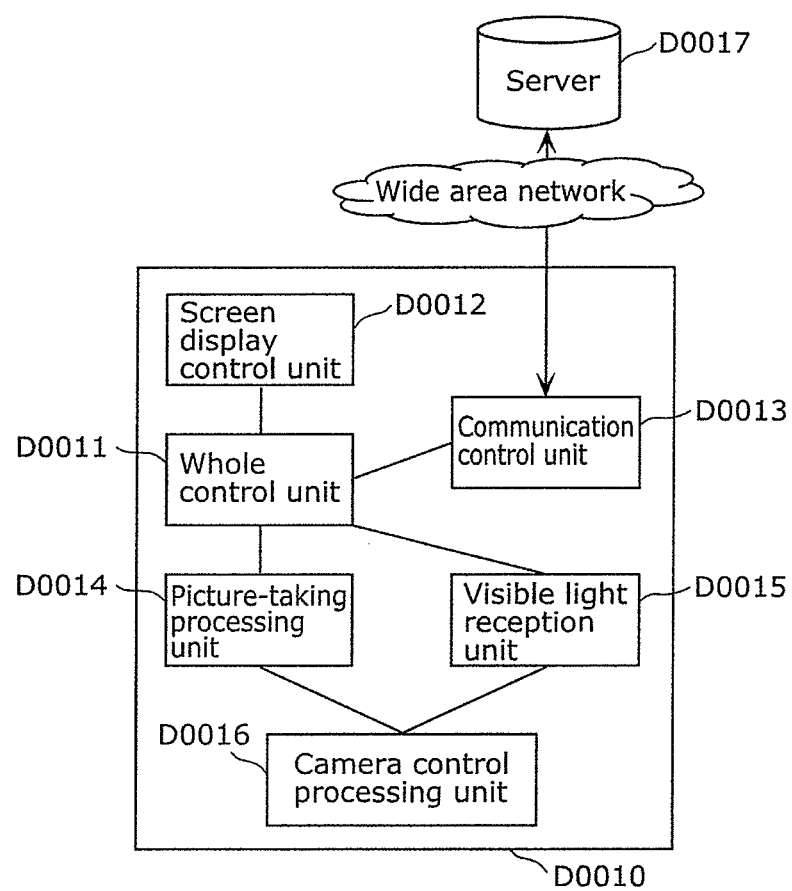
FIG. 1 is a structural view of software related to a picture-taking process in a mobile terminal in Embodiment 1.

DESCRIPTION OF EMBODIMENTS (Underlying Knowledge Forming Basis of the Present Disclosure)

In recent years, digital cameras and mobile phone terminals with built-in camera devices have been widespread. Accordingly, taking pictures on a trip, etc., and recalling the trip later by viewing the picture images are common actions in daily life.

For example, upon saving a picture in a digital camera, metadata is included in an image file of the picture. When viewing the picture, a user can know a picture-taking condition, a picture-taking point in time, etc., from the metadata included in the image file. In the case where a digital camera includes a global positioning system (GPS) function, location information (latitude and longitude) at the time of taking a picture is also saved in the metadata so that when viewing the picture, the user can distinguish the location where the picture was taken. However, the user can neither distinguish in which direction the picture was taken nor distinguish what the building captured in the picture was.

In particular, more and more pictures tend to be taken nowadays because of the prevalence of digital cameras and other reasons. In the case of attempting to select a picture that is to be attached to an e-mail or used to create a New Year's card, etc., from among the pictures taken on this year's trips, the user needs to search a large number of images for a target image. In this case, the user ends up searching for an image, relying on a vague memory such as "I half remember taking a picture of the Panasonic Building when I went to Nagoya," in which case it requires the user to make considerable effort.

A communication method according to an aspect of the present disclosure is a communication method for obtaining information from a subject, including: taking a picture of the subject in a picture-taking mode, thereby obtaining image data; performing, after the taking, visible light communication in a visible light communication mode, thereby obtaining visible light data of the subject, the visible light communication mode being a different mode from the picture-taking mode; and embedding the visible light data obtained, into the image data, and thus saving the visible light data obtained.

By doing so, it is possible to provide a communication method which enables communication between various devices including a low computational performance device.

For example, it may be that in the taking, the image data is obtained in a joint photographic expert group (JPEG) file format, and in the embedding, the visible light data is embedded into the image data as an image file directory (IFD) in an exchangeable image file format (EXIF) and is saved.

For example, it may be that the visible light data includes information on the subject together with a visible light identifier uniquely given to the subject, the subject emitting visible light, and in the embedding, (i) the visible light identifier included in the visible light data and (ii) the information included in the visible light data are saved in a "UserComment" tag which is one tag in the IFD, the information indicating at least one of an address or a name of the subject, the information included in the visible light data is saved in a "SubjectArea" tag which is one tag in the IFD, the information indicating an area of the subject, and the information included in the visible light data is saved in a "SubjectLocation" tag which is one tag in the IFD, the information indicating a location of the subject.

For example, it may be that in the embedding, location information of a mobile terminal including an imaging unit used to take the picture for the image data is saved in one tag in the IFD when global positioning system (GPS) information of the mobile terminal is not saved in the one tag in the IFD, the location information being obtained by calculation based on the visible light data.

For example, it may be that in the performing, it is determined whether the visible light data obtained includes information indicating at least one of an address or a name of the subject or includes a visible light identifier uniquely given to the subject, the subject emitting visible light, and when it is determined that the visible light data obtained includes the visible light identifier, information on the subject that corresponds to the visible light identifier is obtained as the visible light data through communication with a server via the visible light identifier.

For example, it may be that in the embedding, the visible light data of the subject is determined to be absent, and the image data is saved without the visible light data embedded, when the visible light data fails to be obtained in a predetermined length of time in the performing.

For example, it may be that the communication method further includes manually setting a shutter speed and an international organization for standardization (ISO) speed rating or a gain value that are to be used in the visible light communication mode, wherein in the manually setting, the shutter speed in the visible light communication mode is set to be faster than a shutter speed in the picture-taking mode, and the ISO speed rating or the gain value in the visible light communication mode is set to be greater than an ISO speed rating or a gain value in the picture-taking mode.

For example, it may be that the communication method further includes setting exposure compensation and an international organization for standardization (ISO) speed rating or a gain value that are to be used in the visible light communication mode, wherein in the setting, the exposure compensation in the visible light communication mode is set to be less than exposure compensation in the picture-taking mode, and the ISO speed rating or the gain value in the visible light communication mode is set to be greater than an ISO speed rating or a gain value in the picture-taking mode, thereby causing a shutter speed in the visible light communication mode to be automatically set to be faster than a shutter speed in the picture-taking mode.

For example, it may be that the communication method further includes: performing processing of receiving a request to distribute information from a requester; distributing, as information corresponding to the visible light data, the information subject to the request from the requester; and performing information processing for charging the requester according to the distribution of the information.

For example, a communication device according to an aspect of the present disclosure is a communication device for obtaining information from a subject, including: a picture-taking processing unit configured to take a picture of the subject in a picture-taking mode, thereby obtaining image data; a visible light reception processing unit configured to perform, after the taking, visible light communication in a visible light communication mode, thereby obtaining visible light data of the subject, the visible light communication mode being a different mode from the picture-taking mode; and a saving processing unit configured to embed the visible light data obtained, into the image data, and thus save the visible light data obtained.

Furthermore, a communication method according to an aspect of the present disclosure is a communication method used by a system including a mobile terminal and a device, which includes: performing, by the mobile terminal, visible light communication with the device, thereby obtaining a KEY held by the device and an identifier uniquely identifying the device; issuing, by the mobile terminal, a connection request via wireless communication to the device identified by the obtained identifier, using the KEY obtained in the performing; and establishing connection between the mobile terminal and the device when the KEY generated by the device matches the KEY transmitted in the issuing by the mobile terminal to the device.

Here, the communication method may further include: issuing, by the device, a KEY issuance request together with the identifier to a server device; and issuing, by the server device, the KEY associated with the identifier, and transmitting the KEY from the server device to the device.

Furthermore, a communication method according to an aspect of the present disclosure is a communication method used by a billing system including a mobile terminal and a device, which includes: performing, by the mobile terminal, visible light communication with the device, thereby obtaining a device identifier uniquely identifying the device and an URL of a server for performing a billing process for a use of the device; establishing, by the mobile terminal, connection with the server at the obtained URL, using the device identifier obtained in the performing and a terminal identifier uniquely identifying the mobile terminal; and performing a billing process with the server at the URL with which the mobile terminal established the connection.

Furthermore, the establishing may further include: inputting an ID uniquely identifying a user of the mobile terminal; generating a password related to the ID; and transmitting the generated password.

Furthermore, the establishing may further include inputting an ID uniquely identifying a user of the mobile terminal and a password for establishing the connection using the ID.

It is to be noted that these general and specific aspects may be implemented using a system, a method, an integrated circuit, a computer program, and a computer-readable recording medium such as a CD-ROM, or any combination of systems, methods, integrated circuits, computer programs, or computer-readable recoding media.

The following describes embodiments in detail with reference to the drawings where appropriate. However, more detailed explanations than necessary may be omitted. For example, detailed explanation on already well-known matter and overlapping explanation on the substantially same structure may be omitted. This is to avoid the following explanation from becoming unnecessarily redundant, thereby facilitating understanding for those skilled in the art.

Furthermore, each of the embodiments described below shows a specific example. The numerical values, shapes, materials, structural elements, the arrangement and connection of the structural elements, steps, the processing order of the steps etc. shown in the following embodiments are mere examples, and therefore do not limit the scope of the present inventive concept. Therefore, among the structural elements in the following embodiments, structural elements not recited in any one of the independent claims indicating the broadest concept are described as arbitrary structural elements.

Embodiment 1

FIG. 1 is a structural view of software related to a picture-taking process in a mobile terminal in this embodiment. The mobile terminal is an example of a communication device.

FIG. 1 illustrates, in a mobile terminal D0010, an overall structure of software related to a picture-taking process in the mobile terminal in this embodiment which includes a whole control unit D0011, a screen display control unit D0012, a communication control unit D0013, a picture-taking processing unit D0014, a visible light reception processing unit D0015, and a camera control processing unit D0016.

The whole control unit D0011 performs processing of: sensing user input; issuing instructions to sub-systems in order to perform various processes in sequence; and further saving, as a file, captured-image data, visible light data, etc., obtained through processing of the sub-systems.

The screen display control unit D0012 performs a process related to a screen view according to the instruction of the whole control unit D0011.

The communication control unit D0013 accesses a server D0017 via a wide area network according to the instruction of the whole control unit D0011. In this embodiment, the communication control unit D0013 performs processing of: transmitting, to the server D0017, the visible light data obtained by the visible light reception processing unit D0015; and receiving, via the server D0017, specific information on a subject indicated by the visible light data, that is, subject data.

The server D0017 is present on the wide area network and holds sets of the visible light data and the subject data in a database therein. The server D0017 performs a process of extracting the subject data using the visible light data as a key according to access from the wide area network. As illustrated in FIG. 1, this server D0017 is not a structural element of the mobile terminal D0010 in this embodiment.

The picture-taking processing unit D0014 performs a process of instructing the camera control processing unit D0016 to capture a normal camera image.

The visible light reception processing unit D0015 performs a process of instructing the camera control processing unit D0016 to receive the visible light data.

The camera control processing unit D0016 performs a process of controlling camera hardware and obtains, as a result of this process, a preview image, a still image, a moving image, etc., from the camera hardware. In this embodiment, the camera hardware mounted in the mobile terminal D0010 is, for example, a built-in ⅓-inch CMOS image sensor which has an imaging area of 4.9 mm×3.9 mm in size using a fixed focus lens with a focal length of 4.3 mm and includes an auto focus function.

With the mobile terminal D0010 including the communication terminal according to this embodiment configured as follows, it is possible to provide a communication method or the like which enables visible light communication using a short visible light ID and by which information suited to a user can be provided.

In other words, the mobile terminal D0010 including the communication terminal according to this embodiment is capable of taking a picture using the camera device, subsequently receiving, using visible light communication, data transmitted by way of fast blinking of visible light emitted from a landmark, signage, lighting, etc., near a subject, and recording, together with a picture file, the received data (visible light data) or information obtained from the received data (subject data).

Thus, using the visible light data and the subject data recorded in the image file, a user who is viewing an image is able to distinguish what is included with the subject and, furthermore, is able to effectively search a large number of pictures for a target image by mechanically processing the visible light data and the subject data.

The following describes, with reference to the drawings, an operation in the picture-taking process that is performed when a user operates the mobile terminal D0010 including the communication terminal according to this embodiment to take a picture.

Figure 2:
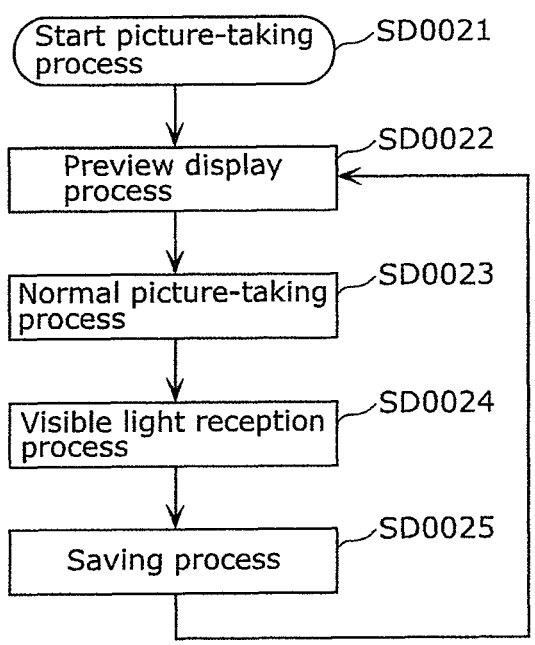
FIG. 2 illustrates an example of a sequence of the picture-taking process in the mobile terminal in Embodiment 1.

FIG. 2 illustrates an example of a sequence of the picture-taking process in the mobile terminal in Embodiment 1. In FIG. 2, the whole process sequence that is performed by the whole control unit D0011 is illustrated as an example.

In FIG. 2, first, a user instructs the mobile terminal D0010 to start a picture-taking process, and the picture-taking process is then started (Step SD0021).

The whole control unit D0011 performs a preview display process immediately after the start of the picture-taking process (Step SD0022), and then waits for the user to press down a picture-taking button.

When the user presses down the picture-taking button, for example, to issue an instruction to take a picture, the whole control unit D0011 performs the same or like process as in taking a normal still image (Step SD0023). In this embodiment, when the instruction to take a picture is issued, the whole control unit D0011 takes a picture of the subject in picture-taking mode, thereby obtaining image data. Here, the picture-taking processing unit D0014 obtains the image data in a joint photographic expert group (JPEG) file format, for example.

Next, the whole control unit D0011 performs a visible light reception process (Step SD0024).

In this embodiment, after the picture-taking process performed by the picture-taking processing unit D0014, the whole control unit D0011 performs visible light communication in visible light communication mode which is different from the picture-taking mode, thereby obtaining the visible light data of the subject.

At the end, the whole control unit D0011 stores the data obtained in Step SD0024 into a metadata region in the image obtained in Step SD0023, and performs a process of saving resultant data into the mobile terminal D0010 (Step SD0025). In this embodiment, the whole control unit D0011 embeds the obtained visible light data into the image data and thus saves the obtained visible light data. More specifically, the whole control unit D0011 embeds the visible light data into the image data as an image file directory (IFD) in exchangeable image file format (EXIF) and thus saves the visible light data.

It is to be noted that after the saving process ends, the preview display process in Step SD0022 is repeated. Thus, the user can take a next picture.

Furthermore, during the processing in any steps in FIG. 2 (Step SD0022 to Step SD0025), the user can perform a cancellation operation, thereby suspending this picture-taking process and returning the mobile terminal D0010 to a normal use state.

It is to be noted that when no visible light data is obtained even after a predetermined length of time in the visible light reception process in Step SD0024, then in the saving process in Step SD0025, it is determined that the visible light data of the subject is absent, and only the image data is saved without visible light data embedded in the image data.

Figure 3:
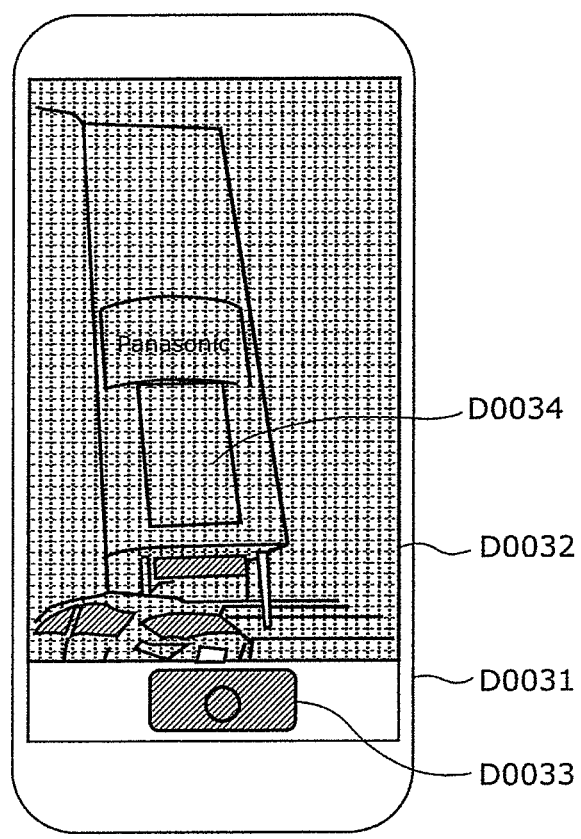
FIG. 3 illustrates an example of external appearance of the mobile terminal on which a preview image is displayed in Embodiment 1.

FIG. 3 illustrates an example of external appearance of the mobile terminal on which a preview image is displayed in Step SD0022. In FIG. 3, a casing of the mobile terminal D0010 and a display unit D0032 embedded in the mobile terminal D0010 are illustrated.

The display unit D0032 includes a touch panel capable of being operated by touch gestures, on which a software button D0033 which a user touches to effect transition to a picture-taking operation is displayed together with the preview image obtained from the camera hardware. In this embodiment, a preview image which includes a car and a building is displayed on the display unit D0032 as illustrated in FIG. 3, for example. An area D0034 in front of the building is advertising signage illuminated by lighting; this is assumed to repeat fast blinking for transmitting predetermined visible light data.

Figure 4:
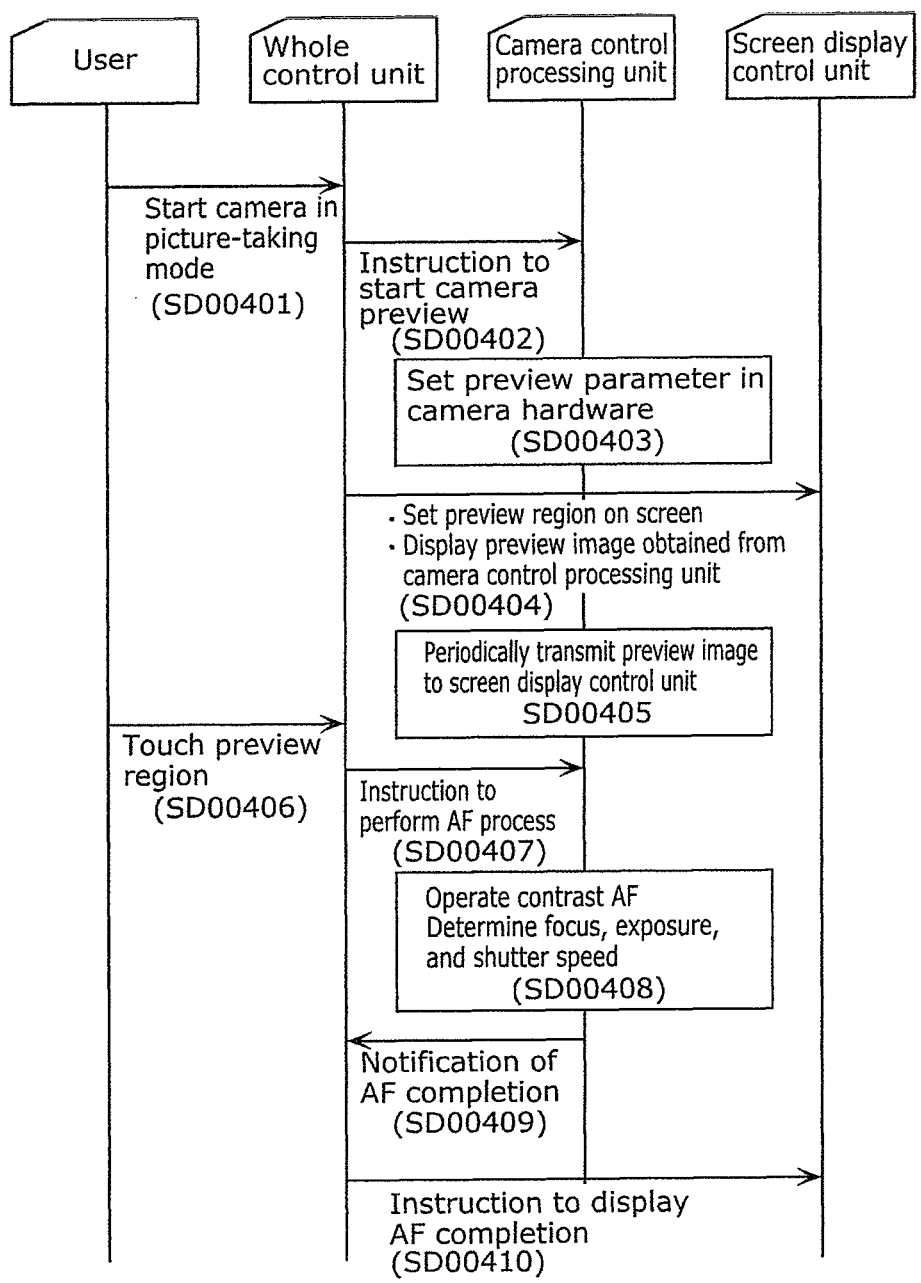
FIG. 4 is a sequence chart related to a detailed operation in a preview display process in Embodiment 1.

Next, a detailed operation in the preview display process in Step D0022 is described with reference to FIG. 4. FIG. 4 is a sequence chart related to the detailed operation in the preview display process in Embodiment 1.

First, a user starts a camera in picture-taking mode, causing the preview display in Step SD0022 to be started (Step SD00401).

The whole control unit D0011 then instructs the camera control processing unit D0016 to start a camera preview (Step SD00402). The camera control processing unit D0016 sets, in the camera hardware, a parameter suited to the preview according to the picture-taking mode (Step SD00403).

Furthermore, the whole control unit D0011 instructs the screen display control unit D0012 to display a preview screen. According to the instruction, the screen display control unit D0012 provides the setting to cause a preview frame to be displayed on the screen and data obtained from the camera control processing unit D0016 to be continuously displayed thereon (Step SD00404).

After this, the camera control processing unit D0016 periodically obtains a preview image from the camera hardware and transmits the preview image to the screen display control unit D0012 (Step SD00405). As a result, the preview image illustrated in FIG. 3 is displayed on the screen of the mobile terminal D0010.

Next, the user touches the preview region or holds down the software button D0033 while the preview is displayed (Step SD00406). Then, auto focus processing is performed as follows First, the whole control unit D0011 senses the touch and then instructs the camera control processing unit D0016 to start an auto focus process (hereinafter referred to as an AF process) (Step SD00407).

Next, the camera control processing unit D0016 starts a contrast AF process using the neighborhood of the touch point in coordinates as a focus region and determines a focus, exposure, and a shutter speed (Step SD00408).

On completion of the AF process, then the camera control processing unit D0016 notifies the whole control unit D0011 of AF completion (Step SD00409).

Next, the whole control unit D0011 receives this notification and instructs the screen display control unit D0012 to display a message indicating that the AF has now been completed (Step SD00410).

Figure 5:
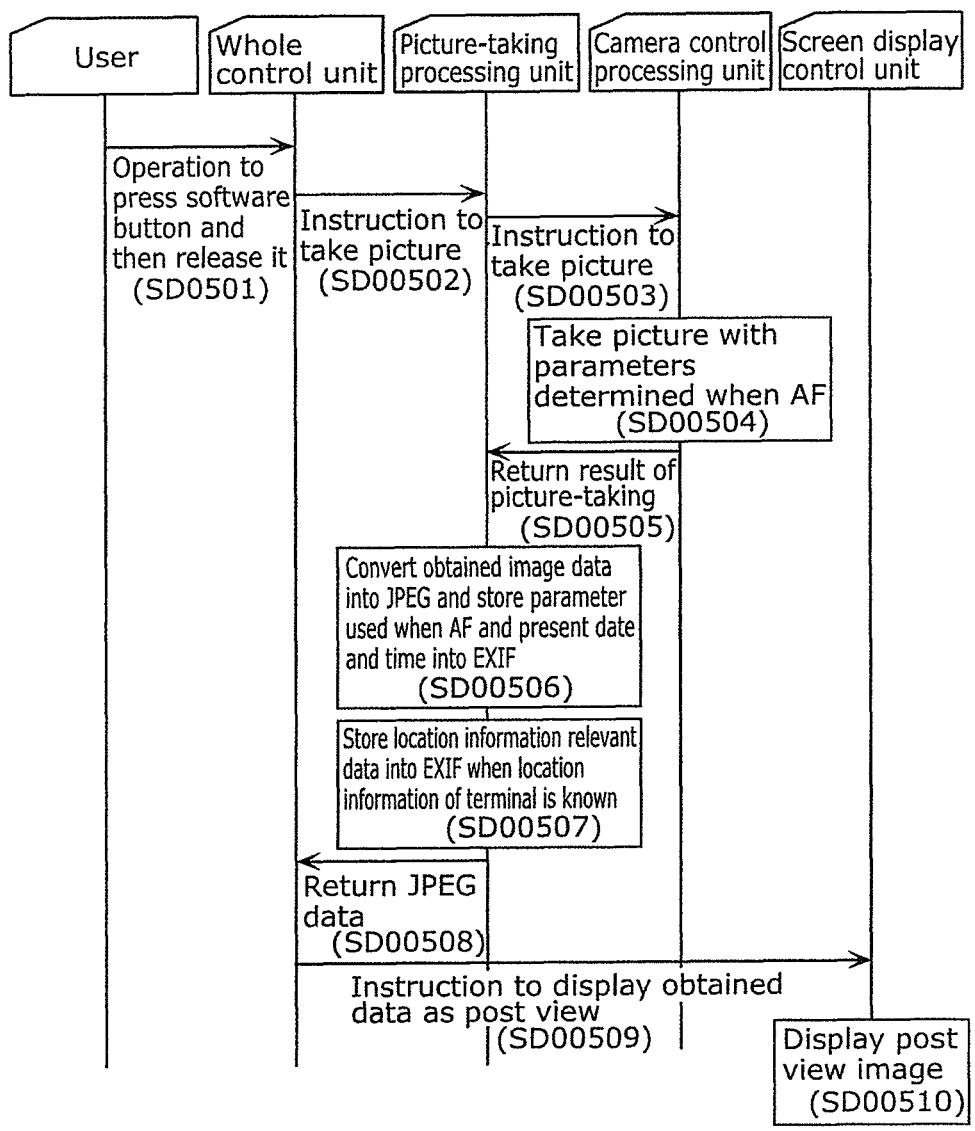
FIG. 5 is a sequence chart related to a detailed operation in a normal picture-taking process in Embodiment 1.

The following describes details of a normal picture-taking process SD0023 with reference to FIG. 5. FIG. 5 is a sequence chart related to a detailed operation in the normal picture-taking process in Embodiment 1.

First, at the time when the user takes the finger touching on the software button D0033 off the screen, the whole control unit D0011 effects a transition to the normal picture-taking process (picture-taking mode) (Step SD0501).

Next, the whole control unit D0011 instructs the picture-taking processing unit D0014 to take a picture (Step SD00502). The picture-taking processing unit D0014 receives this instruction and then instructs the camera control processing unit D0016 to take a picture (Step SD00503).

Next, the camera control processing unit D0016 takes a picture with the focus, exposure, and shutter speed determined in the above AF process (Step SD00408) (Step SD00504). In this embodiment, the camera control processing unit D0016 takes a picture of a subject, thereby obtaining image data.

Next, the camera control processing unit D0016 returns resultant image data and parameters thereof to the picture-taking processing unit D0014 (Step SD00505).

The picture-taking processing unit D0014 converts, into JPEG, the image data obtained from the camera control processing unit D0016, and performs a process of embedding, into EXIF IFD, the present time point and the parameters used when taking the picture (Step SD00506).

Furthermore, the mobile terminal D0010 includes GPS or the like and when it is possible to obtain information on the present location, stores also data of the location information indicating the present location into EXIF IFD (Step SD00507). Here, FIG. 11 illustrates an example of data embedded in IFD. Here, FIG. 11 illustrates an example of picture-taking parameters stored by a picture-taking processing unit in Embodiment 1. In the example of FIG. 11, this indicates that the image captured this time has a size of 640 pixels in width and 960 pixels in length and this picture is taken at the location of latitude 35.173817 north and longitude 136.908653 east on Nov. 18, 2013, at 12:33:30 Japanese standard time.

Next, the picture-taking processing unit D0014 returns data of these taken pictures (JPEG data) to the whole control unit D0011 (Step SD00508).

At the end, the whole control unit D011 transmits the obtained data (JPEG data) to the screen display control unit D0012 so that the obtained data (JPEG data) is displayed as a post view (Step SD00509). The screen display control unit D0012 displays a post view image, visualizing, for the user, what picture-taking was performed (Step SD00510).

On completion of the normal picture-taking process indicated in SD0023 as above, the whole control unit D0011 performs the visible light reception process indicated in Step SD0024. A sequence of this visible light reception process is as follows.

First, the whole control unit D0011 issues an instruction for the visible light reception to start reception of visible light.

Next, the visible light reception processing unit D0015 specifies (sets), in the camera control processing unit D0016, parameters suited to visible light reception.

Here, for example, in the case of a camera having a manually settable shutter speed, the parameters are set which include a shutter speed faster than a speed at which visible light blinks, and a high ISO/gain value. On the other hand, in the case of a camera the shutter speed of which can only be set automatically, the parameters are set which include exposure compensation having a small value and a very high ISO speed rating. This results in the shutter speed being automatically set to be fast under control. In other words, in the case where the shutter speed and the ISO/gain value in the visible light communication mode can be manually set, the shutter speed in the visible light communication mode is set to be faster than the shutter speed in the picture-taking mode, and the ISO/gain value in the visible light communication mode is set to be greater than the ISO/gain value in the picture-taking mode. On the other hand, in the case where the shutter speed is automatically set while the exposure compensation and the ISO/gain value in the visible light communication mode can be set, the exposure compensation in the visible light communication mode is set to be less than the exposure compensation in the picture-taking mode, and the ISO/gain value in the visible light communication mode is set to be greater than the ISO/gain value in the picture-taking mode, with the result that the shutter speed in the visible light communication mode is automatically set to be faster than the shutter speed in the picture-taking mode. It is sufficient that the exposure compensation is set so that an exposure value usually denoted by EV is less than a value calculated at the time of typical auto picture taking (in picture-taking mode) by two or more. Furthermore, it is sufficient that ISO sensitivity is set to four or more times the typical sensitivity set in the case of taking a picture outdoors in auto mode (picture-taking mode) when the weather is fine. For example, with the camera control processing unit the ISO of which is typically 200 at the time of taking a picture when the weather is fine, the ISO speed rating is set to be greater than or equal to 800 (specifically, ISO 1600) at the time of visible light reception.

FIG. 6 illustrates an example of set parameters in the camera control processing unit in the visible light reception process in Embodiment 1. In FIG. 6, a list of parameters to be set in the camera control processing unit D0016 is defined for each camera model, and the visible light reception processing unit D0015 performs the parameter setting selectively using this list.

In FIG. 6, a model A is a mobile terminal having a manually settable shutter speed, and a model B is a mobile terminal having camera hardware the shutter speed of which is not manually settable.

The defined setting in the model A is that "shutter-speed" parameter is one fifteen thousandth of a second, a value of "iso-gain" indicating to what multiple of the standard the obtained image is amplified in brightness is eight times, and an exposure compensation parameter indicating a degree of the final brightness of the image that is to be output is −2.0, which is the minimum. The defined setting in the model B is that the exposure compensation is −2.0, which is the same as in the model A, and the ISO is as large a value as 1600. In the model B, the parameters are defined so that a high shutter speed is set in automatic shutter speed adjustment. Moreover, the defined setting in the model B further includes sports as a scene mode and daylight as a white balance mode. This means that the parameters are set with which the shutter speed is more likely to be fast under control.

Next, the visible light reception processing unit D0015 instructs the camera control processing unit D0016 to start preview, obtaining preview images regularly. The visible light reception processing unit D0015 regularly detects signals from the preview images to form visible light data.

In the case of successfully detecting the signals that are the visible light data, the visible light reception processing unit D0015 returns to the whole control unit D0011 the coordinate position within camera at which that visible light data is successfully detected and the received visible light data.

It is to be noted that the whole control unit D0011 waits for the visible light data that is obtained from the visible light reception processing unit D0015, for a certain length of time from a point in time when the instruction to start the reception was issued; in the case where the detection remains unsuccessful until the lapse of the certain length of time, the subsequent process proceeds on the assumption that the visible light data is absent.

Figure 7:
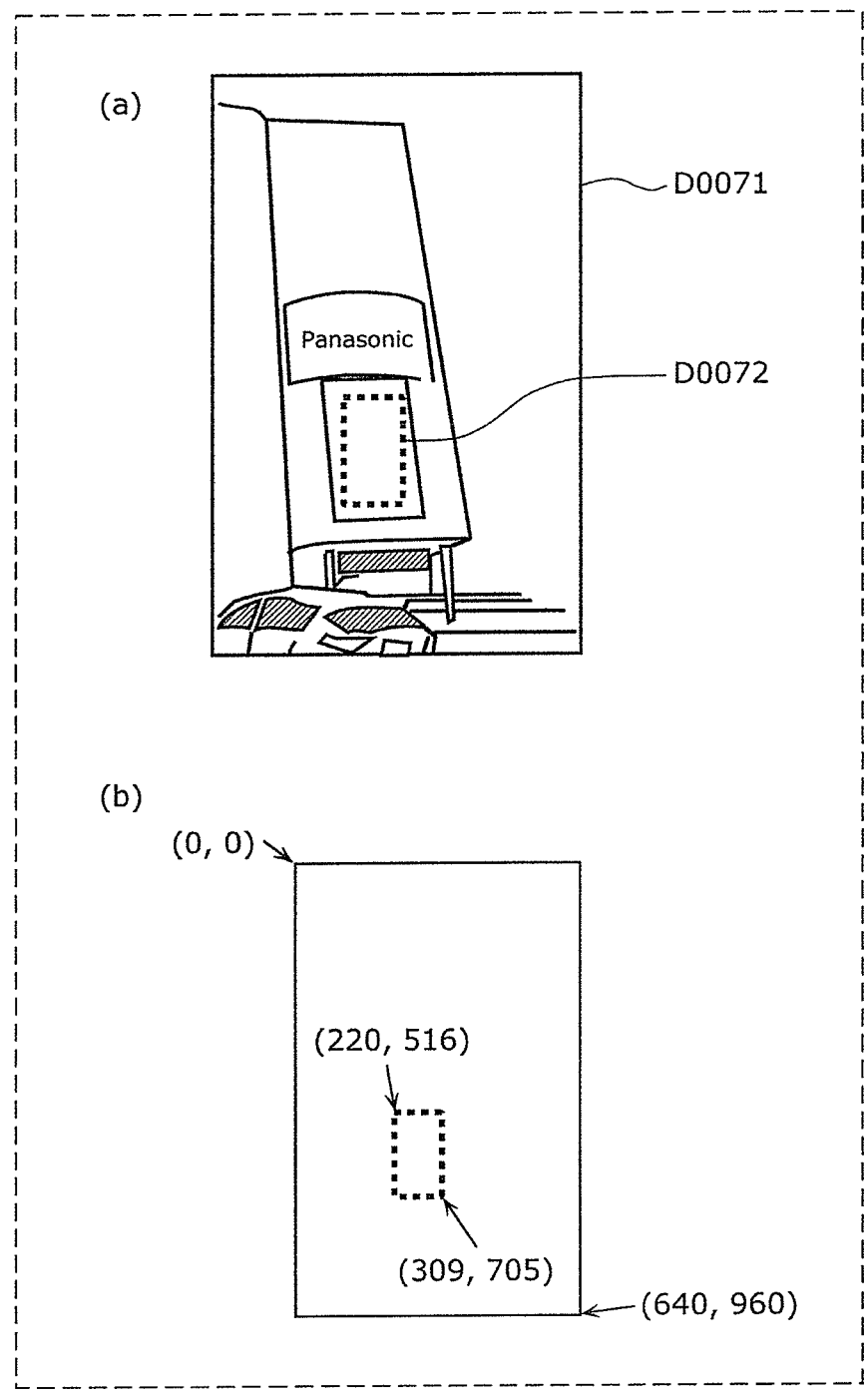
FIG. 7 illustrates an example of coordinates of visible light data obtained from the preview image in Embodiment 1.

An example of the coordinate position within camera at which the visible light data is successfully detected is described below with reference to FIG. 7. FIG. 7 illustrates an example of coordinates of visible light data obtained from the preview image in Embodiment 1.

FIG. 7 illustrates, in (a), a case where the visible light data is obtained from a preview image D0071.

In (a) of FIG. 7, the preview image D0071 is a scenic image which includes a region D0072 where the visible light data is included.

The visible light reception processing unit D0015 has a function of automatically distinguishing which part of this preview image D0071 includes the visible light data and reading such part. In short, the visible light reception processing unit D0015 automatically distinguishes the inclusion of the visible light data in the region D0072 within a scenic image. In the example illustrated in (a) of FIG. 7, the coordinate position within camera (the region D0072) at which the visible light data is successfully detected will be (220, 516)-(309, 705) as illustrated in (b) of FIG. 7 since the entire size of the captured image (the preview image D0071) is 640 pixels in width and 960 pixels in length.

On completion of the visible light reception process indicated in Step SD0024 as above, the whole control unit performs the saving process indicated in Step SD0025.

Figure 8:
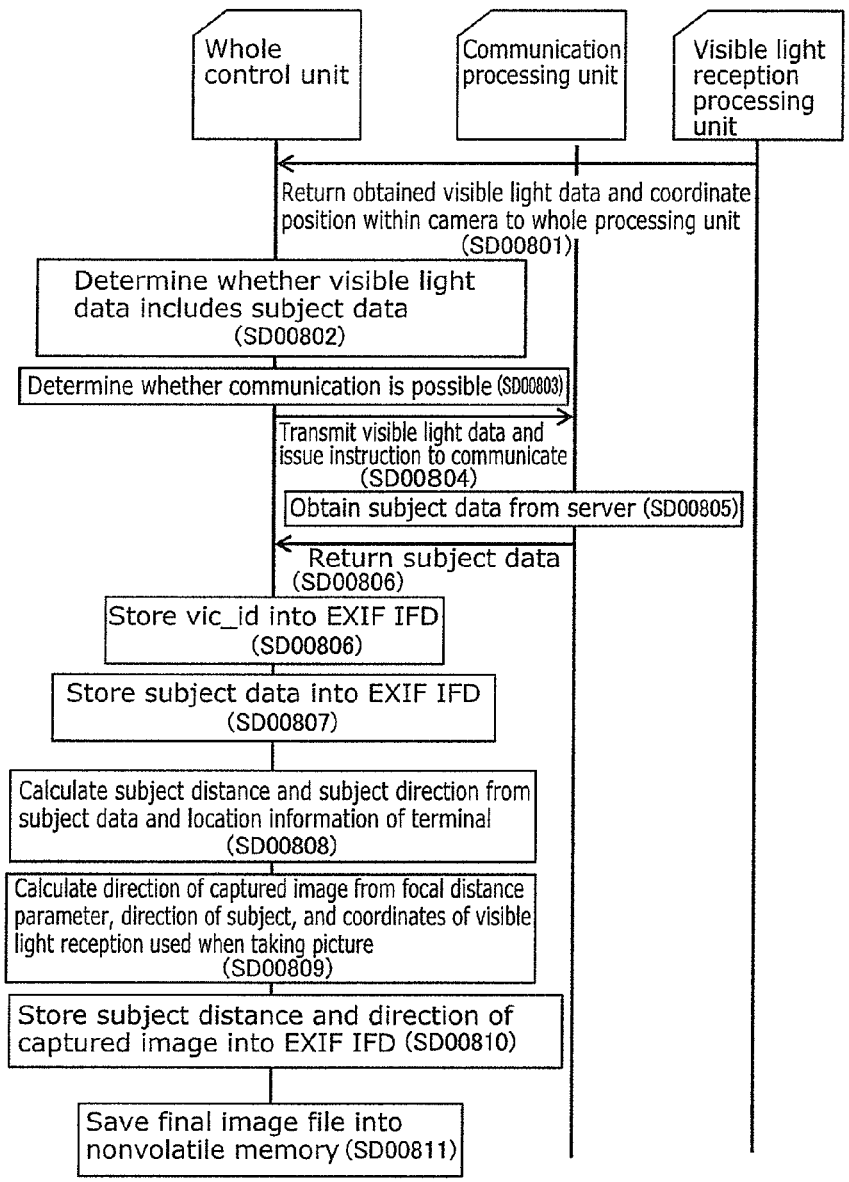
FIG. 8 is a sequence chart related to a detailed operation in a saving process in Embodiment 1.

Details of the saving process indicated in Step SD0025 are described below with reference to FIG. 8. FIG. 8 is a sequence chart related to a detailed operation in the saving process in Embodiment 1.

First, the whole control unit D0011 is notified of the visible light data and the coordinate position within camera obtained by the visible light reception processing unit D0015 (Step SD00801). This notification triggers the whole control unit D0011 to start the saving process.

Here, FIG. 9 and FIG. 10 each illustrate an example of the visible light data received in the visible light reception process in Embodiment 1. In FIG. 9 and FIG. 10, examples of the visible light data represented using an extensible markup language (XML).

FIG. 9 illustrates an example of the visible light data including subject data. The following describes what data is represented by each tag in the XML.

For example, a "vlc_id" tag is an identifier uniquely given to a visible light transmitter. It is desirable that this should be unique in the world, but there is no practical problem with a condition in which this is unique in each region or application. In this embodiment, this corresponds to a visible light identifier uniquely given to the subject that emits visible light. The "type" tag indicates what the above visible light transmitter is like in the real world. FIG. 9 represents that "type" is signage, indicating that the above visible light transmitter is a sign or an advertising medium.

A "subtype" tag represents more detailed information on what the above visible light transmitter is like in the real world than the "type" tag. In FIG. 9, "subtype" is "building_wall;" it is represented in combination with information in the "type" tag that the above visible light transmitter is a signboard on a wall of a building.

An "address" tag represents an address where the above visible light transmitter is installed. A "latitude" tag indicates the latitude of a location where the above visible light transmitter is installed. A "longitude" tag indicates the longitude of the location where the above visible light transmitter is installed. A "direction" tag indicates a direction in which the above visible light transmitter is installed to face. In the example of FIG. 9, the direction is represented using real numbers 0 to 360 where the direction due north is 0, the direction east is 90, the direction south is 180, and the direction west is 270; a value 220 of the direction indicates that the signboard faces the south west.

On the other hand, FIG. 10 illustrates an example of the visible light data including no subject data. Specifically, the visible light data illustrated in FIG. 10 includes only a "vlc_id" tag without information on a subject.

The saving process in the case where the visible light data illustrated in FIG. 10 is received is described below.

In the saving process, first, the whole control unit D0011 distinguishes whether or not the received visible light data includes subject data (Step SD00802). In this embodiment, the visible light data illustrated in FIG. 10 is received, and it is determined that the visible light data includes no subject data.

Next, the whole control unit D0011 determines whether or not the mobile terminal D0010 is capable of communication (Step SD00803).

When the mobile terminal D0010 is capable of communication, the whole control unit D0011 sends the received visible light data to the communication control unit D0013 and instructs it to obtain subject data from the server D0017 (Step SD00804).

Next, the communication control unit D0013 receives the instruction, transmits the visible light data (the visible light data illustrated in FIG. 10) to the server D0017, and receives (obtains) subject data (Step SD0085). More specifically, the server D0017 returns to the communication control unit D0013 the subject data that corresponds to the visible light data received from the communication control unit D0013, based on a table in which an identifier included in the visible light data and subject data corresponding thereto are associated with each other. Here, the table present in the server D0017 includes three pieces of subject data D0101, D0102, and D0103, and when the server D0017 receives the visible light data illustrated in FIG. 10, the identifier indicated by the "vlc_id" tag is VLC0001, with the result that the subject data D0101 is determined to be appropriate and thus is returned to the communication control unit D0013.

Next, the communication control unit D0013 receives the subject data D0101 and then returns the received subject data to the whole control unit D0011 (Step SD00806). Thus, the whole control unit D0011 is capable of obtaining information on the subject (the subject data D0101) in addition to the received visible light data. In other words, it is thus determined whether the obtained visible light data includes information indicating at least one of an address and a name of the subject or includes the visible light identifier uniquely given to the subject that emits visible light, and when it is determined that the obtained visible light data includes the visible light identifier, information on the subject that corresponds to the visible light identifier can be obtained as the visible light data through communication with the server D0017 via the visible light identifier.

It is to be noted that, at this point in time, the whole control unit D0011 holds, as the information on the subject, the JPEG data obtained from the picture-taking processing unit D0014, the visible light data obtained by the visible light reception processing unit D0015, and the subject data obtained by the communication processing unit. This means that specific values, such as the picture-taking parameters as illustrated in FIG. 11, for example, and the present date and time, are stored in the EXIF IFD part of the JPEG data by the picture-taking processing unit D0014.

Next, the whole control unit D0011 adds, to the EXIF IFD part, vlc_id obtained by the visible light reception processing unit D0015 and the information on the subject. Specifically, the whole control unit D0011 saves the tag and the information in association with each other as illustrated in FIG. 12. More specifically, a "UserComments" tag holds, in association, the visible light identifier out of the visible light data and a type of the visible light data, an address and a name of the subject, and the like out of the subject data. A "SubjectArea" tag holds, as coordinates in the image in association, an area in which the visible light is received. A "SubjectLocation" tag holds location information (longitude and latitude) of the subject obtained from the subject data. In other words, the visible light identifier included in the visible light data and the information included in the visible light data and indicating at least one of the address and the name of the subject are saved in the "UserComment" tag which is one tag in the EXIF IFD, and the information included in the visible light data and indicating the area of the subject is saved in the "SubjectArea" tag which is one tag in the IFD, and the information included in the visible light data and indicating the location of the subject is saved in the "SubjectLocation" tag which is one tag in the IFD.

Next, the whole control unit D0011 compares the location information on the subject in the subject data and the location information obtained from the mobile terminal D0010 at the time of taking the picture, thereby calculating a distance to the subject and a direction of the subject (Step SD00808). In this embodiment, the picture-taking location is at 136.9086 degrees east longitude as illustrated in FIG. 11, and the location of the subject is 136.90902 degrees east longitude as illustrated in FIG. 12. Since a distance for one second of longitude is 30.864 m, this shows that the location of the subject is about 46.7 m away in the east from the picture-taking location. Likewise, the latitude of the picture-taking location which is 35.173817 degrees and the latitude of the subject which is 35.174177 degrees show that the subject is about 40 m away in the north from the picture-taking location, with the result that the distance to the subject turns out to be 61.49 m. Furthermore, the direction of the subject is determined to be a direction that is 49.3 degrees east of north.

Next, the whole control unit D0011 calculates a direction of the center of the captured image using a focal length parameter, the direction of the subject, and the coordinates of visible light reception used when the picture was taken (Step SD00809). In this embodiment, the focal length parameter is a value stored in a "FocalLength" tag in FIG. 11 which is 4.3 mm. From this focal length and the size of the imaging element embedded in the mobile terminal D0010, an approximate angle of view on each of the long side and the short side of the captured image obtained by taking the picture can be calculated using a computational expression $\alpha=2 \arctan(d/2f)$. Here, d is a size of the imaging element, f is an effective focal length, and $\alpha$ is a view angle. Since a camera module with which the focal length is 4.3 mm and the short side is 3.9 mm is used here, the angle of view on the short side can be determined to be about 48.79 degrees. Therefore, the center of gravity of coordinates within the screen illustrated in (a) of FIG. 7 from which the visible light data is obtained is 56 pixels away from the center of the screen, that is, shifted leftward by 8.7% of the whole as illustrated in (b) of FIG. 7; this shift corresponds to 4.2 degrees in view angle, which means that the center of the image is calculated as a direction shifted eastward by 4.2 degrees from the subject, that is, a direction that is 53.5 degrees east of north.

Next, the whole control unit D0011 stores (adds) the calculated subject distance and direction of the center of the captured image into the EXIF IFD (Step SD00810). In this embodiment, the subject distance is saved into "SubjectDistance" tag, and the direction of the center of the captured image is saved into a "GPSImgDirectionRef" tag and a "GPSImgDirection" tag. Here, an example of the information added to each IFD tag through the above processing is illustrated in FIG. 12. FIG. 12 illustrates an example of metadata added by the whole control unit in Embodiment 1.

At the end, the whole control unit D0011 saves the image data with the EXIF IFD written, as a final file (a final image file), into a nonvolatile memory (not shown) within the mobile terminal D0010 (Step SD00811) after which the saving process in Step D0025 is completed.

Thus, a still picture is taken in Step SD0023, subsequently the process of receiving the visible light data is performed in Step SD0024, and the data on the subject is saved as metadata into the picture image in Step SD0025. As a result, when viewing the picture later, for example, the user can view the picture while checking the information on the subject. Furthermore, the user can easily take out a desired picture image by checking the information on the subject.

It is to be noted that although the sequence in which the captured image is saved as a file after all the subject data is obtained at the time of taking the picture has been described in this embodiment, this is not the only example. It is also possible that only the minimum visible light data is saved at the time of taking the picture.

In this case, the subject data can be obtained by accessing the server D0017 at the time of data organization in the mobile terminal D0010 or when a user views the picture image later.

More specifically, the minimum visible light data is only the visible light identifier indicated by the "vlc_id" tag in FIG. 10, for example, and it is assumed that the server D0017 stores, as a database, this visible light identifier, the subject information, and a range of a time point at which these subject information and identifier are associated with each other. In this case, the mobile terminal D0010 transmits the date and time at which the picture that will be the captured image was taken and the visible light identifier to the server D0017, and the server D0017 returns the subject data associated at that date and time with that identifier. By doing so, even when the speed of visible light communication is not high enough to transmit all the subject data through the visible light communication, for example, the user can use data on the subject the picture of which was taken.

Furthermore, although the case where the visible light reception processing unit D0015 receives only one piece of the visible light data has been described in this embodiment, this is not the only example. It may be that the visible light data is received from a plurality of objects. Also in this case, the subject data on the plurality of objects can be saved into the "UserComment" tag through the same or like processing as above. With the use of visible light data and subject data received from a plurality of objects, the use of a means such as triangulation makes it possible to increase accuracy in the calculation of distance and direction indicated in Step SD00808 and Step SD00809, for example.

Furthermore, although the case where the picture-taking processing unit D0014 saves (stores) the location information on the mobile terminal D0010 into EXIF IFD has been described in this embodiment, this is not the only example. In the case where a mobile terminal has no positioning system or in a situation where the positioning function of a mobile terminal has difficulty operating, such as taking a picture indoors, it may be that the whole control unit D0011 distinguishes an approximate present location based on the subject data obtained from the visible light data and saves (adds) it to the EXIF IFD tag. Specifically, a "GPSLatitude" tag and a "GPSLongitude" tag are tags into which data obtained from GPS is supposed to be saved (stored), but in the case where no data is saved (stored) in these tags, it is sufficient that data obtained through back calculation of the subject data is saved (stored).

Figure 13:
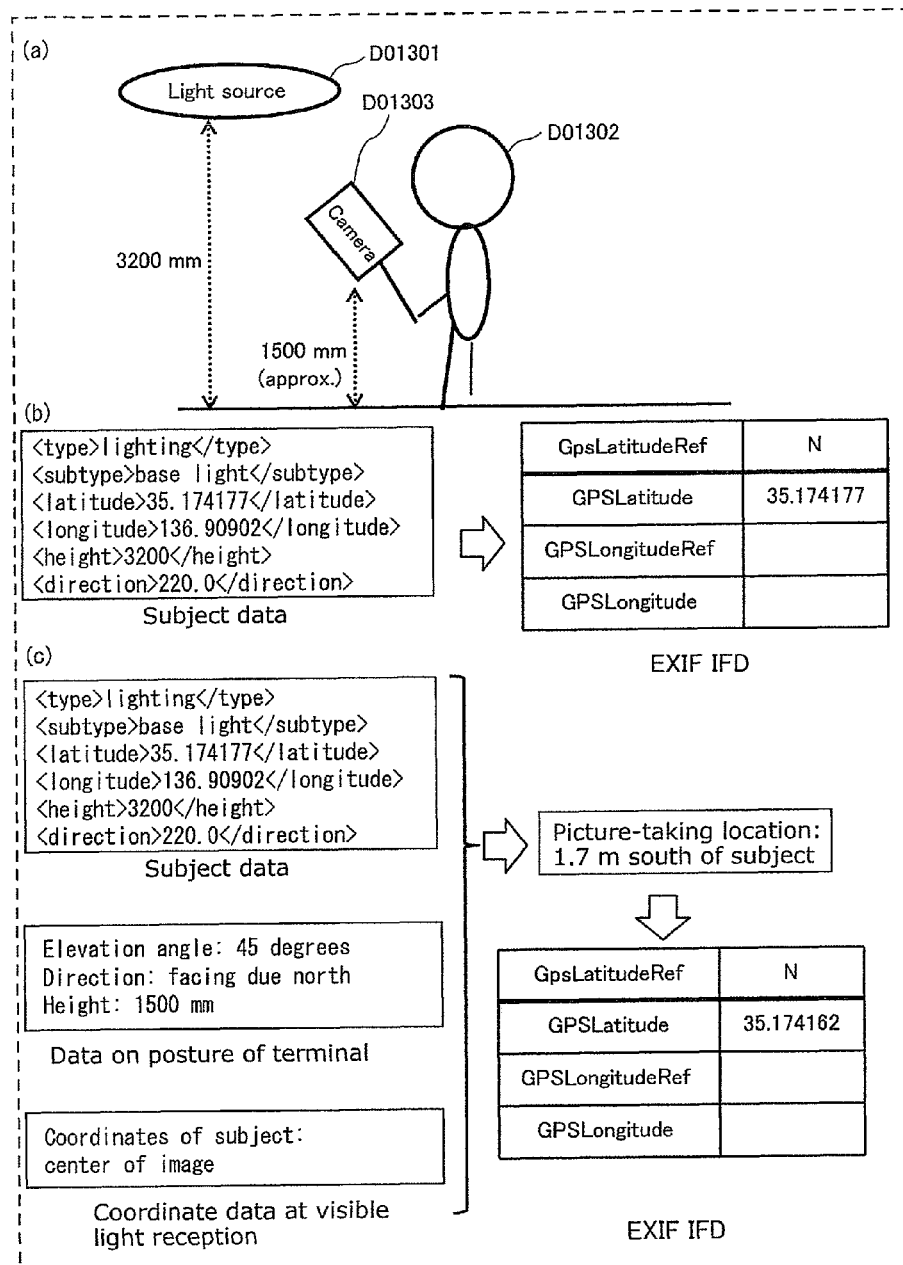
FIG. 13 illustrates an example of a case where the present location obtained through visible light reception is stored into EXIF in Embodiment 1.

An example in this case is specifically described below with reference to FIG. 13. FIG. 13 illustrates an example of a case where the present location obtained through visible light reception is stored into EXIF in Embodiment 1.

In (a) of FIG. 13, an example in the case where a user D01302 takes a picture while holding a camera D01303 in a normal posture is illustrated. The example in (a) of FIG. 13 assumes that it is known in advance based on the height of the user that the user holds the camera D1303 at a height of 1500 mm above the ground, and a lighting fixture D01301 which emits light of the visible light data is installed at a position that is 3200 mm above the ground. Suppose then that the user takes a picture such that the lighting fixture D01301 is present at the center of the screen.

In this case, content of the location information on a subject stored in the subject data may be directly written (stored) into the "GPSLatitude" tag and the "GPSLongitude" tag as illustrated in (b) of FIG. 13. By doing so, in the case where the subject and a picture-taking location are close, approximate picture-taking location can be saved into a picture file (EXIF) as location information on the picture-taking location.

Furthermore, as illustrated in (c) of FIG. 13, the present location calculated based on the visible light data and the subject data may be written (stored) into the "GPSLatitude" tag and the "GPSLongitude" tag. More specifically, in the case where the subject data is ceiling lighting, the distance from the picture-taking location to the lighting can be estimated to some degree, and the posture of the mobile terminal at the time of taking the picture can be distinguished by the accelerometer, the geomagnetic sensor, or the like, the whole control unit D0011 back-calculates the present location of the mobile terminal from these pieces of data. It may then be that the whole control unit D0011 writes (stores) this present location obtained through the back calculation into the EXIF IFD tag related to the location information on the picture-taking location. In the example illustrated in (c) of FIG. 13, based on the fact that the height of the lighting fixture D01301 is stored as a <height> element in the subject data and that data on the posture of the mobile terminal including the camera D01303 indicates that an elevation angle is 45 degrees, it is possible to calculate a horizontal distance to the subject which is 1700 mm, with the result that its compensated value is written into the EXIF IFD tag (the "GPS Latitude" tag and the "GPSLongitude" tag).

Thus, in the case where no GPS information of the mobile terminal including the imaging unit used to take a picture for image data is saved in one tag in the EXIF IFD, the location information of the mobile terminal calculated based on the visible light data is stored into the tag in the EXIF IFD.

It is to be noted that a method of calculating the present location using a posture of the mobile terminal is not limited to the above example. The following describes a more versatile method of calculating the present location using a posture of the mobile terminal including a camera.

Figure 14:
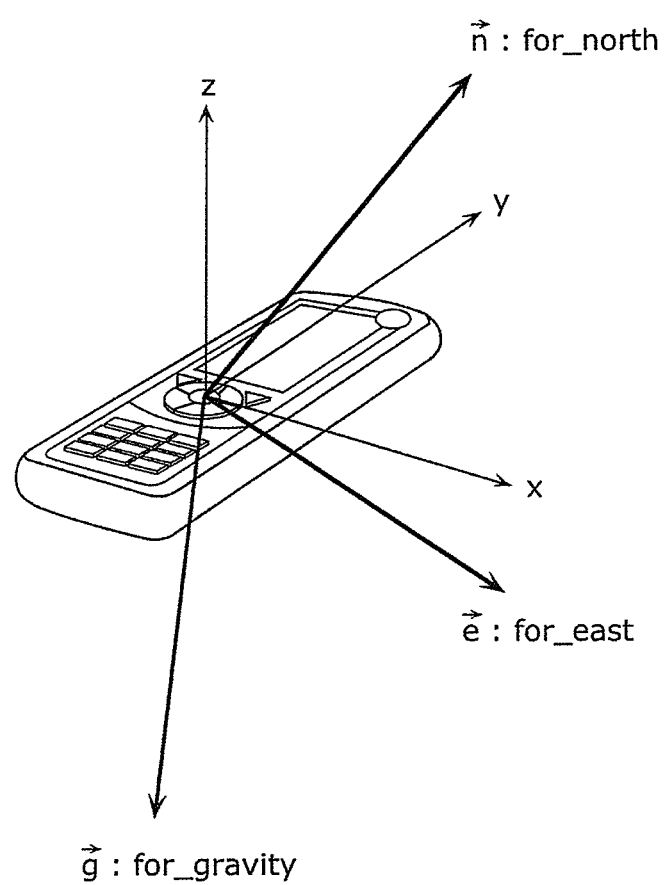
FIG. 14 is a view related to parameters indicating a posture of the mobile terminal in Embodiment 1.
Figure 15:
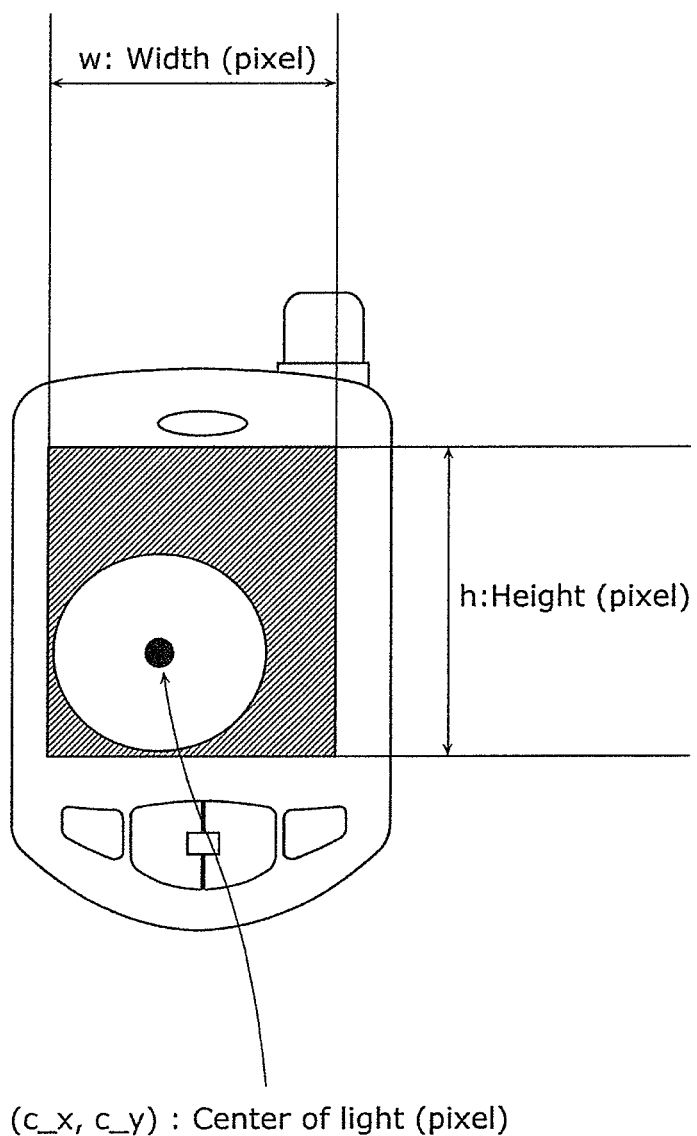
FIG. 15 is a view related to coordinates of a subject in the preview image of the mobile terminal in Embodiment 1.

FIG. 14 is an illustration related to parameters indicating a posture of the mobile terminal in Embodiment 1, and FIG. 15 is an illustration related to coordinates of a subject in the preview image of the mobile terminal in Embodiment 1. FIG. 16 illustrates an example of a computational expression for determining a relative location of the mobile terminal to the subject in Embodiment 1.

Using three parameters (three vectors) indicated in FIG. 14, a posture of the mobile terminal is represented. Here, vectors n, e, and g respectively indicate the northerly direction, the easterly direction, and the center-of-gravity direction obtained using the accelerometer and the geomagnetic sensor embedded in the mobile terminal. It is to be noted that all the vectors n, e, and g are vectors in a basis where y, x, and z represent upward and rightward from the screen of the mobile terminal and frontward that is perpendicular to the screen, respectively, as illustrated in FIG. 14.

Furthermore, using parameters indicated in FIG. 15, an image captured with a camera included the mobile terminal is represented. Here, w and h represent respective sizes (pixels) of a width and a height of an image captured with the camera included in the mobile terminal (the captured image), and coordinates of the subject within the captured image are represented by c_x and c_y.

In this case, a difference in location between the subject which emits visible light and the mobile terminal which receives the visible light can be calculated (determined) using the computational expression indicated in FIG. 16 where a vector p represents real-space coordinates.

In FIG. 16, M represents a transformation matrix, a vector I represents an orientation of the subject which emits visible light as viewed from the mobile terminal, and d' represents a distance between the screen of the mobile terminal and the subject in the case of using the screen of the mobile terminal as a reference (in the case of taking the slope of the screen of the mobile terminal into account). Furthermore, d represents a distance that is a difference in location between the subject and the mobile terminal in terms of height, that is, a distance from the mobile terminal to the subject in the vertical direction.

Furthermore, angle_v and angle_h represent respective view angles in the vertical and horizontal directions of the captured image, and tx and ty represent values obtained by normalizing the coordinates of the subject within the captured image of the mobile terminal. Therefore, θx and θy are parameters that represent in which direction the light (the visible light) from the subject is traveling relative to the mobile terminal.

Thus, using the parameters and the computational expression indicated in FIG. 16, the location information which is real-space coordinates of the mobile terminal as viewed from the subject can be determined based on the location information on where the subject is present as viewed from the mobile terminal.

Here, suppose that the mobile terminal includes an imaging element the size of which is 3.9 mm×6.9 mm with a focal length of 4.3 mm, an angle of view of 77.48 degrees on the long side, and an angle of view of 48.79 degrees on the short side. Furthermore, suppose that the coordinates within the captured image from which the visible light data is obtained in the situation illustrated in (a) of FIG. 13 are (b) of FIG. 7. In this case, the above parameters are set as follows: w=640, h=960, c_x=264, c_y=610, d=1.7 (m), angle_v=77.48 degrees, and angle_h=48.79 degrees.

Using these parameters, the vector p which represents easterly or westerly, southerly or northerly, and vertical directions from the subject can be determined, with the result that in combination with the location information in the subject data, the present location of the terminal can be calculated.

Thus, the present location can be calculated using a posture of the mobile terminal, making it possible to store picture-taking location information into a picture image even in a circumstance where GPS does not operate, such as indoor or immediately after power-on. This facilitates a later image search, which is an advantageous effect.

Here, the case of a failure to obtain location measurement information (GPS information) on the mobile terminal includes the following:
(1) a case, for example, where no location measurement function is included in the mobile terminal such as a non-GPS enabled camera; and
(2) a case of a failure to measure a location despite the location measurement function being included, such as being indoors where GPS does not operate, and a failure in WiFi location measurement.

Furthermore, if it is not the case of a failure to obtain the location measurement information (GPS information) on the mobile terminal, that is, even if the location measurement information is successfully obtained, it may also be possible to replace the location measurement information with the location information calculated based on the visible light data. Specifically, GPS-related location information in the EXIF may be replaced with the location information originated from the visible light, assuming that the present location information obtained from the visible light data is more reliable if any of the following conditions (1) to (3) is met:
(1) a case where a source of the received visible light (e.g., lighting, signage) is assumed to face directly downward, such as a case where the subject that emits the visible light is neither signage nor a spotlight, but is a lighting fixture such as a downlight or a ceiling light;
(2) a case, for example, where the accuracy of location measurement using the visible light is determined to be high since signage or a spotlight that emits the visible light is of as small a size as is less than 2 m in both length and width so that the visible light is not receivable from a far distance; and
(3) a case where, even though there is location measurement information of the mobile terminal, the accuracy of the location measurement information is expected to be low.

Here, in (3), the determination can be made based on a return value on API for checking the accuracy of obtained location information in the location measurement function provided in the platform of the mobile terminal. For example, in the case of Android, the estimated accuracy can be obtained in unit of meters in Location#getAccuracy( ) on API, with the result that the accuracy can be determined to be low when the return value on the API is greater than or equal to a certain value, for example, 5 m.

(Variation)

Figure 17:
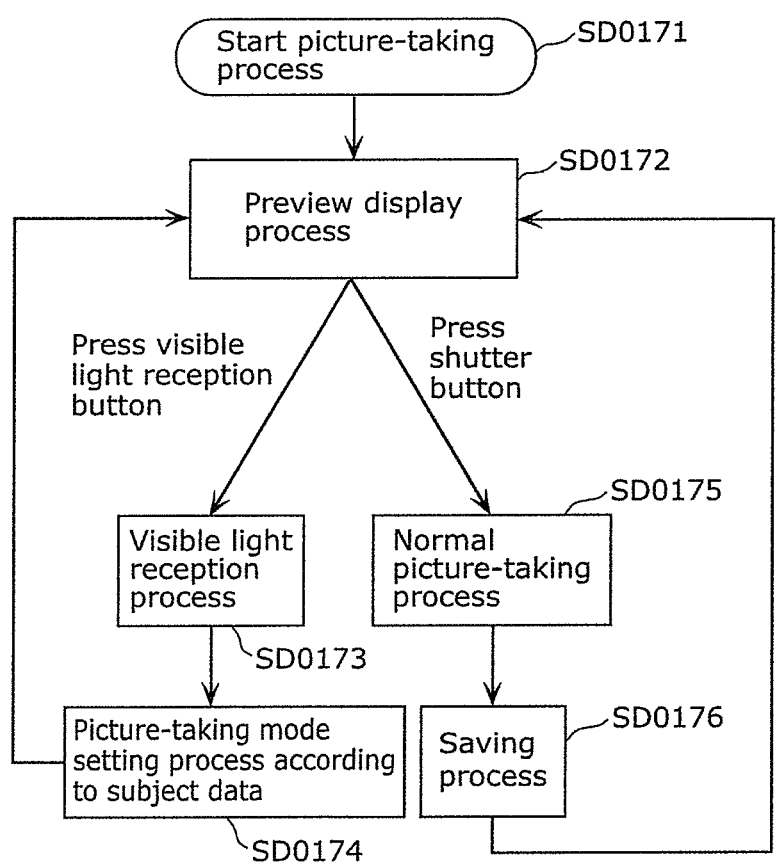
FIG. 17 illustrates an example of a sequence of a picture-taking process in a mobile terminal in Variation of Embodiment 1.
Figure 18:
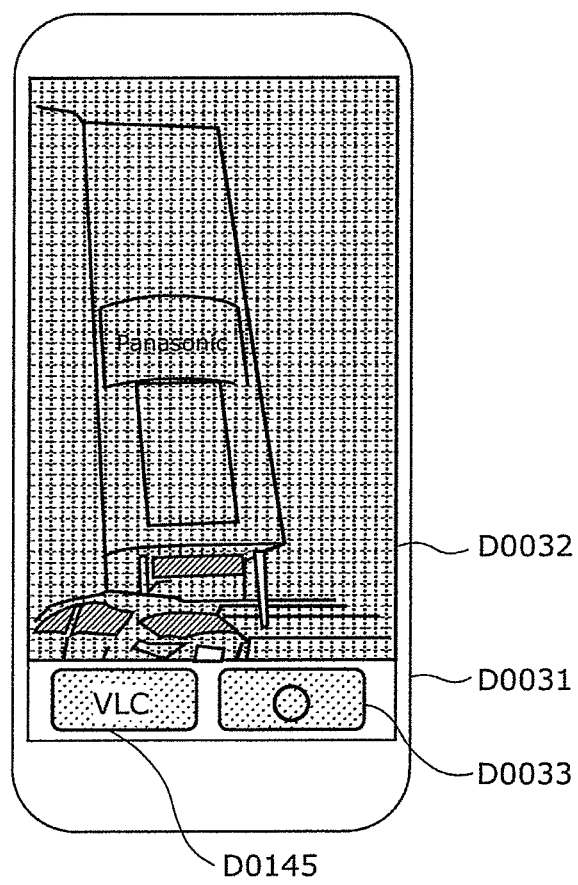
FIG. 18 illustrates an example of external appearance of the mobile terminal on which a preview image is displayed in Variation of Embodiment 1.

It is to be noted that although the whole control unit D0011 automatically performs the visible light reception process immediately after the normal picture-taking process in the above descriptions on this embodiment, this is not the only example. For example, the visible light reception process at the time of taking a picture may be performed explicitly by a user's operation. This case is described below with reference to the drawings. FIG. 17 illustrates an example of a sequence of a picture-taking process in a mobile terminal in Variation of Embodiment 1. FIG. 18 illustrates an example of external appearance of the mobile terminal on which a preview image is displayed in Variation of Embodiment 1.

In FIG. 17, first, a user instructs the mobile terminal D0010 to start a picture-taking process, and the picture-taking process is then started (Step SD0171).

The whole control unit D0011 performs a preview display process immediately after the start of the picture-taking process (Step SD0172), and then waits for the user to press down a picture-taking button. An example of a display screen of the terminal which appears during this preview display process is as illustrated in FIG. 18, for example. As with FIG. 3, FIG. 18 illustrates a casing D0031 of the mobile terminal D0010, and a display unit D0032 embedded in the mobile terminal D0010. Furthermore, on the display unit D0032, a software button D0033 for transition to picture-taking is displayed as a shutter button. In this variation, in addition to (at the same time as the presentation of) this software button D0033, a software button D0145 for issuing an instruction to receive the visible light data is displayed on the display unit D0032.

When the user touches the software button D0175 in Step D0172, the whole control unit D0011 performs the visible light reception process (Step SD0173). Here, the process performed in Step SD0173 is the same as the already-described visible light reception process in Step SD0024; therefore, a description thereof is omitted.

Next, in the case where the subject data is obtained as a result of completion of the visible light reception process in Step SD0172, the whole control unit D0011 sets a picture-taking mode according to that subject data when necessary (Step SD0174). Here, in the case, for example, where the subject is an indoor lighting fixture, processing such as changing a scene mode to an indoor setting is performed. Furthermore, in the case, for example, where the subject is an object the picture of which is assumed to be taken from a distance, such as a tall building, processing such as changing the scene mode to a landscape mode is performed. Furthermore, in a particular mode, it may, for example, be that processing such as setting coordinates of the subject obtained in the visible light reception process in Step SD0172 to be an auto focus region is performed, and the preview display process (Step D0172) is performed again.

On the other hand, when the user touches the software button D0033 in Step SD0172, the normal picture-taking process (Step SD0175) is performed, and the saving process is subsequently performed (Step SD0176). Here, since these processes are the same processes as in Step SD0024 and Step SD0025, descriptions thereof are omitted.

Thus, in this variation, the parameters at the time of taking a picture can be determined using the visible light data received from the subject, with the result that the picture can be taken with the setting appropriate for the subject, which is an advantageous effect.

It is to be noted that although the user operation for receiving the visible light data is performed using the software button in the above description on this variation, this is not the only example. It may also be, of course, that the user instructs the mobile terminal to receive the visible light data. For example, an operation of jiggling the mobile terminal, preparing a physical switch, and automatic execution of the visible light reception according to an operation performed immediately before the start of the camera are applicable.

Embodiment 2

In this embodiment, a system or the like having a login function that uses visible light communication is described.

Figure 19:
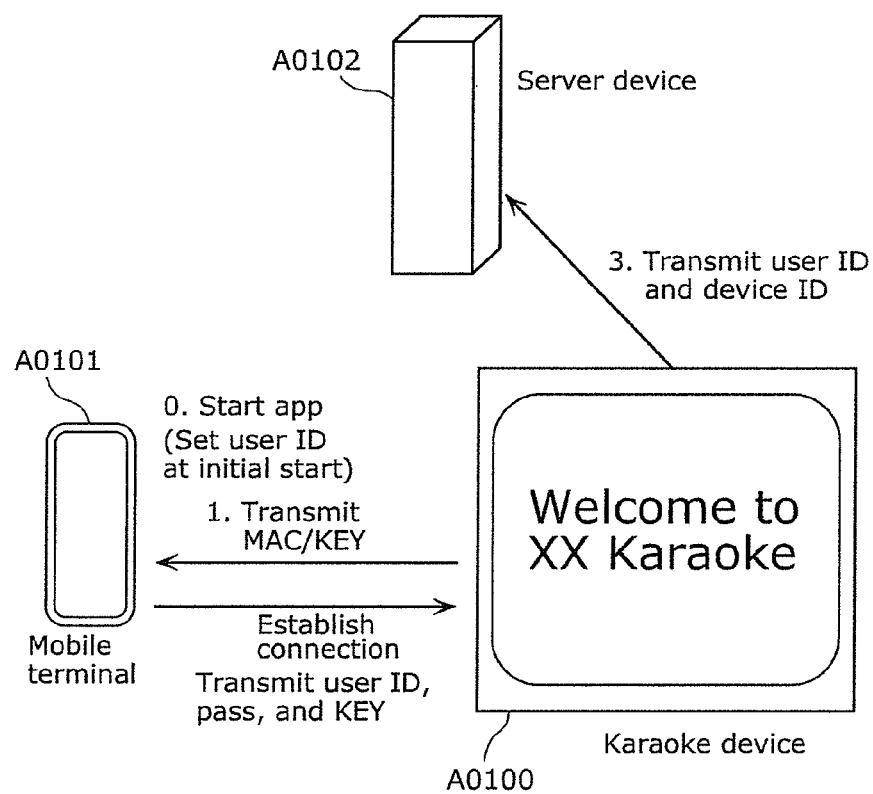
FIG. 19 illustrates a structure of a karaoke system having a login function that uses visible light communication in Embodiment 2.

FIG. 19 illustrates a structure of a karaoke system having a login function that uses visible light communication in Embodiment 2.

The karaoke system illustrated in FIG. 19 has a login function that uses visible light communication, and includes a karaoke device A0100, a mobile terminal A0101, and a server device A0102.

The following describes operations of the structural elements.

The karaoke device A0100 has a function of emitting visible light. The karaoke device A0100 transmits a MAC address and a KEY held by the karaoke device A0100 to the mobile terminal A0101 through the visible light communication.

Furthermore, the karaoke device A0100 receives a connection request from the mobile terminal A0101 via Bluetooth (registered trademark), establishes connection, and receives a user ID, a pass, and a KEY from the mobile terminal A0101.

The karaoke device A0100 compares the KEY received from the mobile terminal A101 and the KEY held by the karaoke device A0100, and when the both are equal, the karaoke device A0100 determines that the mobile terminal A0101 is a mobile terminal that is present in the space where the karaoke device A0100 is viewable, that is, the received request is a login request from a user within the same karaoke room as the karaoke device A0100. The karaoke device A0100 then sends out, to the server device A0102, the user ID and pass received from the mobile terminal A0101, to proceed with a login process.

[Structural Elements of Karaoke Device A0100]

Subsequently, structural elements of the karaoke device A0100 are described with reference to FIG. 20.

Figure 20:
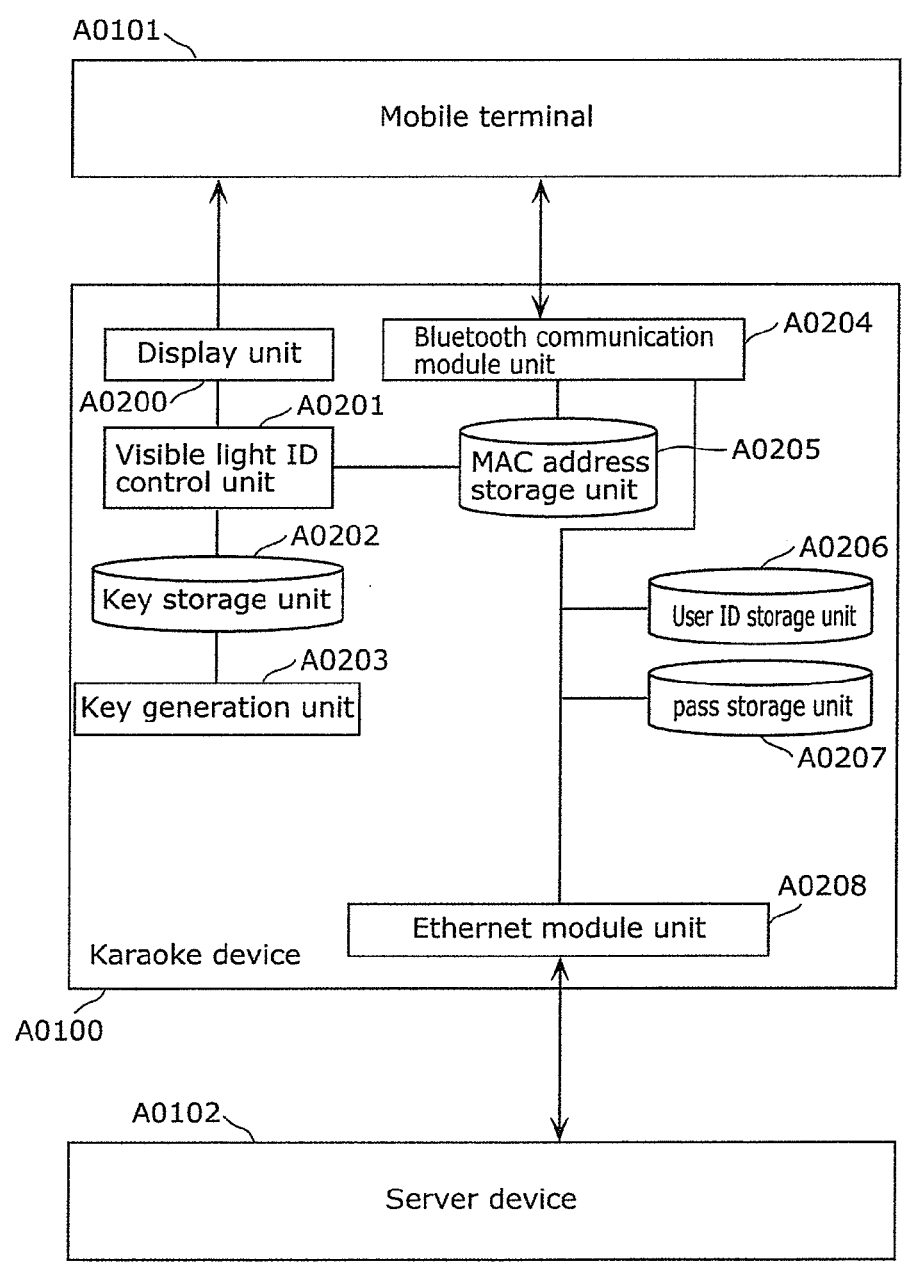
FIG. 20 illustrates an example of an internal structure of a karaoke device in Embodiment 2.

FIG. 20 illustrates an example of an internal structure of the karaoke device in Embodiment 2.

The karaoke device A0100 illustrated in FIG. 20 includes a display unit A0200, a visible light ID control unit A0201, a KEY storage unit A0202, a KEY generation unit A0203, a Bluetooth communication module unit A0204, a MAC address storage unit A0205, a user ID storage unit A0206, a pass storage unit A0207, and an Ethernet module unit A0208.

The following describes operations of the structural elements.

After the karaoke device A0100 is started, the KEY generation unit A0203 generates a KEY and stores the KEY into the KEY storage unit A0202.

Subsequently, the visible light ID control unit A0201 reads a MAC address from the MAC address storage unit A0205, further reads the KEY from the KEY storage unit A0202, and multiplexes these, thereby generating a visible light ID. The visible light ID control unit A0201 sends out, to the display unit A0200, an encoded signal resulting from encoding the visible light ID.

The display unit A0200 controls light emission based on the received encoded signal.

When receiving the Bluetooth connection request from the mobile terminal A0101, then the Bluetooth communication module unit A0204 performs processing to establish connection.

The Bluetooth communication module unit A0204 receives the KEY, the user ID, and the pass from the mobile terminal A0101. Only when the received KEY is equal to the KEY stored in the KEY storage unit A0202, does the Bluetooth communication module unit A0204 store the user ID into the user ID storage unit A0206 and the pass into the pass storage unit A0207. The Bluetooth communication module unit A0204 sends out the user ID and the pass to the server device A0102 via the Ethernet module unit A0208.

[Structural Elements of Mobile Terminal A0101]

Subsequently, structural elements of the mobile terminal A0101 are described with reference to the drawings.

Figure 21:
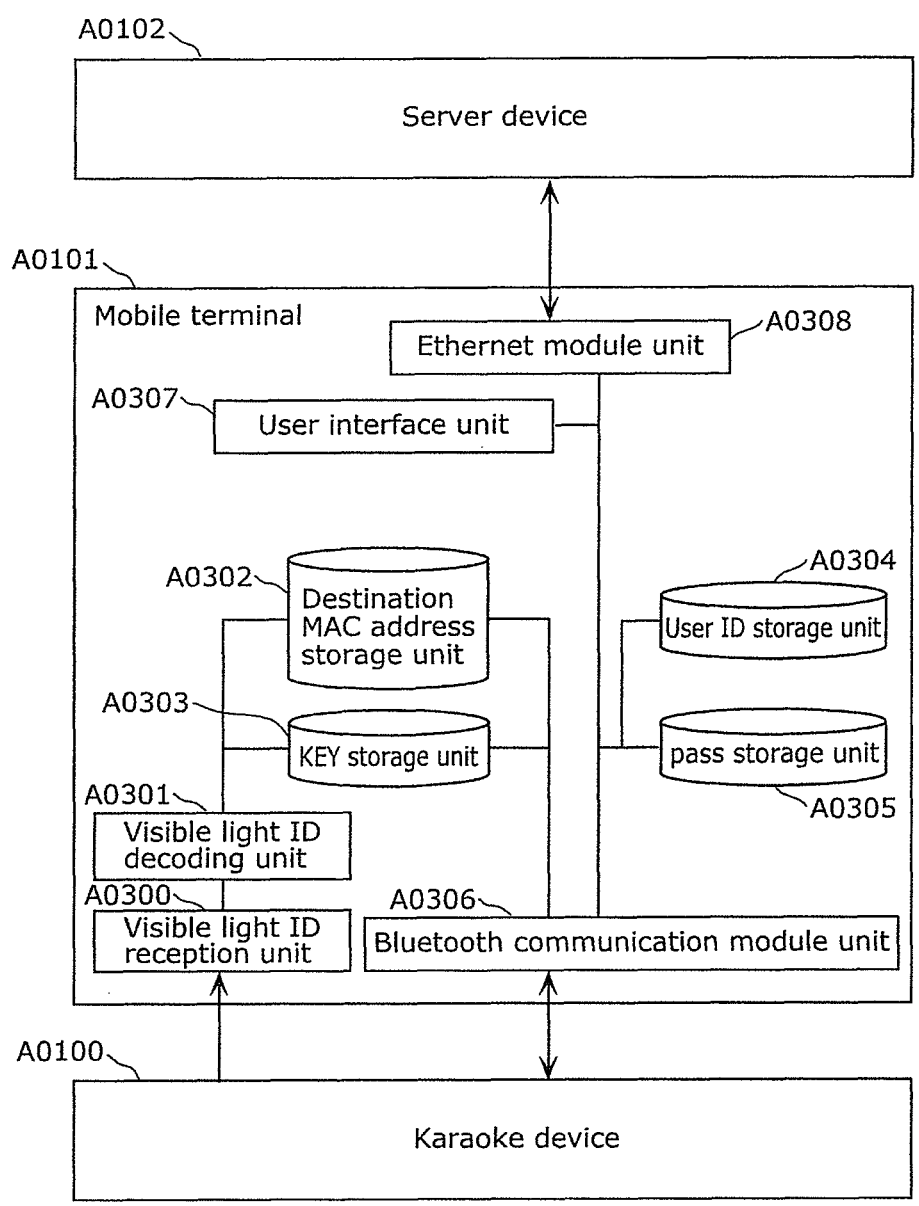
FIG. 21 illustrates an example of an internal structure of a mobile terminal in Embodiment 2.
Figure 22:
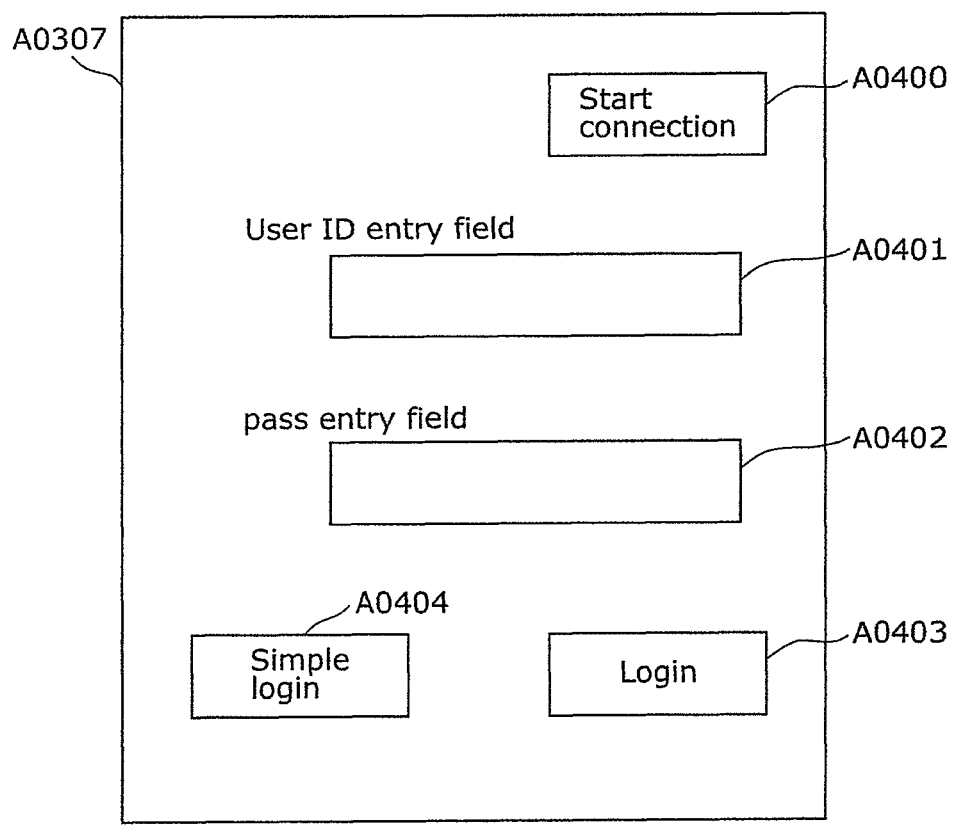
FIG. 22 illustrates an example of an overview of a login screen on a user interface unit in Embodiment 2.
Figure 23:
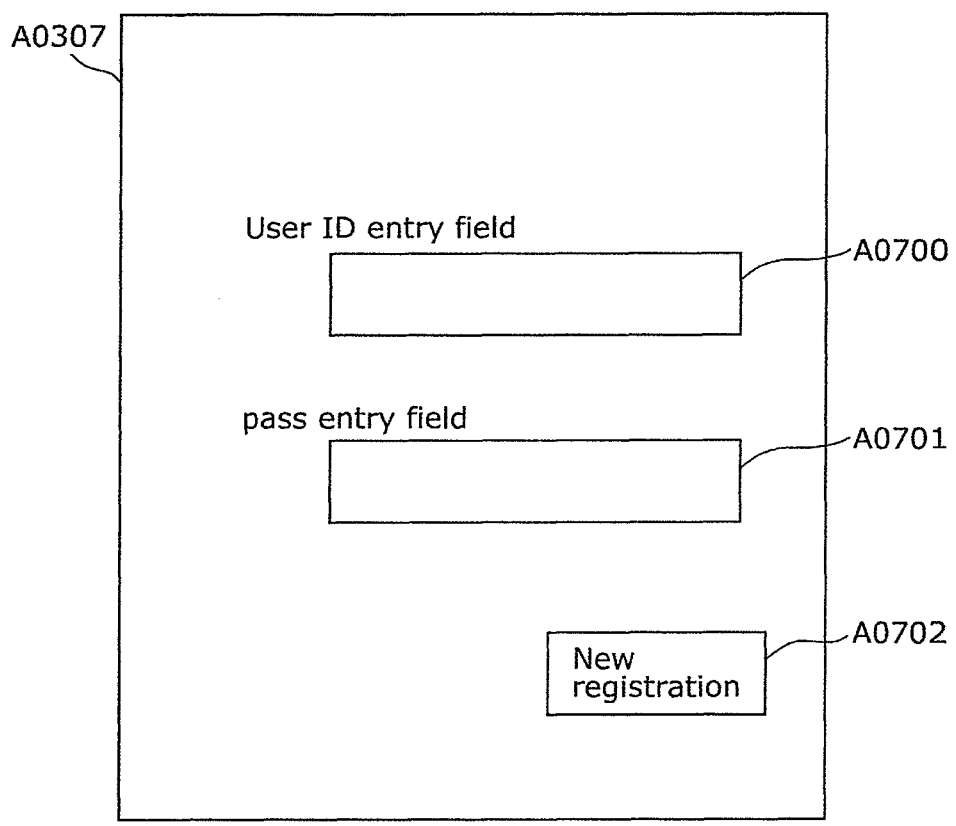
FIG. 23 illustrates an example of an overview of a new-registration screen on the user interface unit in Embodiment 2.

FIG. 21 illustrates an example of an internal structure of the mobile terminal in Embodiment 2. FIG. 22 illustrates an example of an overview of a login screen on a user interface unit in Embodiment 2. FIG. 23 illustrates an example of an overview of a new-registration screen on the user interface unit in Embodiment 2.

The mobile terminal A0101 illustrated in FIG. 21 includes a visible light ID reception unit A0300, a visible light ID decoding unit A0301, a destination MAC address storage unit A0302, a KEY storage unit A0303, a user ID storage unit A0304, a pass storage unit A0305, a Bluetooth communication module unit A0306, a user interface unit A0307, and an Ethernet module unit A0308.

The user interface unit A0307 displays, at the time of a login operation, at least a connection start button A0400, a user ID entry field A0401, a PASS entry field A0402, and a login button A0403 as illustrated in FIG. 22, for example. Here, the connection start button A0400 is a button that serves as a trigger for starting a connection start request. The user ID entry field A0401 is an entry field in which a user ID is entered, and the PASS entry field A0402 is an entry field in which a PASS is entered. The login button A0403 is a button that serves as a trigger for performing a login process.

The user interface unit A0307 may further display, at the time of a login operation, a simple login button A0404 serving as a trigger for performing a login process using a user ID and a pass stored in advance. It is to be noted that at the point in time when the mobile terminal A0101 is started, the user interface unit A0307 maintains all of the connection start button A0400, the login button A0403, and the simple login button A0404 in the state of being unable to be pressed.

The user interface unit A0307 further displays, at the time of new user registration, at least a user ID entry field A0700, a PASS entry field A0701, and a new-registration button A0702 as illustrated in FIG. 23, for example. Here, the user ID entry field A0700 is an entry field in which a user ID is entered, and the PASS entry field A0701 is an entry field in which a PASS is entered. The new-registration button A0702 is a button that serves as a trigger for performing a new user registration process.

The following describes operations of the structural elements.

First, the operations seen in the case of using the mobile terminal A0101 in advance preparation are described.

Suppose that a user presses the new-registration button A0702, that is, a login request is issued by the user interface unit A0307, with the user ID entry field A0700 filled in with a user ID and the PASS entry field A0701 filled in with a PASS by the user. In this case, the user interface unit A0307 stores the user ID into the user ID storage unit A0304 and the PASS into the pass storage unit A0305. The Ethernet module unit A0308 sends out, to the server device A0102, the user ID stored in the user ID storage unit A0304 and the pass stored in the pass storage unit A0305.

Next, the operations seen in the case of using the mobile terminal A0101 in a karaoke room are described.

The visible light ID reception unit A0300 has a function equivalent to that of an imaging unit, and is rendered capable of receiving visible light by setting its shutter speed to be fast after start up. When receiving an encoded signal from the karaoke device A0100, then the visible light ID reception unit A0300 sends out the received encoded signal to the visible light ID decoding unit A0301.

The visible light ID decoding unit A0301 decodes the encoded signal, extracts the MAC address and the KEY, and stores the MAC address into the destination MAC address storage unit A0302 and the KEY into the KEY storage unit A0303.

The user interface unit A0307 then updates and places the connection start button A0400 in the state of being able to be pressed.

Here, suppose that the connection start button A0400 on the user interface unit A0307 is pressed by a user, that is, a connection request is received from the user interface unit A0307. In this case, the Bluetooth communication module unit A0306 issues a connection request to a device that has the MAC address indicated by the destination MAC address storage unit A0302, that is, the karaoke device A0100, to establish connection. After the connection is established, the user interface unit A0307 updates and places the login button A0403 and the simple login button A0404 in the state of being able to be pressed.

On the other hand, suppose that a user presses the login button A0403, that is, a login request is issued by the user interface unit A0307, with the user ID entry field A0401 filled in with a user ID and the PASS entry field A0402 filled in with a PASS by the user. In this case, the user interface unit A0307 stores the user ID into the user ID storage unit A0304 and the PASS into the pass storage unit A0305. The Bluetooth communication module unit A0306 sends out, to the karaoke device A0100, the KEY stored in the KEY storage unit A0303, the user ID stored in the user ID storage unit A0304, and the pass stored in the pass storage unit A0305.

[Structural Elements of the Server Device A0102]

Subsequently, structural elements of the server device A0102 are described with reference to the drawings.

Figure 24:
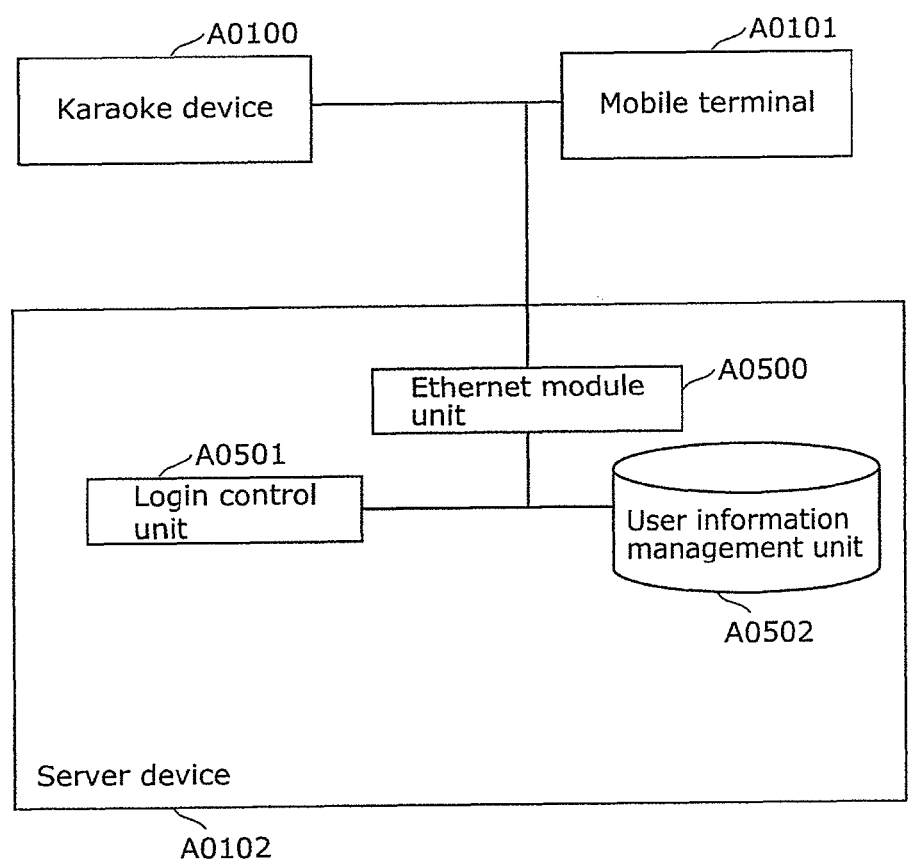
FIG. 24 illustrates an example of an internal structure of a server device in Embodiment 2.
Figure 25:
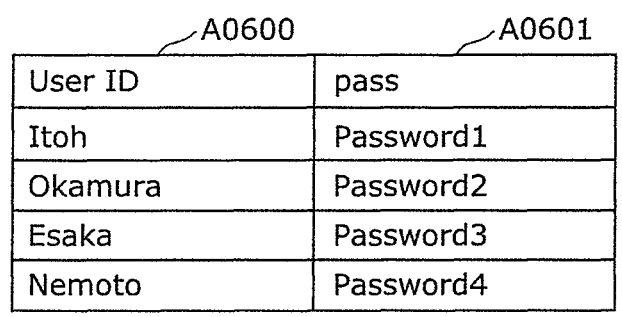
FIG. 25 illustrates an example of information managed by a user information management unit in Embodiment 2.

FIG. 24 illustrates an example of an internal structure of the server device in Embodiment 2. FIG. 25 illustrates an example of information managed by a user information management unit in Embodiment 2.

The server device A0102 illustrated in FIG. 24 includes at least an Ethernet module unit A0500, a login control unit A0501, and a user information management unit A0502.

The user information management unit A0502 has a structure as illustrated in FIG. 25, thereby managing information. The user information management unit A0502 manages at least user IDs indicated in a column A0600 and passes indicated in a column A0601 and corresponding to the user IDs.

When the Ethernet module unit A0500 receives a user ID and a pass from the mobile terminal A0101, then the login control unit A0501 adds a set of the received user ID and the received pass to the user information management unit A0502. On completion of the addition process by the login control unit A0501, the Ethernet module unit A0500 returns a notification of completion of registration to the mobile terminal A0101.

When the Ethernet module unit A0500 receives a user ID and a pass from the karaoke device A0100, the login control unit A0501 refers to the columns of user IDs and passes stored in the user information management unit A0502. When a set of the received user ID and the received pass is present in the user information management unit A0502, the login control unit A0501 deems login for the user ID completed.

[Operations of Server Device A0102]

Subsequently, an operation procedure of the structural elements is described.

[Flow for New User Registration]

Figure 26:
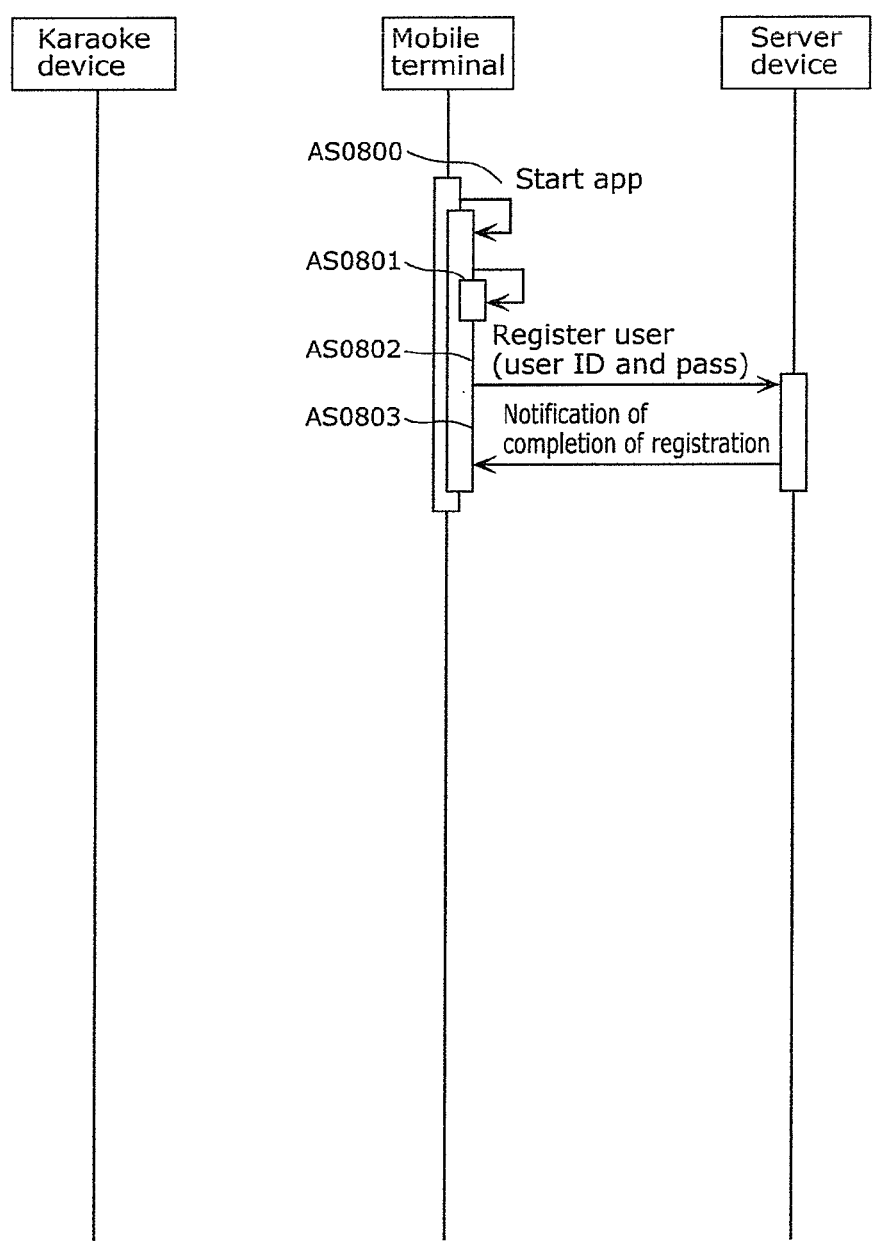
FIG. 26 illustrates an example of a flow for new user registration in Embodiment 2.

The following describes, first, a flow for new user registration with reference to FIG. 26. Here, FIG. 26 illustrates an example of a flow for new user registration in Embodiment 2.

First, after a user starts an app on the mobile terminal A0101, a user interface unit new-registration screen illustrated in FIG. 25 appears (AS0800).

Next, suppose that the user presses the new-registration button A0702, that is, a login request is issued by the user interface unit A0307, with the user ID entry field A0700 filled in with a user ID and the PASS entry field A0701 filled in with a PASS by the user.

The user interface unit A0307 then stores the user ID into the user ID storage unit A0304 and the PASS into the pass storage unit A0305 (AS0801).

Next, the Ethernet module unit A0308 sends out, to the server device A0102, the user ID stored in the user ID storage unit A0304 and the pass stored in the pass storage unit A0305, that is, attempting a user registration process (AS0802).

Next, when the Ethernet module unit A0500 receives a user ID and a pass from the mobile terminal A0101, then the login control unit A0501 adds a set of the received user ID and the received pass to the user information management unit A0502. On completion of the addition process by the login control unit A0501, the Ethernet module unit A0500 returns a notification of completion of registration to the mobile terminal A0101 (AS0803).

[Flow for Login]

Figure 27:
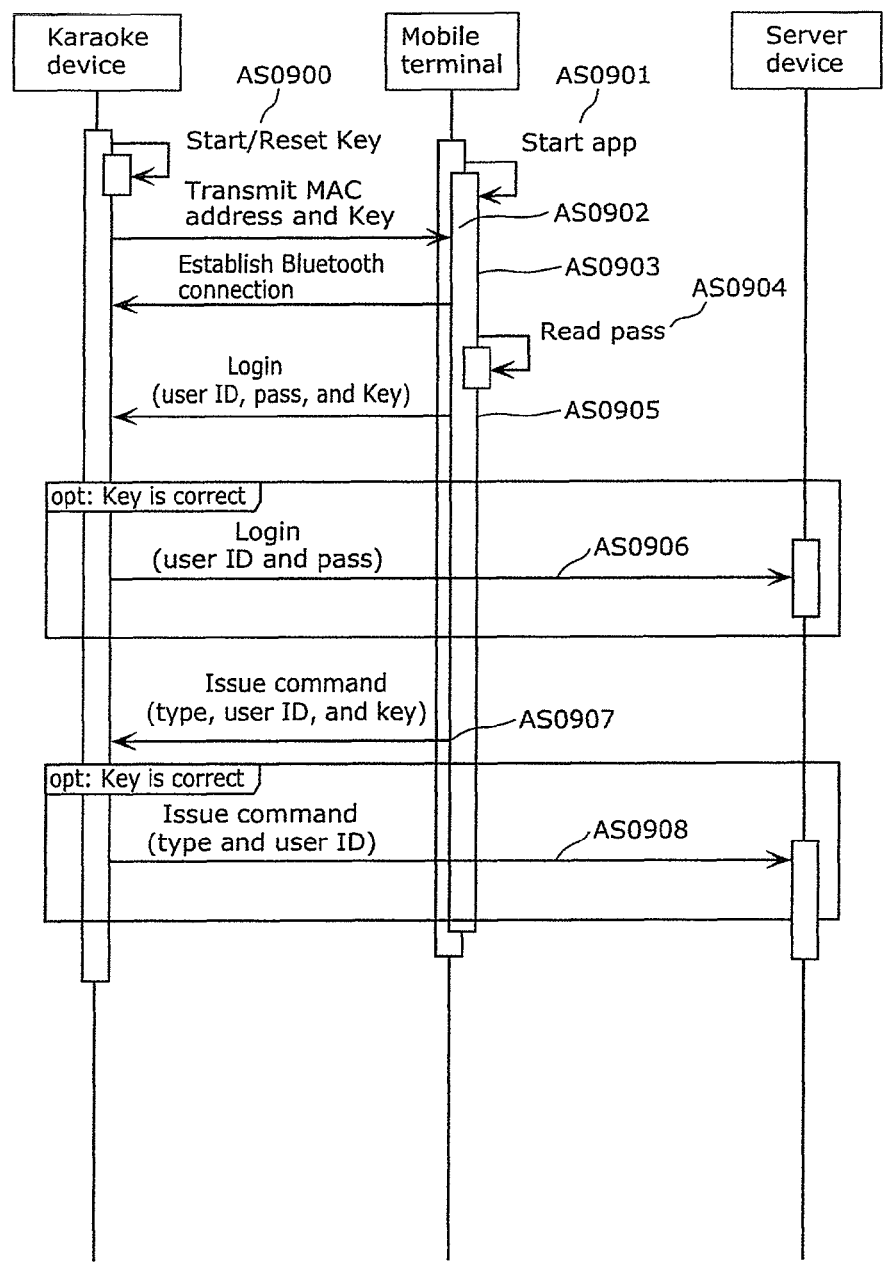
FIG. 27 illustrates an example of a flow for login in Embodiment 2.

Subsequently, a flow for login is described with reference to FIG. 27. Here, FIG. 27 illustrates an example of a flow for login in Embodiment 2.

First, the karaoke device A0100 is powered on in advance and performs a startup process.

Next, after the karaoke device A0100 is started, the KEY generation unit A0203 generates a KEY using random numbers and stores the KEY into the KEY storage unit A0202 (AS0900).

Furthermore, the user starts an app on the mobile terminal A0101 to enable reception of visible light (AS0901).

The visible light ID control unit A0201 then reads a MAC address from the MAC address storage unit A0205, further reads the KEY from the KEY storage unit A0202, multiplexes these to generate a visible light ID, and sends out, to the display unit A0200, an encoded signal resulting from encoding the visible light ID. The display unit A0200 controls light emission based on the received encoded signal (AS0902).

Next, the visible light ID reception unit A0300 has a function equivalent to that of an imaging unit, and is rendered capable of signal reception by setting its shutter speed to be fast after start up, and when receiving the encoded signal from the karaoke device A0100, then sends out the received encoded signal to the visible light ID decoding unit A0301. The visible light ID decoding unit A0301 decodes the encoded signal, extracts the MAC address and the KEY, and stores the MAC address into the destination MAC address storage unit A0302 and the KEY into the KEY storage unit A0303. The user interface unit A0307 then updates and places the connection start button A0400 in the state of being able to be pressed. Subsequently, when the connection start button A0400 on the user interface unit A0307 is pressed by the user, that is, when a connection request is received from the user interface unit A0307, the Bluetooth communication module unit A0306 issues a connection request to a device that has the MAC address indicated by the destination MAC address storage unit A0302, that is, the karaoke device A0100, to establish connection (AS0903).

Next, after the connection is established, the user interface unit A0307 updates and places the login button A0403 and the simple login button A0404 in the state of being able to be pressed.

Here, further suppose that a user presses the login button A0403, that is, a login request is issued by the user interface unit A0307, with the user ID entry field A0401 filled in with a user ID and the PASS entry field A0402 filled in with a PASS by the user. In this case, the user interface unit A0307 stores the user ID into the user ID storage unit A0304 and the PASS into the pass storage unit A0305, and the Bluetooth communication module unit A0306 reads the KEY stored in the KEY storage unit A0303, the user ID stored in the user ID storage unit A0304, and the pass stored in the pass storage unit A0305 (AS0904) and sends these out to the karaoke device A0100 (AS0905).

On the other hand, suppose that a user presses the simple login button A0404, that is, a simple login request is issued by the user interface unit A0307. In this case, the Bluetooth communication module unit A0306 reads the KEY stored in the KEY storage unit A0303, the user ID stored in the user ID storage unit A0304, and the pass stored in the pass storage unit A0305 (SA0904) and sends these out to the karaoke device A0100 (SA0905).

Next, when receiving the user ID and the pass from the mobile terminal A0101, then the Bluetooth communication module unit A0204 stores the user ID into the user ID storage unit A0206 and the pass into the pass storage unit A0207 only when the received KEY is equal to the KEY stored in the KEY storage unit A0202, and the Ethernet module unit A0208 then sends out the user ID and the pass to the server device A0102 (AS0906).

Next, when the Ethernet module unit A0500 receives a user ID and a pass from the karaoke device A0010, the login control unit A0105 refers to the columns of user IDs and passes stored in the user information management unit A0502. When a set of the received user ID and the received pass is present in the user information management unit A0502, the login control unit A0501 deems login for the user ID completed.

After that, when the mobile terminal A0101 issues commands necessary to perform various processes such as selection of a track and displaying of a menu for ranking, the mobile terminal A0101 transmits, to the karaoke device A0100, issuance of a command which includes a command type, a user ID, and a KEY as a set (AS0907). Only when the received KEY is equal to the KEY stored in the KEY storage unit A0202, does the karaoke device A0100 send out, to the server device A0102, the issuance of a command which includes the command type and the user ID as a set (AS0908).

In the manner as above, logging in to the server device A0102 and the following command processing are performed using the mobile terminal A0101 via the karaoke device A0100.

[Effect]

As above, the communication method in this embodiment is a communication method used by a system including a mobile terminal and a device, which includes: performing, by the mobile terminal, visible light communication with the device, thereby obtaining a KEY held by the device and an identifier uniquely identifying the device; issuing, by the mobile terminal, a connection request via wireless communication to the device identified by the obtained identifier, using the KEY obtained in the performing; and establishing connection between the mobile terminal and the device when the KEY generated by the device matches the KEY transmitted in the issuing by the mobile terminal to the device.

Furthermore, for example, the communication method in this embodiment may further include: issuing, by the device, a KEY issuance request together with the identifier to a server device; and issuing, by the server device, the KEY associated with the identifier, and transmitting the KEY from the server device to the device.

Furthermore, for example, in the communication method in this embodiment, the establishing may further include inputting an ID uniquely identifying a user of the mobile terminal and a password for establishing the connection using the ID.

Therefore, according to the communication method used by the system having a login function in this embodiment, it is possible to accept login only from a terminal that is capable of viewing and recognizing the karaoke device, that is, a terminal that is present inside the same room as the karaoke device. This simplifies the login process on a specific karaoke device and further eliminates unauthorized login from other rooms, which are advantageous effects.

It is to be noted that although this embodiment has been described assuming that the visible light ID reception unit A0300 operates constantly while the mobile terminal A0101 is active, this is not the only example. The visible light ID reception unit A0300 may switch between operating and nonoperating according to a state of the mobile terminal A0101. For example, it may be that an accelerometer embedded in the mobile terminal A0101 determines whether the mobile terminal A0101 is close to horizontal or vertical, and the visible light ID reception unit A0300 of the mobile terminal A0101 is configured to operate only when the mobile terminal A0101 is close to vertical, that is, the visible light ID reception unit A0300 is likely to be positioned to face toward a display in front. Furthermore, for example, taking advantage of excess hardware resources obtained by switching the visible light ID reception unit A0300 to a non-operating mode, other hardware resources, such as a secondary imaging unit, may be caused to operate.

Embodiment 3

Embodiment 2 has described the system or the like having the login function that uses Bluetooth (registered trademark) together with the visible light communication. In this embodiment, a system or the like having a login function that uses the visible light communication, but without using Bluetooth (registered trademark) is described.

Figure 28:
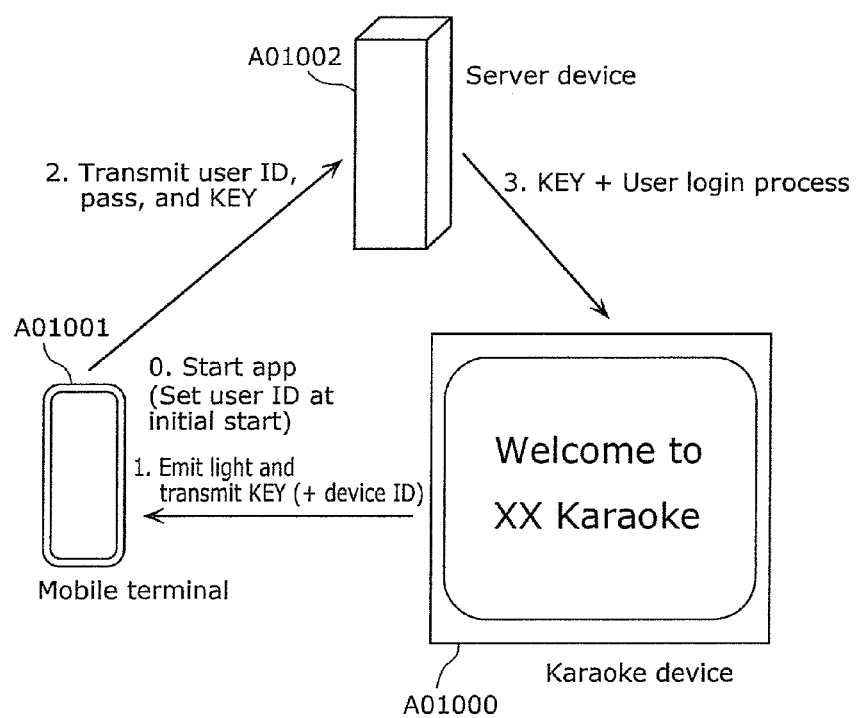
FIG. 28 illustrates a structure of a karaoke system having a login function that uses visible light communication in Embodiment 3.

FIG. 28 illustrates a structure of a karaoke system having a login function that uses visible light communication in Embodiment 3.

The karaoke system illustrated in FIG. 28 has a login function that uses visible light communication, and includes a karaoke device A01000, a mobile terminal A01001, and a server device A01002.

The following describes operations of the structural elements.

The karaoke device A01000 includes a means of communication with the server device A01002; when the karaoke device A01000 transmits, to the server device A01002, device identification information which uniquely identifies the karaoke device, the server device A01002 transmits a KEY to the karaoke device A01000. Furthermore, the karaoke device A01000 has a function of emitting visible light and transmits the KEY and the device identification information held by the karaoke device A01000 to the mobile terminal A01001 through the visible light communication.

The mobile terminal A01001 is connectable to the server device A01002 and transmits a KEY, a user ID, and a pass to the server device A01002.

After that, when the mobile terminal A01001 transmits various commands and the KEY to the server device A01002, the server device A01002 transmits a command to the karaoke device A01000 that has the device identification information associated with the KEY, and the karaoke device A01000 updates the content displayed on the display according to the received commands.

[Structural Elements of Karaoke Device A01000]

Subsequently, structural elements of the karaoke device A01000 are described with reference to FIG. 29.

Figure 29:
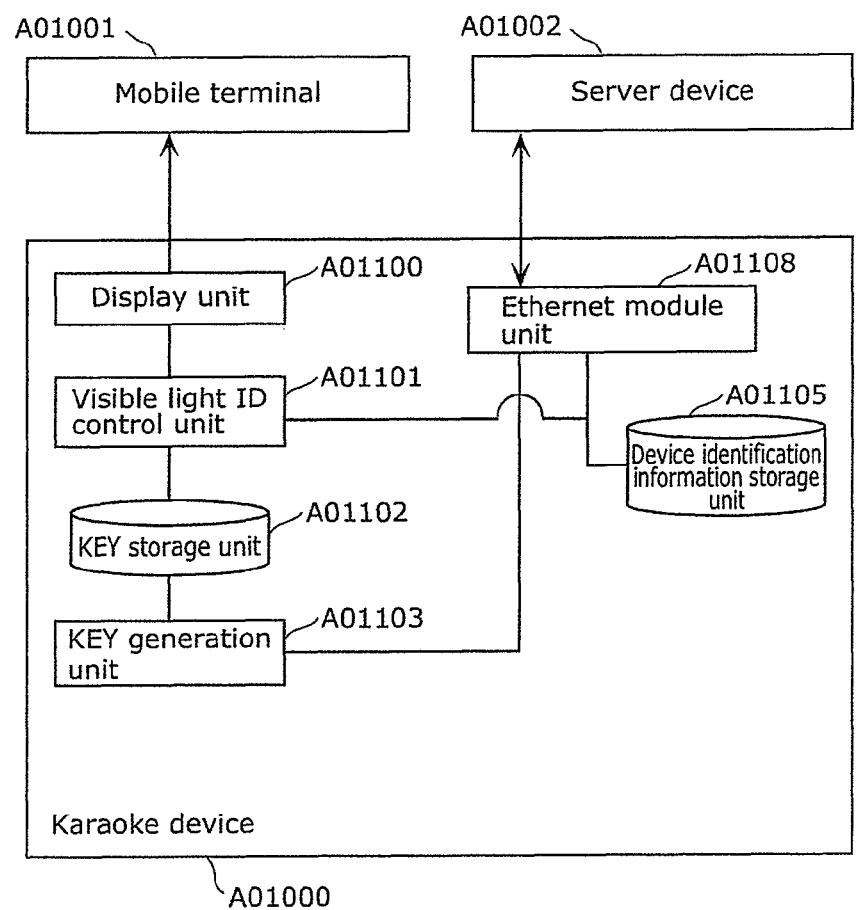
FIG. 29 illustrates an example of an internal structure of a karaoke device in Embodiment 3.

FIG. 29 illustrates an example of an internal structure of the karaoke device in Embodiment 2.

The karaoke device A01000 illustrated in FIG. 29 includes a display unit A01100, a visible light ID control unit A01101, a KEY storage unit A01102, a KEY generation unit A01103, a device identification information storage unit A01105, and an Ethernet module unit A01108.

The following describes operations (behaviors) of the structural elements in detail.

After the karaoke device A01000 is started, the Ethernet module unit A01108 sends out, to the server device A01002, the device identification information stored in advance in the device identification information storage unit A01105.

When the Ethernet module unit A01108 receives a KEY from the server device A01002, then the KEY generation unit A01103 receives the KEY from the Ethernet module unit 01108 and stores the KEY into the KEY storage unit A01102. Furthermore, when receiving a notification of a login success view from the server device A01002, then the Ethernet module unit A01108 updates the content that is outputted by the display unit A01100, to let a user know that the login was successful.

The visible light ID control unit A01101 reads the device identification information from the device identification address storage unit A01105, further reads the KEY from the KEY storage unit A01102, and multiplexes these, thereby generating a visible light ID. The visible light ID control unit A01101 sends out, to the display unit A01100, an encoded signal resulting from encoding the visible light ID.

The display unit A01100 controls light emission based on the received encoded signal.

[Structural Elements of Mobile Terminal A01001]

Subsequently, structural elements of the mobile terminal A01001 are described in detail with reference to the drawings.

Figure 30:
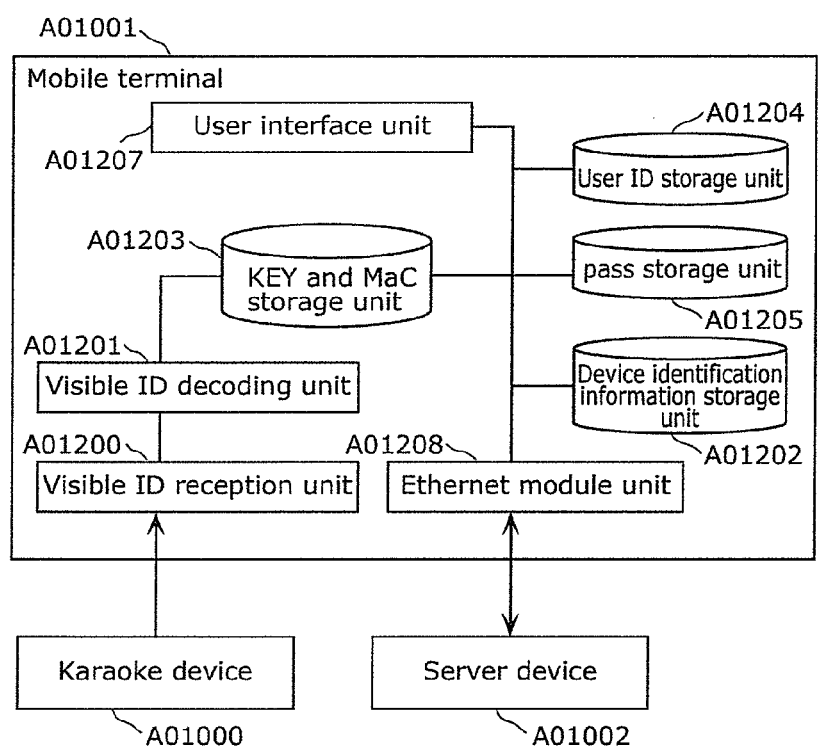
FIG. 30 illustrates an example of an internal structure of a mobile terminal in Embodiment 3.
Figure 31:
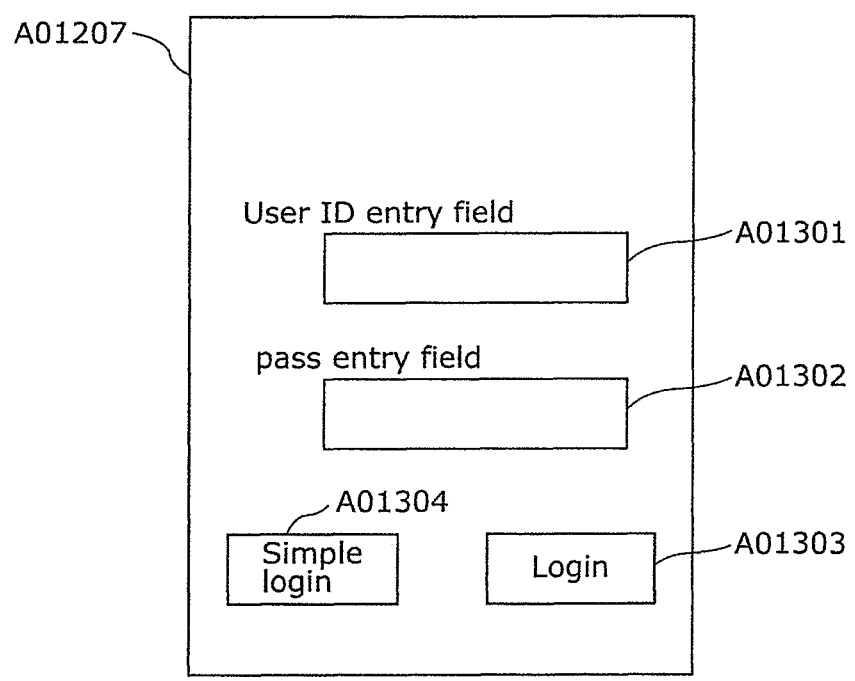
FIG. 31 illustrates an example of an overview of a login screen on a user interface unit in Embodiment 3.

FIG. 30 illustrates an example of an internal structure of the mobile terminal in Embodiment 3. FIG. 31 illustrates an example of an overview of a login screen on a user interface unit in Embodiment 3.

The mobile terminal A01001 illustrated in FIG. 30 includes a visible light ID reception unit A01200, a visible light ID decoding unit A01201, a device identification information storage unit A01202, a KEY storage unit A01203, a user ID storage unit A01204, a pass storage unit A01205, a user interface unit A01207, and an Ethernet module unit A01208.

The user interface unit A01207 displays, at the time of a login operation, at least a user ID entry field A01301, a PASS entry field A01302, and a login button A01303 as illustrated in FIG. 31, for example. Here, the user ID entry field A01301 is an entry field in which a user ID is entered, and the PASS entry field A01302 is an entry field in which a PASS is entered. The login button A01303 is a button that serves as a trigger for performing a login process. Here, the user interface unit A01207 may further display, at the time of a login operation, a simple login button A01304 serving as a trigger for performing a login process using a user ID and a pass stored in advance. It is to be noted that at the point in time when the mobile terminal A01001 is started, the user interface unit A01207 maintains both the login button A01303 and the login button A01304 in the state of being unable to be pressed.

Furthermore, as illustrated in FIG. 23, for example, the user interface unit A01207 further includes, at the time of new user registration, at least a user ID entry field A0700, a PASS entry field A0701, and a new-registration button A0702, as with the user interface unit A0307 in Embodiment 2.

The following describes operations of the structural elements.

First, the operations seen in the case of using the mobile terminal A01001 in advance preparation are described.

Suppose that a user presses the new-registration button A0702, that is, a login request is issued by the user interface unit A01207, with the user ID entry field A0700 filled in with a user ID and the PASS entry field A0701 filled in with a PASS by the user. In this case, the user interface unit A01207 stores the user ID into the user ID storage unit A01204 and the PASS into the pass storage unit A01205. The Ethernet module unit A01208 sends out, to the server device A01002, the user ID stored in the user ID storage unit A01204 and the pass stored in the pass storage unit A01205.

Next, the operations seen in the case of using the mobile terminal A01001 in a karaoke room are described.

When receiving an encoded signal from the karaoke device A01000, then the visible light ID reception unit A01200 sends out the received encoded signal to the visible light ID decoding unit A01201.

The visible light ID decoding unit A01201 decodes the encoded signal, extracts the device identification information and the KEY, and stores the device identification information into the device identification information storage unit A01202 and the KEY into the KEY storage unit A01203.

The user interface unit A01207 then updates and places the login button A01303 and the simple login button A01304 in the state of being able to be pressed.

Here, suppose that a user presses the login button A01303, that is, a login request is issued by the user interface unit A01207, with the user ID entry field A01301 filled in with a user ID and the PASS entry field A01302 filled in with a PASS by the user. In this case, the user interface unit A01207 stores the user ID into the user ID storage unit A01204 and the PASS into the pass storage unit A01205. The Ethernet module unit A01208 reads the device identification information stored in the device identification information storage unit A01202, the KEY stored in the KEY storage unit A01203, the user ID stored in the user ID storage unit A01204, and the pass stored in the pass storage unit A01205, and sends these out to the server device A01002.

On the other hand, suppose that a user presses the simple login button A01304, that is, a simple login request is issued by the user interface unit A01207. In this case, the Ethernet module unit A01208 reads the device identification information stored in the device identification information storage unit A01202, the KEY stored in the KEY storage unit A01203, the user ID stored in the user ID storage unit A01204, and the pass stored in the pass storage unit A01205, and sends these out to the server device A01002.

[Structural Elements of the Server Device A01002]

Subsequently, structural elements of the server device A01002 are described with reference to the drawings.

Figure 32:
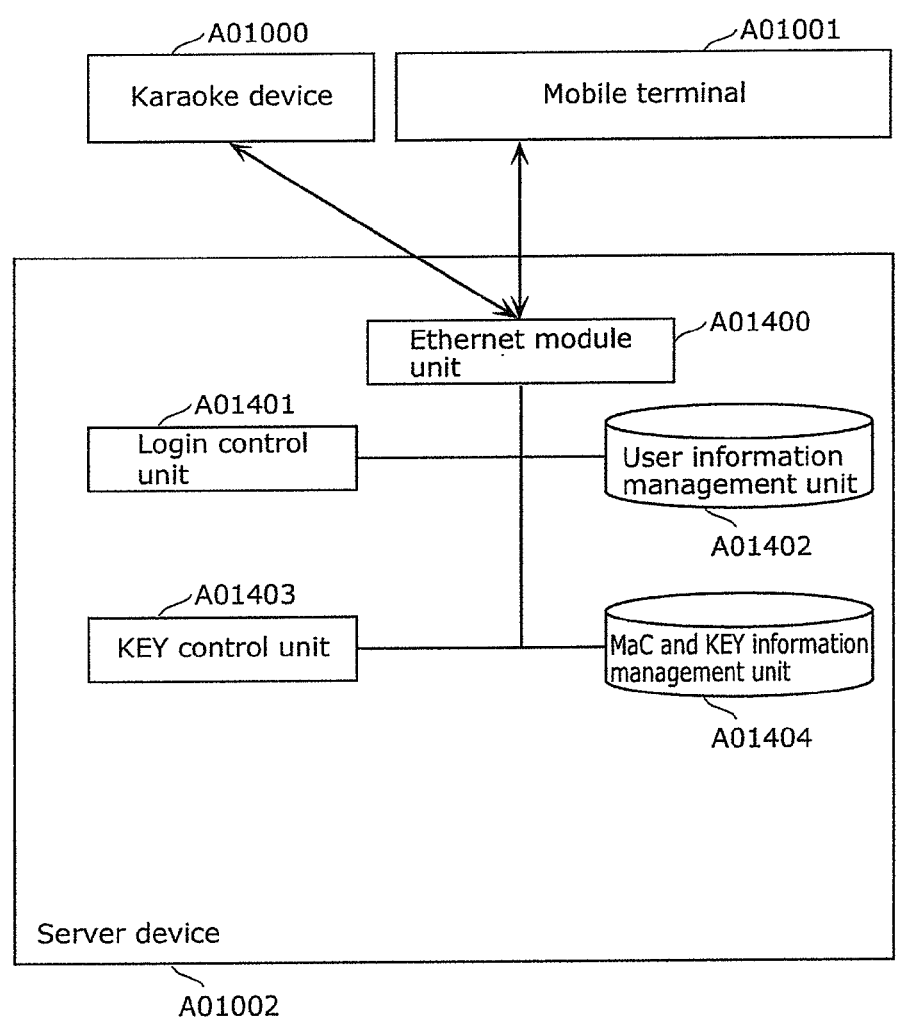
FIG. 32 illustrates an example of an internal structure of a server device in Embodiment 3.

FIG. 32 illustrates an example of an internal structure of the server device in Embodiment 3.

The server device A01002 illustrated in FIG. 32 includes at least an Ethernet module unit A01400, a login control unit A01401, a user information management unit A01402, a KEY control unit A01403, and a KEY information management unit A01404.

The user information management unit A01402 has a structure as illustrated in FIG. 25, thereby managing information. The user information management unit A01402 manages at least the user IDs indicated in the column A0600 and the passes indicated in the column A0601 and corresponding to the user IDs.

When receiving the device identification information from the karaoke device A01000, then the Ethernet module unit A01400 notifies the KEY control unit A01403 of the reception and transmits the device identification information to the KEY control unit A01403.

When being notified of the reception of the device identification information, the KEY control unit A01403 generates a KEY with random numbers, and registers a set of the KEY and the device identification information in the KEY information management unit. In the case where that device identification information has already been registered in the KEY information management unit A01404, the set of the device identification information and the KEY is registered by overwriting. The Ethernet module unit A01400 then sends out the registered KEY to the karaoke device A01000.

When the Ethernet module unit A01400 receives a user ID and a pass from the mobile terminal A01001, then the login control unit A01401 adds a set of the received user ID and the received pass to the user information management unit A01402. On completion of the addition process by the login control unit A01401, the Ethernet module unit A01400 returns a notification of completion of registration to the mobile terminal A01001.

When the Ethernet module unit A01400 receives a KEY, device identification information, a user ID, and a pass from the karaoke device A01000, the login control unit A01401 refers to the columns of user IDs and passes stored in the user information management unit A01402. The login control unit A01401 determines whether or not a set of the received user ID and the received pass is present in the user information management unit A01402. When the set of received user ID and pass is present, the login control unit A01401 further determines whether or not a set of the received KEY and the received device identification information is present in the KEY information management unit A01404. When the set of received KEY and device identification information is present, the login control unit A01401 deems login for the user ID completed and notifies the karaoke device A01000 of a login success view.

[Operations of Server Device A01002]

Subsequently, an operation procedure of the structural elements is described in detail.

[Flow for New User Registration]

Figure 33:
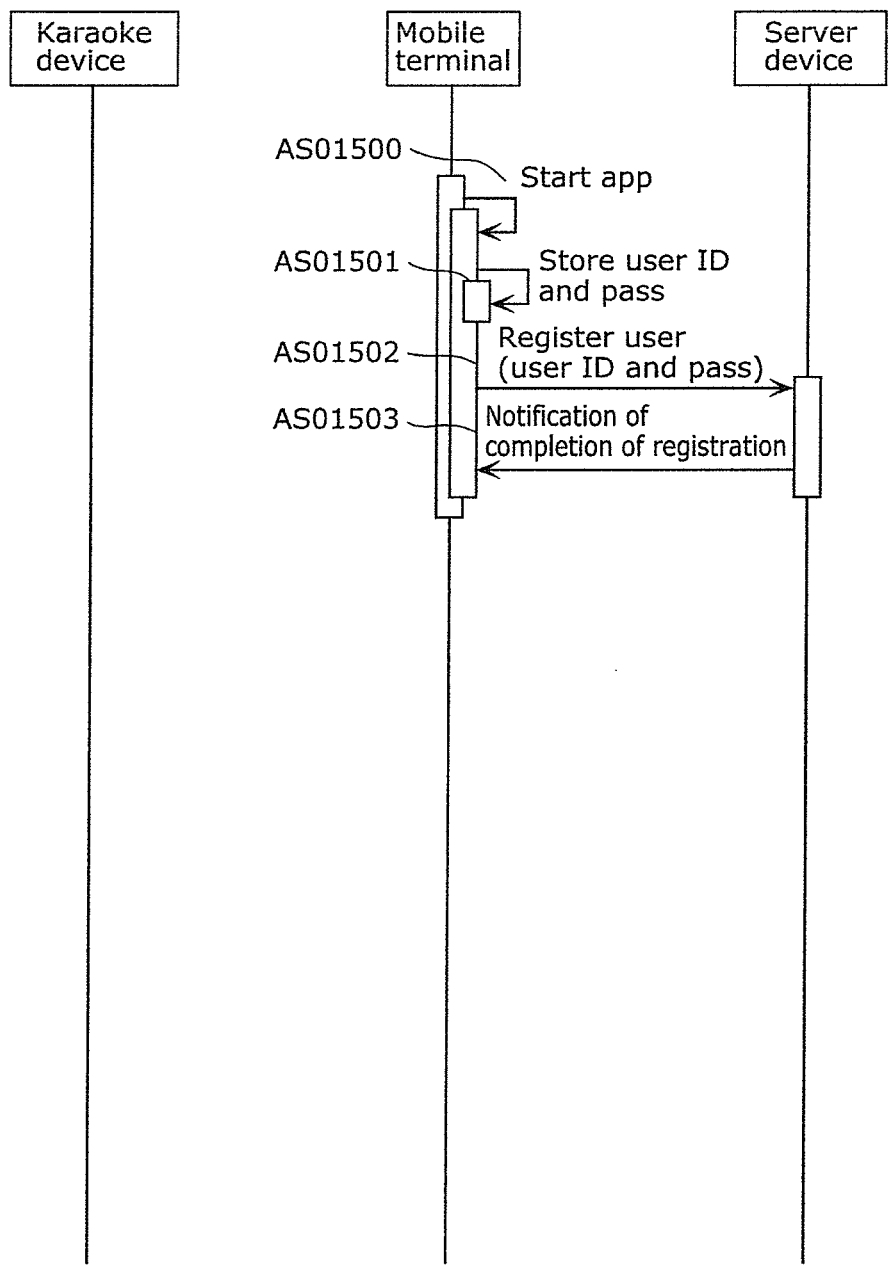
FIG. 33 illustrates an example of a flow for new user registration in Embodiment 3.

The following describes, first, a flow for new user registration with reference to FIG. 33. Here, FIG. 33 illustrates an example of a flow for new user registration in Embodiment 3.

First, after a user starts an app on the mobile terminal A01001, a user interface unit login screen illustrated in FIG. 23 appears (AS01500).

Next, suppose that the user presses the new-registration button A0702, that is, a login request is issued by the user interface unit A01207, with the user ID entry field A0700 filled in with a user ID and the PASS entry field A0701 filled in with a PASS by the user.

The user interface unit A01207 then stores the user ID into the user ID storage unit A01204 and the PASS into the pass storage unit A01205 (AS01501).

Next, the Ethernet module unit A01208 sends out, to the server device A01002, the user ID stored in the user ID storage unit A01204 and the pass stored in the pass storage unit A01205, that is, attempting a user registration process (AS01502).

Next, when the Ethernet module unit A01400 receives a user ID and a pass from the mobile terminal A01001, then the login control unit A01401 adds a set of the received user ID and the received pass to the user information management unit A01402. On completion of the addition process by the login control unit A01401, the Ethernet module unit A01400 returns a notification of completion of registration to the mobile terminal A01001 (AS01503).

[Flow for Karaoke Device Registration]

Figure 34:
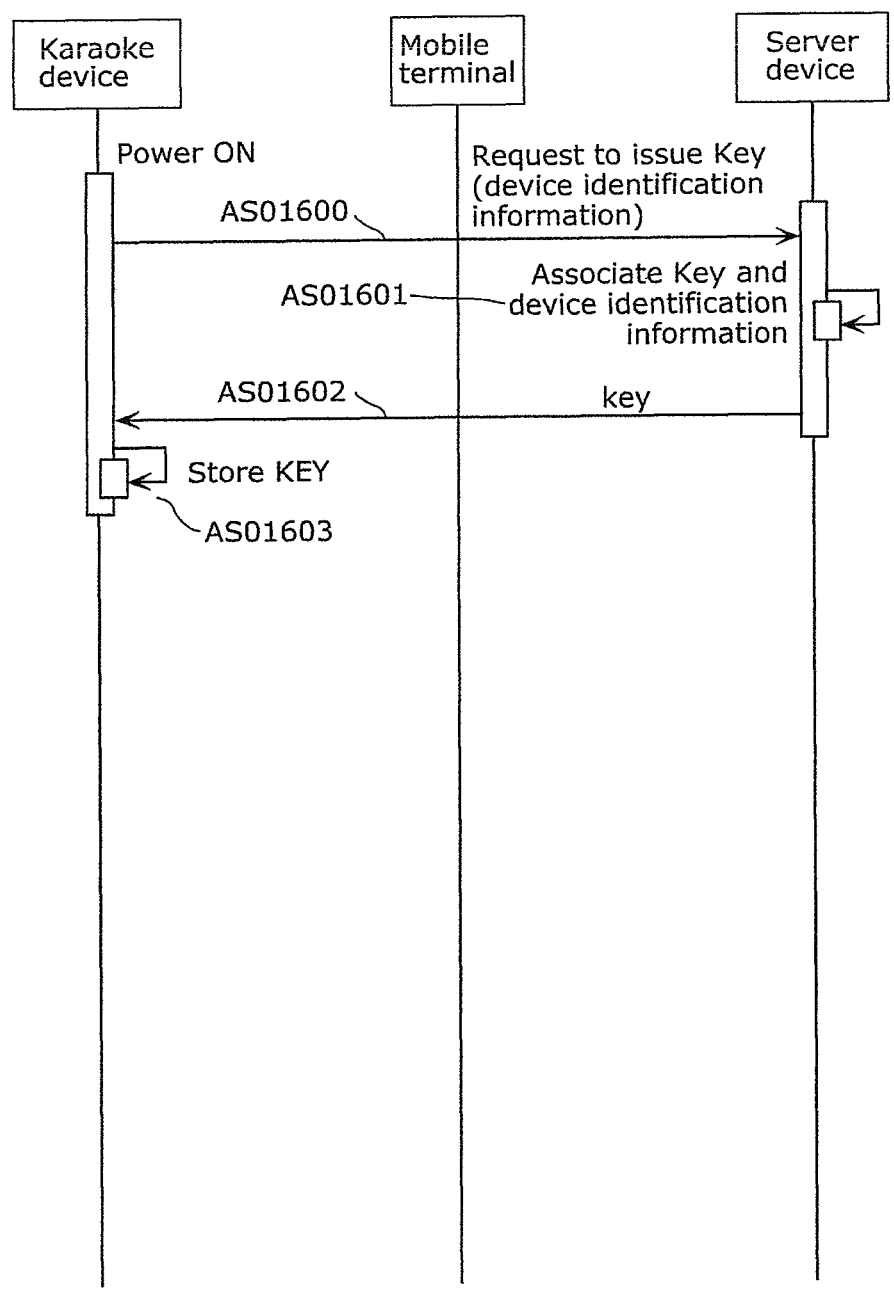
FIG. 34 illustrates an example of a flow for karaoke device registration in Embodiment 3.

Subsequently, a flow for karaoke device registration is described with reference to FIG. 34. Here, FIG. 34 illustrates an example of a flow for karaoke device registration in Embodiment 3.

First, the karaoke device A01000 is powered on in advance and performs a startup process.

Next, after the karaoke device A01000 is started, the Ethernet module unit A01108 sends out, to the server device A01002, the device identification information stored in advance in the device identification information storage unit A01105 (AS01600).

Next, when receiving the device identification information from the karaoke device A01000, then the Ethernet module unit A01400 notifies the KEY control unit A01403 of the reception and transmits the device identification information to the KEY control unit A01403. The KEY control unit A01403 receives the notification, then generates a KEY with random numbers, and registers a set of the KEY and the device identification information in the KEY information management unit (AS01601). Here, in the case where that device identification information has already been registered in the KEY information management unit, the set of the device identification information and the KEY is registered by overwriting.

Next, the Ethernet module unit A01400 then sends out the registered KEY to the karaoke device A01000 (AS01602).

Next, when the Ethernet module unit A01108 receives a KEY from the server device A01002, then the KEY generation unit A01103 receives the KEY from the Ethernet module unit 01108 and stores the KEY into the KEY storage unit A01102 (AS01603).

[Flow for Login]

Figure 35:
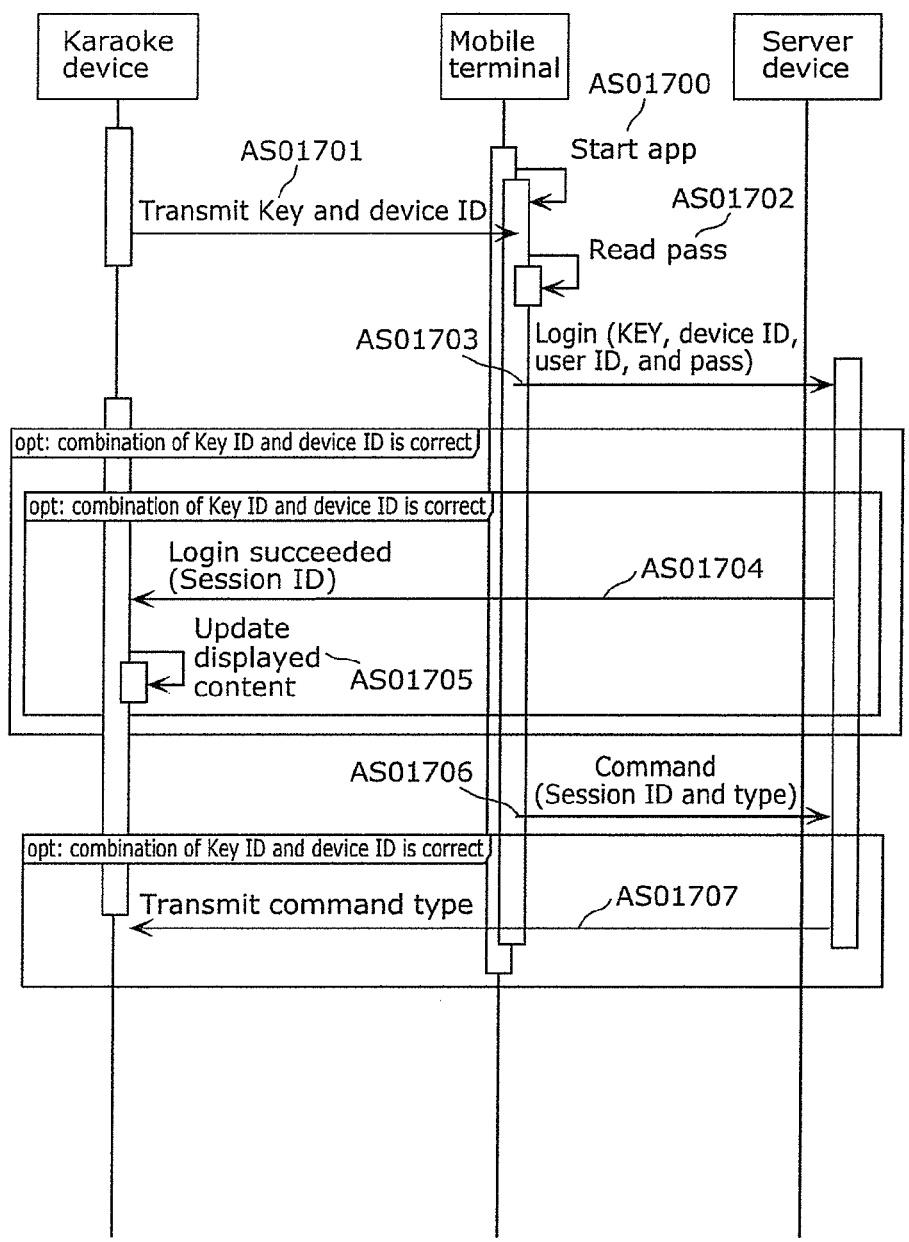
FIG. 35 illustrates an example of a flow for login in Embodiment 3.

Subsequently, a flow for login is described with reference to FIG. 35. Here, FIG. 35 illustrates an example of a flow for login in Embodiment 3.

First, the karaoke device A01000 is powered on in advance and performs a startup process.

Furthermore, the user starts an app on the mobile terminal A0101 to enable reception of visible light (AS01700).

The visible light ID control unit A01101 then reads device identification information (denoted by device ID in the drawings) from the device identification storage unit A01105, further reads the KEY from the KEY storage unit A01102, multiplexes these to generate a visible light ID, and sends out, to the display unit A01100, an encoded signal resulting from encoding the visible light ID. The display unit A01100 controls light emission based on the received encoded signal (AS01701).

Here, suppose that the user presses the login button A01303, that is, a login request is issued by the user interface unit A01207, with the user ID entry field A01301 filled in with a user ID and the PASS entry field A01302 filled in with a PASS by the user. In this case, the user interface unit A01207 stores the user ID into the user ID storage unit A01204 and the PASS into the pass storage unit A01205. The Ethernet module unit A01208 reads the device identification information (device ID) stored in the device identification information storage unit A01202, the KEY stored in the KEY storage unit A01203, the user ID stored in the user ID storage unit A01204, and the pass stored in the pass storage unit A01205 (AS01702) and sends these out to the server device A01002 (AS01703).

On the other hand, suppose that a user presses the simple login button A01304, that is, a simple login request is issued by the user interface unit A01207. In this case, the Ethernet module unit A01208 reads the device identification information (device ID) stored in the device identification information storage unit A01202, the KEY stored in the KEY storage unit A01203, the user ID stored in the user ID storage unit A01204, and the pass stored in the pass storage unit A01205 (AS01702) and sends these out to the server device A01002 (AS01703).

Next, when the Ethernet module unit A01400 receives a KEY, device identification information (device ID), a user ID, and a pass from the karaoke device A01000, the login control unit A01401 refers to the columns of user IDs and passes stored in the user information management unit A01402. The login control unit A01401 determines whether or not a set of the received user ID and the received pass is present in the user information management unit A01402. When the set of received user ID and pass is present, the login control unit A01401 further determines whether or not a set of the received KEY and the received device identification information (device ID) is present in the KEY information management unit A01404. When the set of received KEY and device identification information (device ID) is present, the login control unit A01401 deems login for the user ID completed and notifies the karaoke device A01000 of a login success view, as well as issues a session ID thereto (AS01704).

Next, when receiving a notification of the login success view from the server device A01002, then the Ethernet module unit A01108 updates the content that is outputted by the display unit A01100, to let a user know that the login was successful (AS01705).

After that, when the mobile terminal A01001 issues commands necessary to perform various processes such as selection of a track and displaying of a menu for ranking, the mobile terminal A01001 transmits, to the server device A01002, issuance of a command which includes a command type and a session ID as a set (AS01706). The server device A01002 then sends the received command type to the karaoke device A01000 (AS01707).

In the manner as above, logging in to the server device A01002 and the following command processing are performed using the mobile terminal A01001 via the karaoke device A01000.

[Effect]

As above, according to the system having a login function in this embodiment, it is possible to accept login only from a terminal that is capable of viewing and recognizing the karaoke device, that is, a terminal that is present inside the same room as the karaoke device. This simplifies the login process on a specific karaoke device and further eliminates unauthorized login from other rooms, which are advantageous effects.

It is to be noted that although this embodiment has been described assuming that the visible light ID reception unit A01200 operates constantly while the mobile terminal A01001 is active, this is not the only example. The visible light ID reception unit A01200 may switch between operating and nonoperating according to a state of the mobile terminal A01001. For example, it may be that an accelerometer embedded in the mobile terminal A01001 determines whether the mobile terminal A01001 is close to horizontal or vertical, and the visible light ID reception unit A01200 of the mobile terminal A01001 is configured to operate only when the mobile terminal A01001 is close to vertical, that is, the visible light ID reception unit A01200 is likely to be positioned to face toward a display in front. Furthermore, for example, taking advantage of excess hardware resources obtained by switching the visible light ID reception unit A01200 to a non-operating mode, other hardware resources, such as a secondary imaging unit, may be caused to operate.

It is to be noted that although the use cases where unauthorized login by a third party from outside the room where the karaoke device is installed is prevented have been described in the above Embodiment 2 and Embodiment 3, this is not limited to the karaoke device.

For example, this may be applied to a photo sticker booth, which is a machine installed in an amusement arcade, a resort, and so on, for producing a photo sticker by taking a picture on site, and may also be applied to a television device in a private room such as a hotel room, a sleeping car compartment, a patient room, or the like.

In the case of the television device in the private room, it is sufficient that the system in Embodiment 2 and Embodiment 3 includes: a television device; a light emitting unit, which is not a television image projection unit, but is something like a beacon; and the mobile terminal. Thus, even in the case of a hotel or the like where it is not known who, that is, an unspecified number of people, enters which room, unauthorized login by a third party from outside the room where the television device is installed can be prevented. This allows a user to feel at ease using the mobile terminal to pair it with the television device and power on the television device as well as to send a command to change television channels through visible light communication by directing the mobile terminal to the light emitting unit.

Furthermore, in the above system in Embodiment 3, the karaoke device may be replaced with an exhibition space for demos. In this case, a person who wishes to try a particular demo next can use the mobile terminal to perform visible light communication with lighting in the demo space to make a reservation through ID authentication. By placing the mobile terminal with the reservation over the demo device, the demo starts moving, which is one possible usage.

Embodiment 4

In this embodiment, a system or the like including a login function using visible light communication is described.

Figure 36:
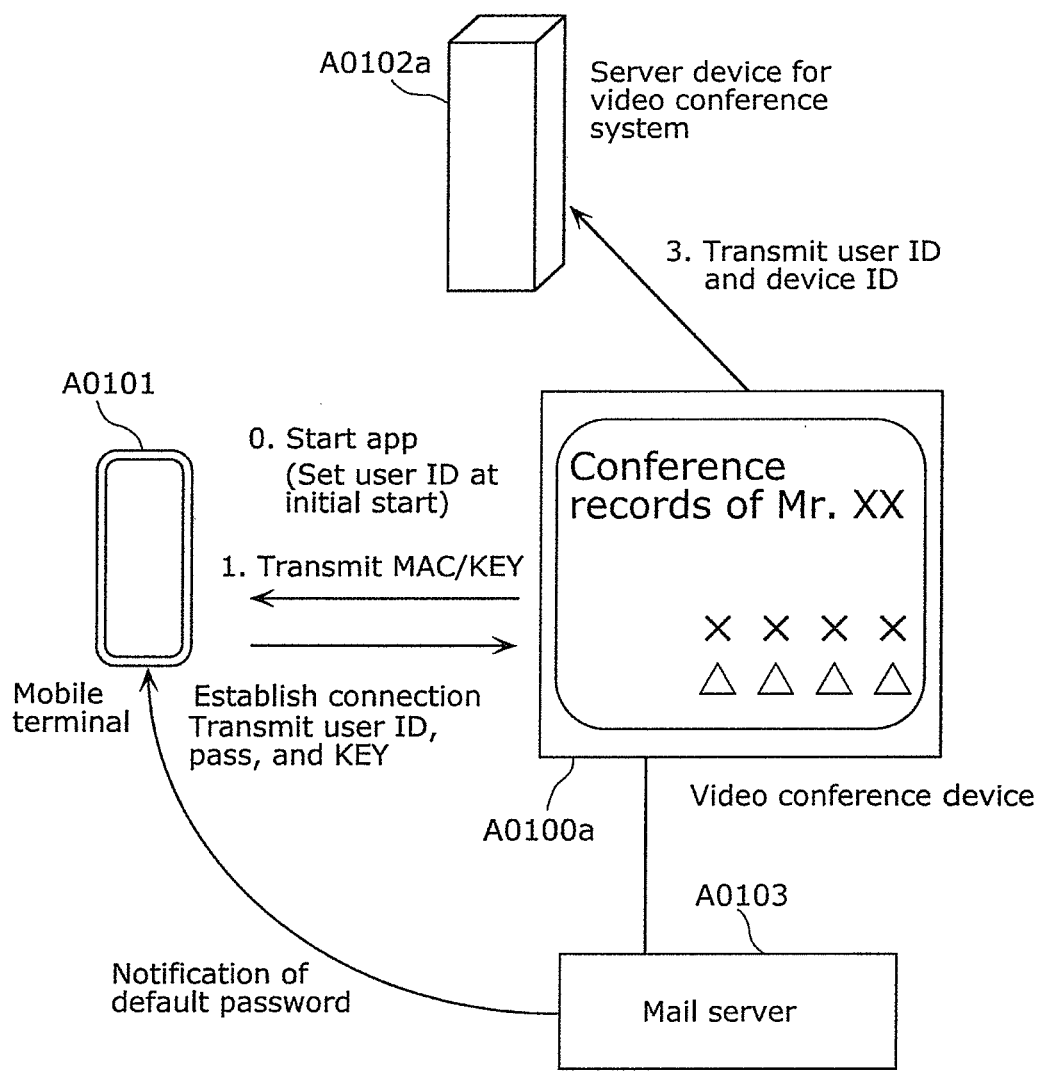
FIG. 36 illustrates a structure of a video conference system having a login function that uses visible light communication in Embodiment 4.

FIG. 36 illustrates a structure of a video conference system having a login function that uses visible light communication in Embodiment 4.

The video conference system illustrated in FIG. 36 has a login function that uses visible light communication, and includes a video conference device A0100a, the mobile terminal A0101, a video conference system server device A0102a, and an e-mail server A0103.

The following describes operations of the structural elements.

The video conference device A0100a has a function of emitting visible light. The video conference device A0100a transmits a MAC address and a KEY held by the video conference device A0100a to the mobile terminal A0101 through the visible light communication.

Furthermore, the video conference device A0100a receives a connection request from the mobile terminal A0101 via Bluetooth (registered trademark), establishes connection, and receives a user ID, a pass, and a KEY from the mobile terminal A0101.

The video conference device A0100a compares the KEY received from the mobile terminal A101 and the KEY held by the video conference device A0100a, and when the both are equal, the video conference device A0100a determines that the mobile terminal A0101 is a mobile terminal that is present in the space where the video conference device A0100a is viewable, that is, the received request is a login request from a user within the same conference room as the video conference device A0100a. The video conference device A0100a then determines conformity with the user ID and pass received from the mobile terminal A0101, to proceed with a login process.

When the login is successful, the video conference device A0100a transmits a session ID to the mobile terminal A0101 and waits for a destination IP address to be input on the mobile terminal A0101. When receiving the session ID and the destination IP address from the mobile terminal A0101, then the video conference device A0100a starts communication with the video conference system server device A0102a.

[Structural Elements of Video Conference Device A0100a]

Subsequently, structural elements of the video conference device A0100a are described with reference to FIG. 37.

Figure 37:
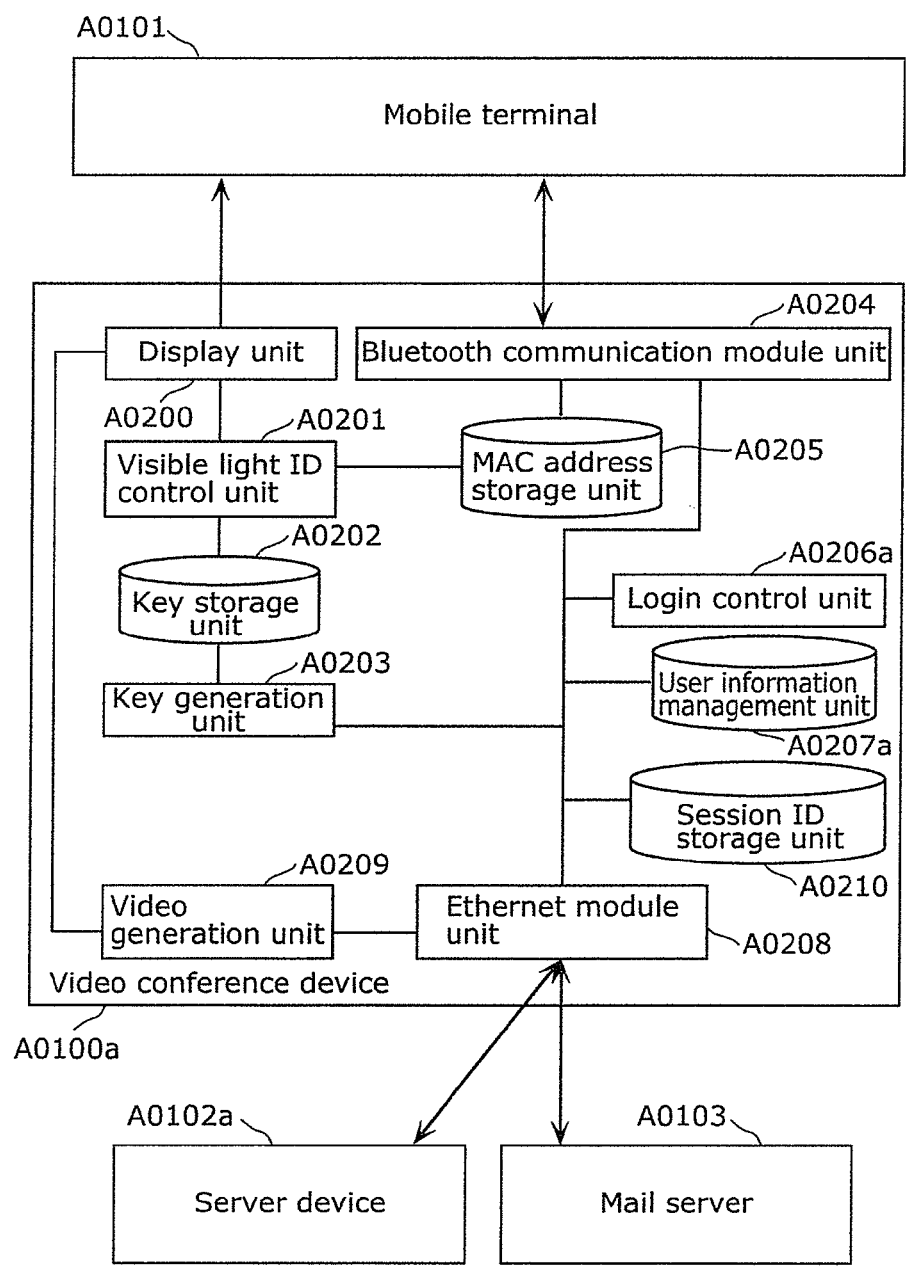
FIG. 37 illustrates an example of an internal structure of a video conference system in Embodiment 4.

FIG. 37 illustrates an example of an internal structure of the video conference device in Embodiment 4.

The video conference device A0100a illustrated in FIG. 37 includes the display unit A0200, the visible light ID control unit A0201, the KEY storage unit A0202, the KEY generation unit A0203, the Bluetooth communication module unit A0204, the MAC address storage unit A0205, a login control unit A0206a, a user information management unit A0207a, the Ethernet module unit A0208, a video generation unit A0209, and a session ID storage unit A0210.

The following describes operations of the structural elements.

After the video conference device A0100a is started, the KEY generation unit A0203 generates a KEY and stores the KEY into the KEY storage unit A0202. The KEY generation unit A0203 rewrites a value of the KEY as a random value immediately after the video conference device A0100a is started and immediately after receiving a notification of KEY change request from the Bluetooth communication module unit A0204.

Subsequently, the visible light ID control unit A0201 reads a MAC address from the MAC address storage unit A0205, further reads the KEY from the KEY storage unit A0202, and multiplexes these, thereby generating a visible light ID. The visible light ID control unit A0201 sends out, to the display unit A0200, an encoded signal resulting from encoding the visible light ID.

The display unit A0200 controls light emission based on the received encoded signal.

When receiving the Bluetooth connection request from the mobile terminal A0101, then the Bluetooth communication module unit A0204 performs processing to establish connection.

The Bluetooth communication module unit A0204 receives a command type "new registration," the KEY, the user ID, and the pass from the mobile terminal A0101. The Bluetooth communication module unit A0204 notifies the login control unit A0206a of the received command type, KEY, user ID, and pass.

Furthermore, the Bluetooth communication module unit A0204 receives a command type "login," the KEY, the user ID, and the pass from the mobile terminal A0101. The Bluetooth communication module unit A0204 notifies the login control unit A0206a of the received command type, KEY, user ID, and pass.

Furthermore, the Bluetooth communication module unit A0204 receives a command type "connection," the session ID, and the destination IP address from the mobile terminal A0101. The Bluetooth communication module unit A0204 notifies the Ethernet module unit A0208 of the received session ID and destination IP address.

Furthermore, the Bluetooth communication module unit A0204 receives a command type "password reset," the KEY, and the user ID from the mobile terminal A0101. The Bluetooth communication module unit A0204 notifies the login control unit A0206a of the received KEY and user ID.

The Bluetooth communication module unit A0204 obtains a notification from the login control unit A0206a and then transmits the obtained notification to the mobile terminal A0101.

When receiving the command type "new registration," then the login control unit A0206a conducts a validity check on the received KEY.

Here, only when the received KEY is equal to the KEY stored in the KEY storage unit A0202 in the validity check, does the login control unit A0206a search the user information management unit A0207a for the user ID and the pass. When a corresponding set of the user ID and the pass is found as a result of the search, the login control unit A0206a notifies the Bluetooth communication module unit A0204 of an identifier "registered." On the other hand, when the corresponding set of the user ID and the pass is not found in the search, the login control unit A0206a registers the obtained user ID and pass in the user information management unit A0207a, generates a session ID with random numbers, and stores the generated session ID into the session ID storage unit A0210. A notification "registration completed" provided with the stored session ID and user information is then transmitted to the Bluetooth communication module unit A0204.

Furthermore, when receiving the command type "login," then the login control unit A0206a conducts a validity check on the received KEY.

Here, only when the received KEY is equal to the KEY stored in the KEY storage unit A0202 in the validity check, does the login control unit A0206a search the user information management unit A0207a for the user ID and the pass. When a corresponding set of the user ID and the pass is found as a result of the search, the login control unit A0206a generates a session ID with random numbers, and stores the generated session ID into the session ID storage unit A0210. A notification "login completed" provided with the stored session ID and user information is then transmitted to the Bluetooth communication module unit A0204. On the other hand, when the corresponding set of the user ID and the pass is not found in the search, the login control unit A0206a notifies the Bluetooth communication module unit A0204 of a notification "login failed."

Furthermore, when receiving the command type "password reset," then the login control unit A0206a conducts a validity check on the received KEY. Here, only when the received KEY is equal to the KEY stored in the KEY storage unit A0202 in the validity check, does the login control unit A0206a store the user ID and the pass generated as a random value into the user information management unit A0207a. The generated pass is then transmitted via the Ethernet module unit A0208 to an e-mail address indicated in the user ID.

When notified of the session ID and the destination IP address, the Ethernet module unit A0208 compares the session ID stored in the session ID storage unit A0210 and the session ID obtained in the notification. When these session IDs are equal as a result of the comparison, the Ethernet module unit A0208 establishes connection with the video conference system indicated by the destination IP address obtained in the notification and starts transmitting and receiving video and voice.

[Structural Elements of Mobile Terminal A0101]

Subsequently, structural elements of the mobile terminal A0101 are described with reference to the drawings.

Figure 38:
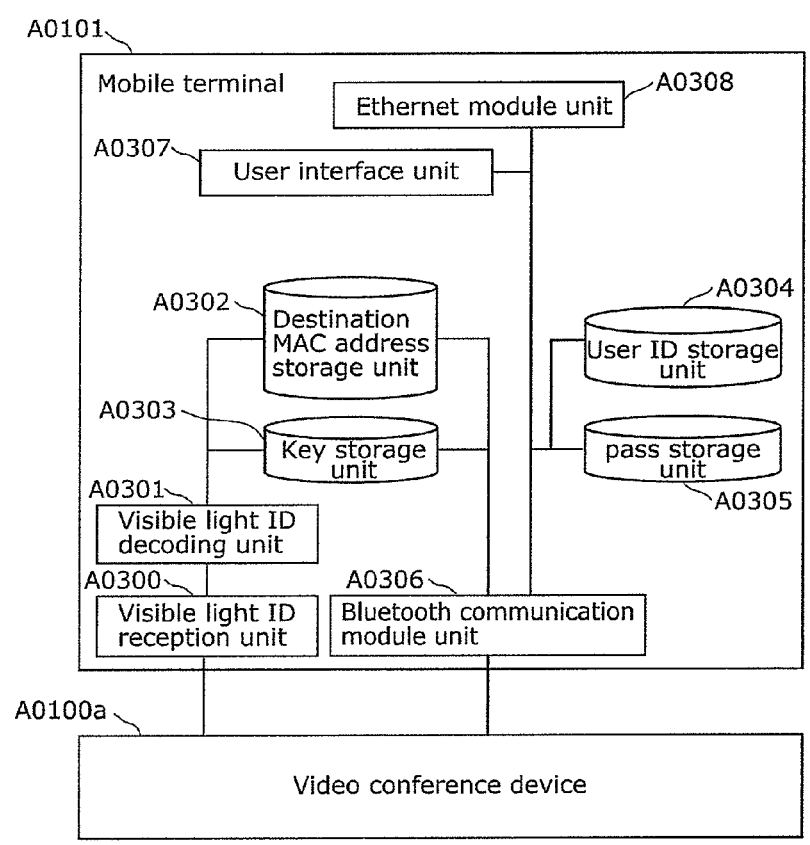
FIG. 38 illustrates an example of an internal structure of a mobile terminal in Embodiment 4.
Figure 39:
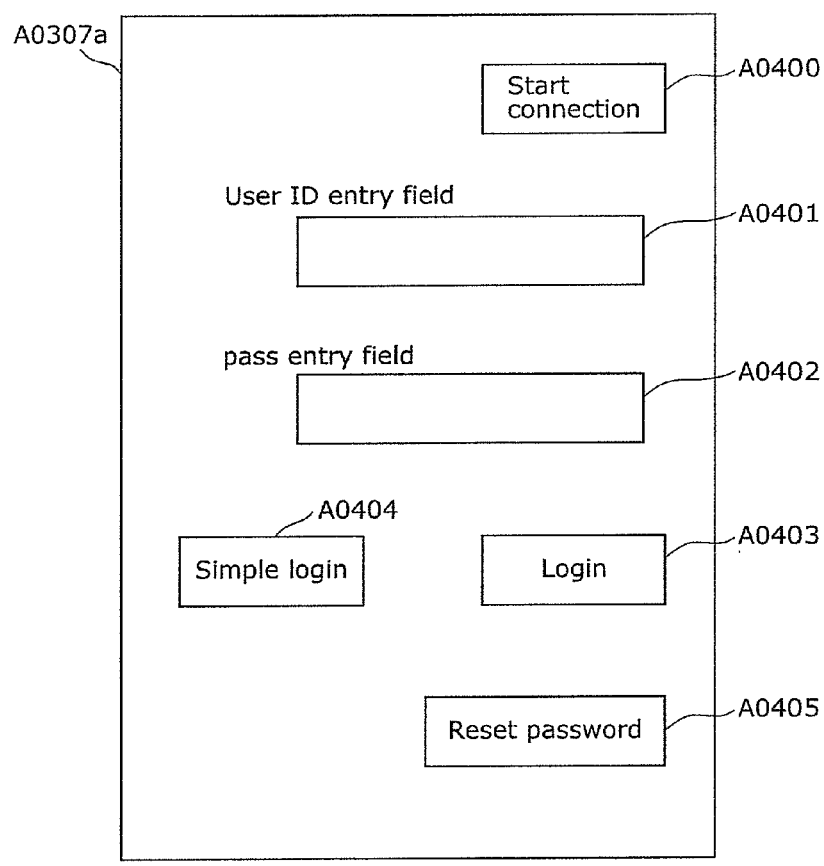
FIG. 39 illustrates an example of an overview of a login screen on a user interface unit in Embodiment 4.
Figure 40:
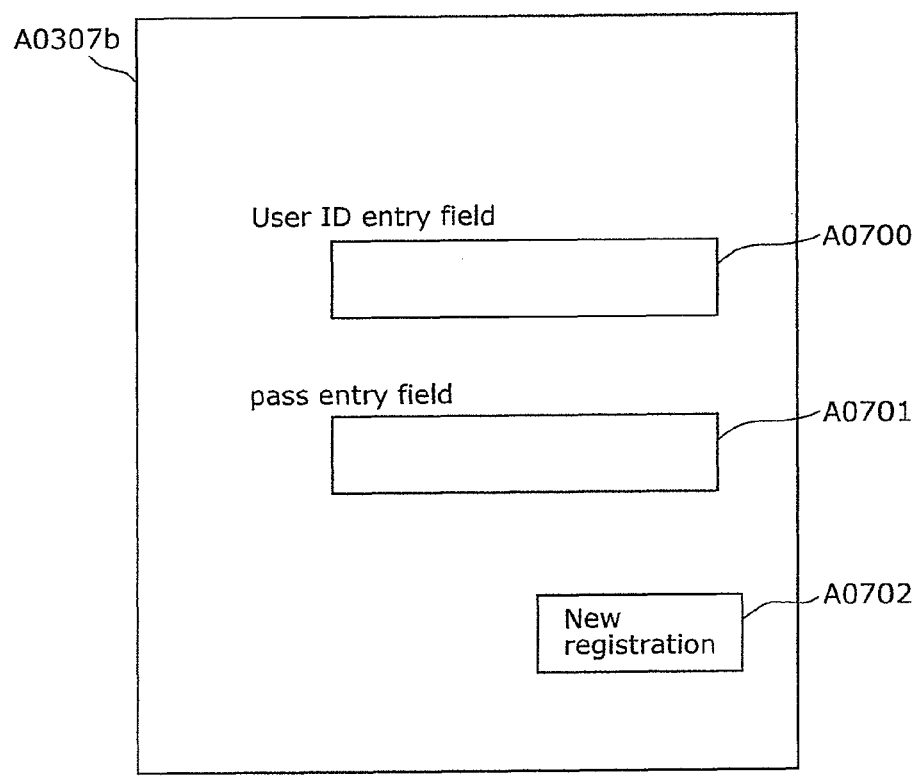
FIG. 40 illustrates an example of an overview of a new-registration screen on the user interface unit in Embodiment 4.
Figure 41:
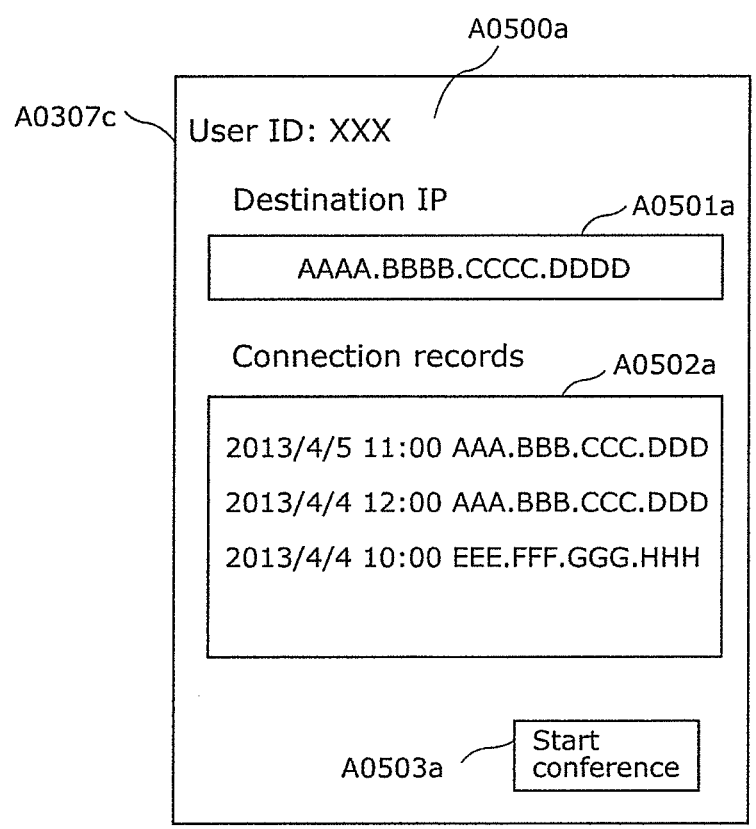
FIG. 41 illustrates an example of an overview of a video conference destination selection screen on the user interface unit in Embodiment 4.

FIG. 38 illustrates an example of an internal structure of the mobile terminal in Embodiment 4. FIG. 39 illustrates an example of an overview of a login screen on a user interface unit in Embodiment 4. FIG. 40 illustrates an example of an overview of a new-registration screen on the user interface unit in Embodiment 4. FIG. 41 illustrates an example of an overview of a video conference destination selection screen on the user interface unit in Embodiment 4.

The mobile terminal A0101 illustrated in FIG. 38 includes the visible light ID reception unit A0300, the visible light ID decoding unit A0301, the destination MAC address storage unit A0302, the KEY storage unit A0303, the user ID storage unit A0304, the pass storage unit A0305, the Bluetooth communication module unit A0306, the user interface unit A0307, and the Ethernet module unit A0308.

The user interface unit A0307 displays, at the time of a login operation, at least the connection start button A0400, the user ID entry field A0401, the PASS entry field A0402, the login button A0403, and a password reset button A0405 as illustrated in a login screen A0307a in FIG. 39, for example. Here, the connection start button A0400 is a button that serves as a trigger for starting a connection start request. The user ID entry field A0401 is an entry field in which a user ID is entered, and the PASS entry field A0402 is an entry field in which a PASS is entered. The login button A0403 is a button that serves as a trigger for performing a login process. The password reset button A0405 is a button that serves as a trigger for causing the video conference device A0100a to initialize the password and transmitting the initialized password to the user ID entered into the user ID entry field. The user interface unit A0307 may display, at the time of a login operation, the simple login button A0404 serving as a trigger for performing a login process using a user ID and a pass stored in advance. It is to be noted that at the point in time when the mobile terminal A0101 is started, the user interface unit A0307 maintains all of the connection start button A0400, the login button A0403, and the simple login button A0404 in the state of being unable to be pressed.

The user interface unit A0307 further displays, at the time of new user registration, at least the user ID entry field A0700, the PASS entry field A0701, and the new-registration button A0702 as illustrated in a new-registration screen A0307b in FIG. 40, for example. Here, the user ID entry field A0700 is an entry field in which a user ID is entered, and the PASS entry field A0701 is an entry field in which a PASS is entered. The new-registration button A0702 is a button that serves as a trigger for performing a new user registration process.

The user interface unit A0307 further displays, at the time of selecting a video conference destination, at least a user ID display field A0500a, a destination IP entry field A0501a, a connection record selection field A0502a, and a conference start button A0503a as illustrated in a video conference destination selection screen A0307c in FIG. 41, for example. Here, the user ID display field A0500a is a display field in which the user ID currently logged in is displayed, and the destination IP entry field A0501a is an entry field in which a destination IP in a video conference is entered. The connection record selection field A0502a is an entry field in which the date and time at which and the destination IP with which the connection was established in the past using the user ID currently logged in, that is, connection records, are displayed and which allows a user to select a record so as to save the trouble of re-entering an IP. The conference start button A0503a is a button that serves as a trigger for transmitting an IP to the video conference device A0100a and causing the video conference device A0100a to start transmitting and receiving video and voice.

The following describes operations of the structural elements.

First, the operations seen in the case of using the mobile terminal A0101 in advance preparation are described with reference to FIG. 40.

Suppose that a user presses the new-registration button A0702, that is, a login request is issued by the user interface unit A0307, with the user ID entry field A0700 filled in with a user ID and the PASS entry field A0701 filled in with a PASS by the user. In this case, the user interface unit A0307 stores the user ID into the user ID storage unit A0304 and the PASS into the pass storage unit A0305.

The Ethernet module unit A0308 sends out, to the video conference device A0100a, the command type "new registration," the user ID stored in the user ID storage unit A0304, and the pass stored in the pass storage unit A0305. When receiving a notification "registered" from the video conference device A0100a after the sending, then the Ethernet module unit A0308 presents to the user interface unit A307 that the ID has already been registered. On the other hand, when receiving a notification "registration completed" from the video conference device A0100a, then the Ethernet module unit A0308 presents to the user interface unit A307 that the ID has been now successfully registered.

Next, the operations seen in the case of using the mobile terminal A0101 in a conference room to start a video conference are described.

The visible light ID reception unit A0300 has a function equivalent to that of an imaging unit, and is rendered capable of receiving visible light by setting its shutter speed to be fast after start up. When receiving an encoded signal from the video conference device A0100a, then the visible light ID reception unit A0300 sends out the received encoded signal to the visible light ID decoding unit A0301.

The visible light ID decoding unit A0301 decodes the encoded signal, extracts the MAC address and the KEY, and stores the MAC address into the destination MAC address storage unit A0302 and the KEY into the KEY storage unit A0303.

The user interface unit A0307 then updates and places the connection start button A0400 illustrated in FIG. 39, for example, in the state of being able to be pressed.

Here, suppose that the connection start button A0400 displayed by the user interface unit A0307 is pressed by a user, that is, a connection request is received from the user interface unit A0307. In this case, the Bluetooth communication module unit A0306 issues a connection request to a device that has the MAC address indicated by the destination MAC address storage unit A0302, that is, the video conference device A0100a, to establish connection. After the connection is established, the user interface unit A0307 updates and places the login button A0403 and the simple login button A0404 in the state of being able to be pressed.

On the other hand, suppose that a user presses the login button A0403, that is, a login request is issued by the user interface unit A0307, with the user ID entry field A0401 filled in with a user ID and the PASS entry field A0402 filled in with a PASS by the user. In this case, the user interface unit A0307 stores the user ID into the user ID storage unit A0304 and the PASS into the pass storage unit A0305. The Bluetooth communication module unit A0306 sends out, to the video conference device A0100a, a command type "login," the KEY stored in the KEY storage unit A0303, the user ID stored in the user ID storage unit A0304, and the pass stored in the pass storage unit A0305. When receiving a notification "login completed" from the video conference device A0100a after the sending, then the Bluetooth communication module unit A0306 presents to the user interface unit A307 that the login has now been completed, and subsequently presents user information to the user interface unit A0307.

Furthermore, suppose that a user presses the password reset button A0405, that is, a password reset request is issued by the user interface unit A0307, with the user ID entry field A0401 filled in with a user ID by the user. In this case, the user interface unit A0307 stores the user ID into the user ID storage unit A0304. The Bluetooth communication module unit A0306 sends out, to the video conference device A0100a, a command type "password reset," the KEY stored in the KEY storage unit A0303, and the user ID stored in the user ID storage unit A0304.

Next, the operations seen in the case of using the mobile terminal A0101 to select a destination for video conference are described.

The user interface unit A0307 presents the user ID as the user information to the user ID display field A0500a and presents, to the connection record selection field A0502a, the date and time at which and the destination IP address with which the connection was established in the past using the user ID currently logged in, that is, connection records.

Here, when the user taps the connection record selection field A0502a, the user interface unit A0307 transcribes, into the destination IP entry field A0501a, the IP tapped in the connection record selection field A0502a illustrated in FIG. 41.

When detecting pressing of the conference start button A0503a, then the user interface unit A0307 transmits, to the video conference device A0100a, a command type "connection," a session ID, and the destination IP address entered in the destination IP entry field A0501a.

[Flow for New User Registration]

Subsequently, an operation procedure of the structural elements is described.

Figure 42:
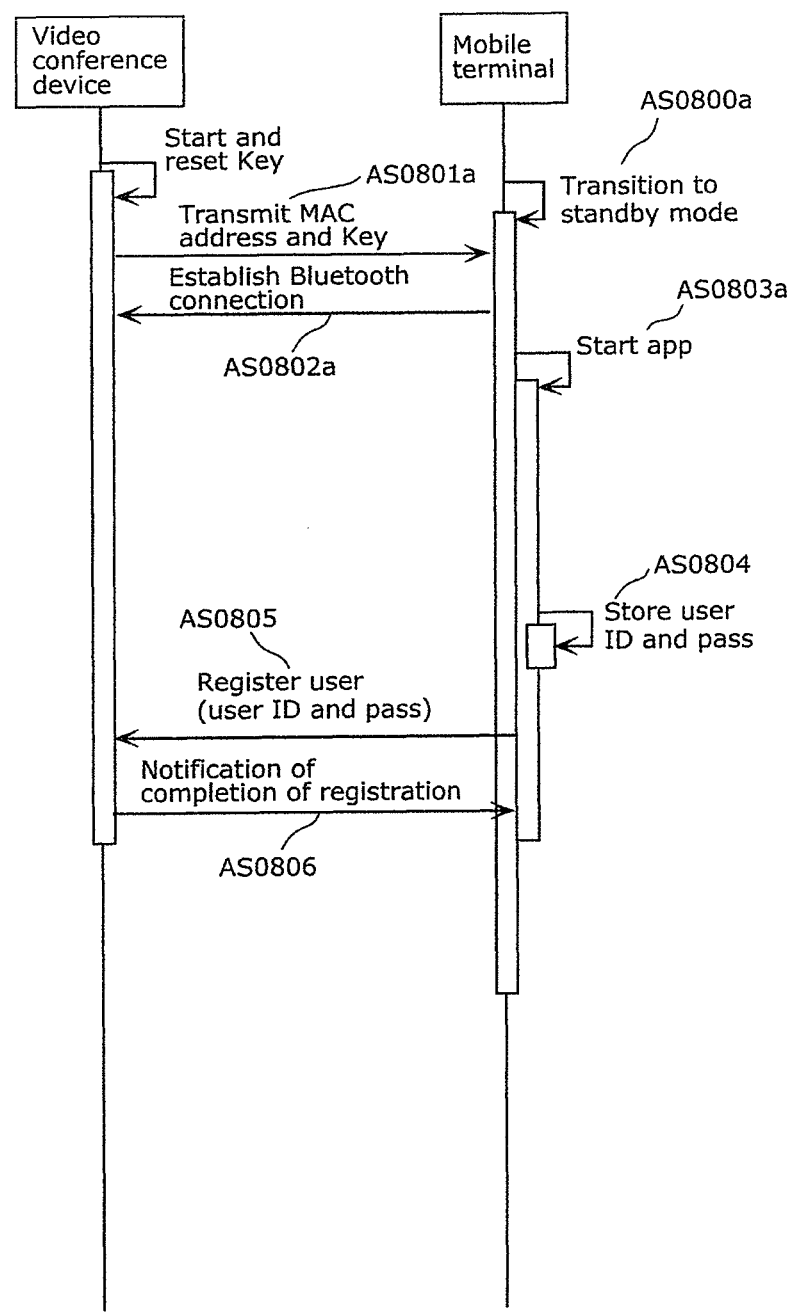
FIG. 42 illustrates an example of a flow for new user registration in Embodiment 4.

The following describes, first, a flow for new user registration with reference to FIG. 42. Here, FIG. 42 illustrates an example of a flow for new user registration in Embodiment 4.

First, after a user starts an app on the mobile terminal A0101, the mobile terminal A0101 is placed in standby mode (AS0800a)

Next, during the standby mode, when receiving a visible light ID from the video conference device A0100a, then the mobile terminal A0101 extracts the MAC address and the KEY from the obtained visible light ID (AS0801a).

Next, the mobile terminal A0101 searches for a Bluetooth destination that is present around the mobile terminal A0101. If the MAC address included in the visible light ID is found in the search result, a Bluetooth connection is established with a device that has the MAC address, that is, the video conference device A0100a (AS0802a).

Next, after the connection is established, the mobile terminal A0101 displays the new-registration screen A0307b illustrated in FIG. 40 (AS0803a).

Next, suppose that the user presses the new-registration button A0702, that is, a login request is issued by the user interface unit A0307, with the user ID entry field A0700 filled in with a user ID and the PASS entry field A0701 filled in with a PASS by the user.

The user interface unit A0307 then stores the user ID into the user ID storage unit A0304 and the PASS into the pass storage unit A0305 (AS0804).

Next, the Ethernet module unit A0308 sends out, to the server device A0102a, the user ID stored in the user ID storage unit A0304 and the pass stored in the pass storage unit A0305, that is, attempting a user registration process (AS0805).

Next, when the Ethernet module unit A0500 receives a user ID and a pass from the mobile terminal A0101, then the login control unit A0501 adds a set of the received user ID and the received pass to the user information management unit A0502. On completion of the addition process by the login control unit A0501, the Ethernet module unit A0500 returns a notification of completion of registration to the mobile terminal A0101 (AS0806).

[Flow for Login]

Figure 43:
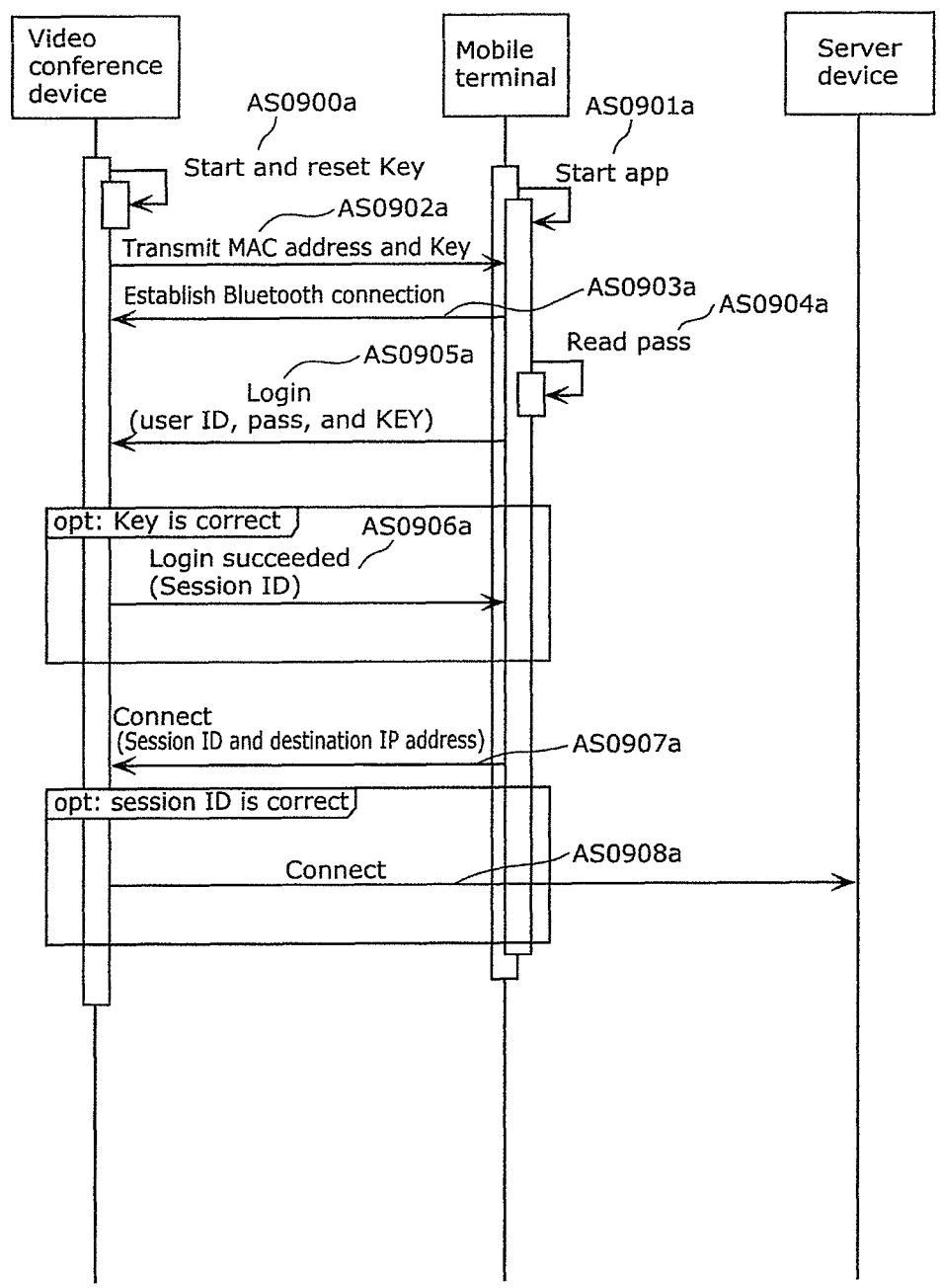
FIG. 43 illustrates an example of a flow for login in Embodiment 4.

Subsequently, a flow for login is described with reference to FIG. 43. Here, FIG. 43 illustrates an example of a flow for login in Embodiment 4.

First, the video conference device A0100a is powered on in advance and performs a startup process.

Next, after the video conference device A0100a is started, the KEY generation unit A0203 generates a KEY using random numbers and stores the KEY into the KEY storage unit A0202 (AS0900a).

Furthermore, the user starts an app on the mobile terminal A0101 to enable reception of visible light (AS0901a).

The visible light ID control unit A0201 then reads a MAC address from the MAC address storage unit A0205, further reads the KEY from the KEY storage unit A0202, multiplexes these to generate a visible light ID, and sends out, to the display unit A0200, an encoded signal resulting from encoding the visible light ID. The display unit A0200 controls light emission based on the received encoded signal (AS0902a).

Next, the visible light ID reception unit A0300 has a function equivalent to that of an imaging unit, and is rendered capable of signal reception by setting its shutter speed to be fast after start up, and when receiving the encoded signal from the video conference device A0100a, then sends out the received encoded signal to the visible light ID decoding unit A0301. The visible light ID decoding unit A0301 decodes the encoded signal, extracts the MAC address and the KEY, and stores the MAC address into the destination MAC address storage unit A0302 and the KEY into the KEY storage unit A0303. The user interface unit A0307 then updates and places the connection start button A0400 presented on the login screen A0307a illustrated in FIG. 39 in the state of being able to be pressed. Subsequently, when the connection start button A0400 presented by the user interface unit A0307 is pressed by the user, that is, when a connection request is received from the user interface unit A0307, the Bluetooth communication module unit A0306 issues a connection request to a device that has the MAC address indicated by the destination MAC address storage unit A0302, that is, the video conference device A0100a, to establish connection (AS0903a).

Next, after the connection is established, the user interface unit A0307 updates and places the login button A0403 and the simple login button A0404 in the state of being able to be pressed.

Here, further suppose that the user presses the login button A0403, that is, a login request is issued by the user interface unit A0307, with the user ID entry field A0401 filled in with a user ID and the PASS entry field A0402 filled in with a PASS by the user. In this case, the user interface unit A0307 stores the user ID into the user ID storage unit A0304 and the PASS into the pass storage unit A0305, and the Bluetooth communication module unit A0306 reads the KEY stored in the KEY storage unit A0303, the user ID stored in the user ID storage unit A0304, and the pass stored in the pass storage unit A0305 (AS0904a) and sends these out to the video conference device A0100 (AS0905a).

On the other hand, suppose that a user presses the simple login button A0404, that is, a simple login request is issued by the user interface unit A0307. In this case, the Bluetooth communication module unit A0306 reads the KEY stored in the KEY storage unit A0303, the user ID stored in the user ID storage unit A0304, and the pass stored in the pass storage unit A0305 (SA0904a) and sends these out to the video conference device A0100a (SA0905a).

Next, when receiving the user ID and the pass from the mobile terminal A0101, then the Bluetooth communication module unit A0204 stores the user ID into the user ID storage unit A0206 and the pass into the pass storage unit A0207 only when the received KEY is equal to the KEY stored in the KEY storage unit A0202, and the Ethernet module unit A0208 sends out the session ID to the mobile terminal A0101, as a result of which the login is deemed completed (AS0906a).

After that, when the mobile terminal A0101 accepts the destination IP address entered by the user, then the mobile terminal A0101 transmits, to the video conference device A0100a, issuance of a command which includes the destination IP address and the session ID as a set (AS0907a). Only when the received session ID is equal to the session ID stored in the session ID storage unit A0210, does the video conference device A0100a start video and audio communication with the video conference system server device A0102a indicated by the obtained destination IP address (AS0908a).

In the manner as above, the video conference device A0100a and the video conference system server device A0102a perform video and audio communication with each other using the mobile terminal A0101.

[Flow for Password Reset]

Figure 44:
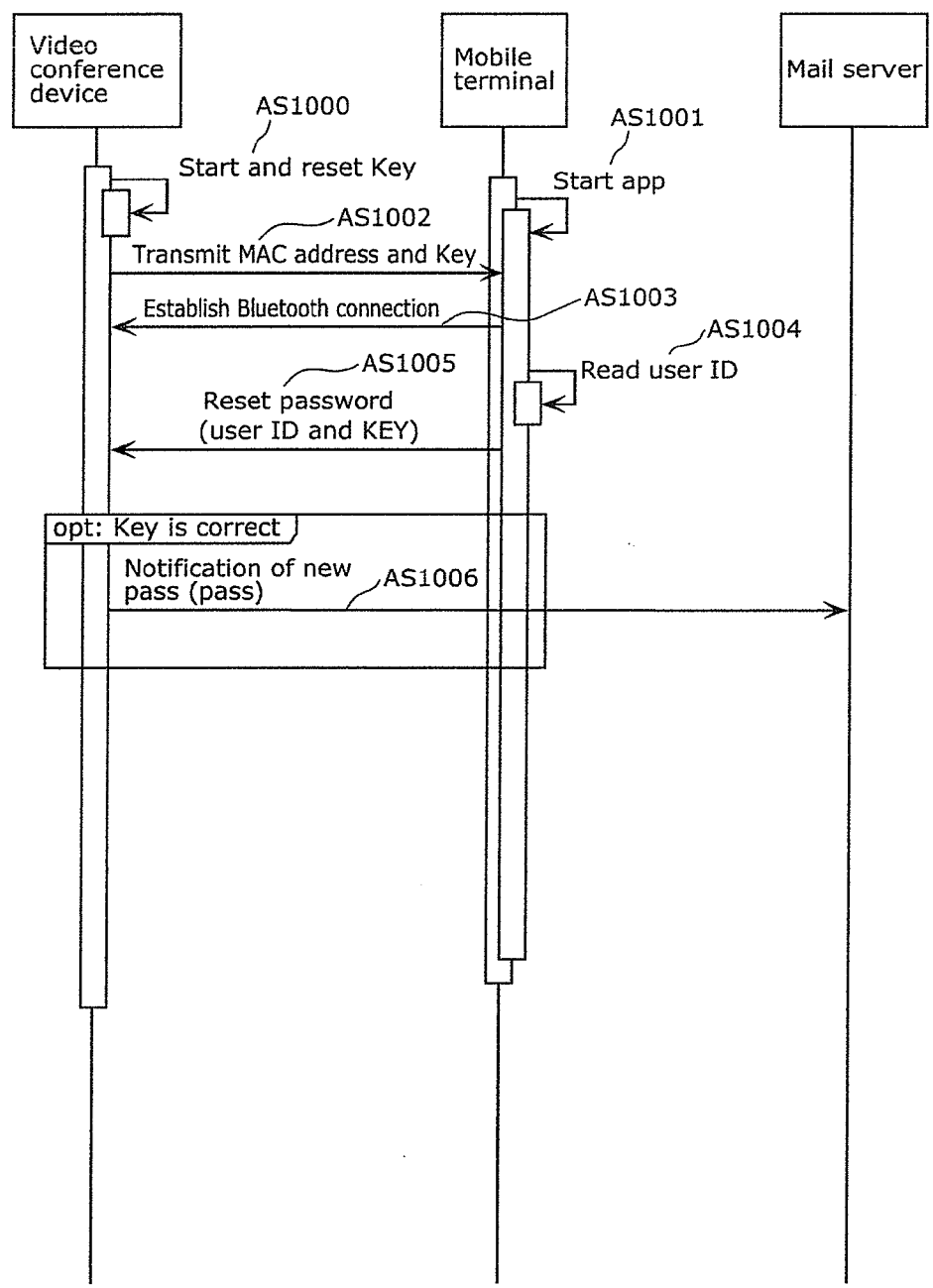
FIG. 44 illustrates an example of a flow for login in Embodiment 4.

Subsequently, a flow for password reset is described with reference to FIG. 44. Here, FIG. 44 illustrates an example of a flow for login in Embodiment 4.

First, the video conference device A0100a is powered on in advance and performs a startup process.

Next, after the video conference device A0100a is started, the KEY generation unit A0203 generates a KEY using random numbers and stores the KEY into the KEY storage unit A0202 (AS1000).

Furthermore, the user starts an app on the mobile terminal A0111 to enable reception of visible light (AS1001).

The visible light ID control unit A0201 then reads a MAC address from the MAC address storage unit A0205, further reads the KEY from the KEY storage unit A0202, multiplexes these to generate a visible light ID, and sends out, to the display unit A0200, an encoded signal resulting from encoding the visible light ID. The display unit A0201 controls light emission based on the received encoded signal (AS1002).

Next, the visible light ID reception unit A0300 has a function equivalent to that of an imaging unit, and is rendered capable of signal reception by setting its shutter speed to be fast after start up, and when receiving the encoded signal from the video conference device A0100a, then sends out the received encoded signal to the visible light ID decoding unit A0301. The visible light ID decoding unit A0301 decodes the encoded signal, extracts the MAC address and the KEY, and stores the MAC address into the destination MAC address storage unit A0302 and the KEY into the KEY storage unit A0303. The user interface unit A0307 then updates and places the connection start button A0400 presented on the login screen A0307a illustrated in FIG. 39 in the state of being able to be pressed. Subsequently, when the connection start button A0400 on the user interface unit A0307 is pressed by the user, that is, when a connection request is received from the user interface unit A0307, the Bluetooth communication module unit A0306 issues a connection request to a device that has the MAC address indicated by the destination MAC address storage unit A0302, that is, the video conference device A0100a, to establish connection (AS1003).

Next, after the connection is established, the user interface unit A0307 updates and places the password reset button A0405 in the state of being able to be pressed.

Here, furthermore, suppose that the user presses the password reset button A0405, that is, a password reset request is issued by the user interface unit A0307, with the user ID entry field A0401 filled in with a user ID by the user. In this case, the user interface unit A0307 stores the user ID into the user ID storage unit A0304, and the Bluetooth communication module unit A0306 reads the KEY stored in the KEY storage unit A0303 and the user ID stored in the user ID storage unit A0304 (AS1004) and sends these out to the video conference device A0100a (AS1005).

Next, when receiving the command type "password reset," the video conference device A0100a conducts a validity check on the received KEY. Only when the received KEY is equal to the KEY stored in the KEY storage unit A0202 in the validity check, does the video conference device A0100a store the user ID and the pass generated as a random value into the user information management unit A0207a. The generated pass is then transmitted via the Ethernet module unit A0208 to an e-mail address indicated in the user ID (AS1006).

[Effect]

As above, the communication method in this embodiment is a communication method used by a system including a mobile terminal and a device, which includes: performing, by the mobile terminal, visible light communication with the device, thereby obtaining a KEY held by the device and an identifier uniquely identifying the device; issuing, by the mobile terminal, a connection request via wireless communication to the device identified by the obtained identifier, using the KEY obtained in the performing; and establishing connection between the mobile terminal and the device when the KEY generated by the device matches the KEY transmitted in the issuing by the mobile terminal to the device.

Here, for example, in the communication method in this embodiment, the establishing may further include: inputting an ID uniquely identifying a user of the mobile terminal; generating a password related to the ID; and transmitting the generated password.

Furthermore, for example, in the communication method in this embodiment, the establishing may further include inputting an ID uniquely identifying a user of the mobile terminal and a password for establishing the connection using the ID.

Therefore, according to the communication method used by the system having a login function in this embodiment, it is possible to accept login only from a terminal that is capable of viewing and recognizing the video conference device, that is, a terminal that is present inside the same room as the video conference device. This simplifies the login process on a specific video conference device and further eliminates unauthorized login from other rooms, which are advantageous effects.

It is to be noted that although this embodiment has been described assuming that the visible light ID reception unit A0300 operates constantly while the mobile terminal A0101 is active, this is not the only example. The visible light ID reception unit A0300 may switch between operating and nonoperating according to a state of the mobile terminal A0101. For example, it may be that an accelerometer embedded in the mobile terminal A0101 determines whether the mobile terminal A0101 is close to horizontal or vertical, and the visible light ID reception unit A0300 of the mobile terminal A0101 is configured to operate only when the mobile terminal A0101 is close to vertical, that is, the visible light ID reception unit A0300 is likely to be positioned to face toward a display in front. Furthermore, for example, taking advantage of excess hardware resources obtained by switching the visible light ID reception unit A0300 to a non-operating mode, other hardware resources, such as a secondary imaging unit, may be caused to operate.

Embodiment 5

In this embodiment, a system or the like having a billing function that uses visible light communication is described.

Figure 45:
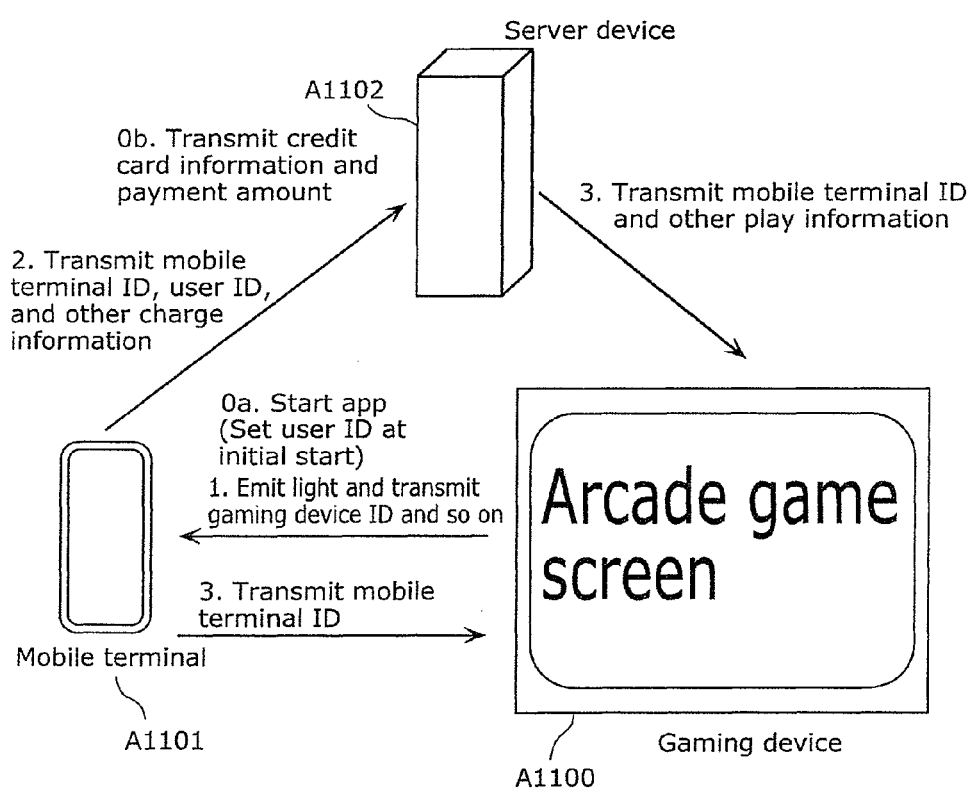
FIG. 45 illustrates an overall structure of a billing system having a billing function that uses visible light communication in Embodiment 5.

FIG. 45 illustrates an overall structure of a billing system having the billing function that uses visible light communication in Embodiment 5.

The billing system in this embodiment has the billing function using visible light communication and includes a gaming device A1100, a mobile terminal A1101, and a server device A1102 as illustrated in FIG. 45.

The mobile terminal A1101 has a function of charging a fee. When a mobile terminal ID, a charge amount, a credit card number, and a credit card expiration date are entered through a user interface, the mobile terminal A1101 transmits the mobile terminal ID, the charge amount, the credit card number, and the credit card expiration date to the server device A1102.

The server device A1102 enables authorization of the received number and expiration date of the credit card, to perform payment transaction for the charge amount. In the case where a user's payment transaction is successful, the server device A1102 updates the charge amount associated with the mobile terminal ID and notifies the mobile terminal A1101 that the payment has now been completed. The mobile terminal A1101 then updates the content displayed on its display to present to the user that the payment transaction has now been completed.

The gaming device A1100 has a function of a transmission side for the visible light communication. The gaming device A1100 transmits a URL of a server associated with a game to the mobile terminal A1101 through the visible light communication. This allows the mobile terminal A1101 to access a website identified by the URL and therefore open an exclusive website for the game so that the website can be viewed.

Furthermore, the gaming device A1100 transmits a gaming device ID of the gaming device A1100, the number of players waiting for the game, a per-play charge for the game, the maximum number of rounds of play, and the maximum number of players to the mobile terminal A1101 through the visible light communication.

This allows the user to know, via a display unit of the mobile terminal A1101, the gaming device ID of the gaming device A1100, the number of players waiting for the game, a per-play charge for the game, the maximum number of rounds of play, and the maximum number of players.

In this case, when the number of rounds of play and the number of players are entered through user interface input, then the mobile terminal A1101 transmits the gaming device ID, a per-play charge, the number of rounds of play, the number of players, and the mobile terminal ID to the server device A1102. According to the received per-play charge, number of rounds of play, and number of players, the server device A1102 then updates the charge amount associated with the mobile terminal ID. Subsequently, the server device A1102 transmits the mobile terminal ID, the number of rounds of play, and the number of players to the gaming device A1100.

The gaming device A1100 adds the received mobile terminal ID, number of rounds of play, and number of players to a standby queue. The gaming device A1100 is placed in standby mode immediately after started or at the time when the game is finished being played, and starts a new round of the game when the mobile terminal ID is transmitted thereto from the mobile terminal A1101.

[Internal Structure of Gaming Device A1100]

Subsequently, an internal structure of the gaming device A1100 is described with reference to FIG. 46.

Figure 46:
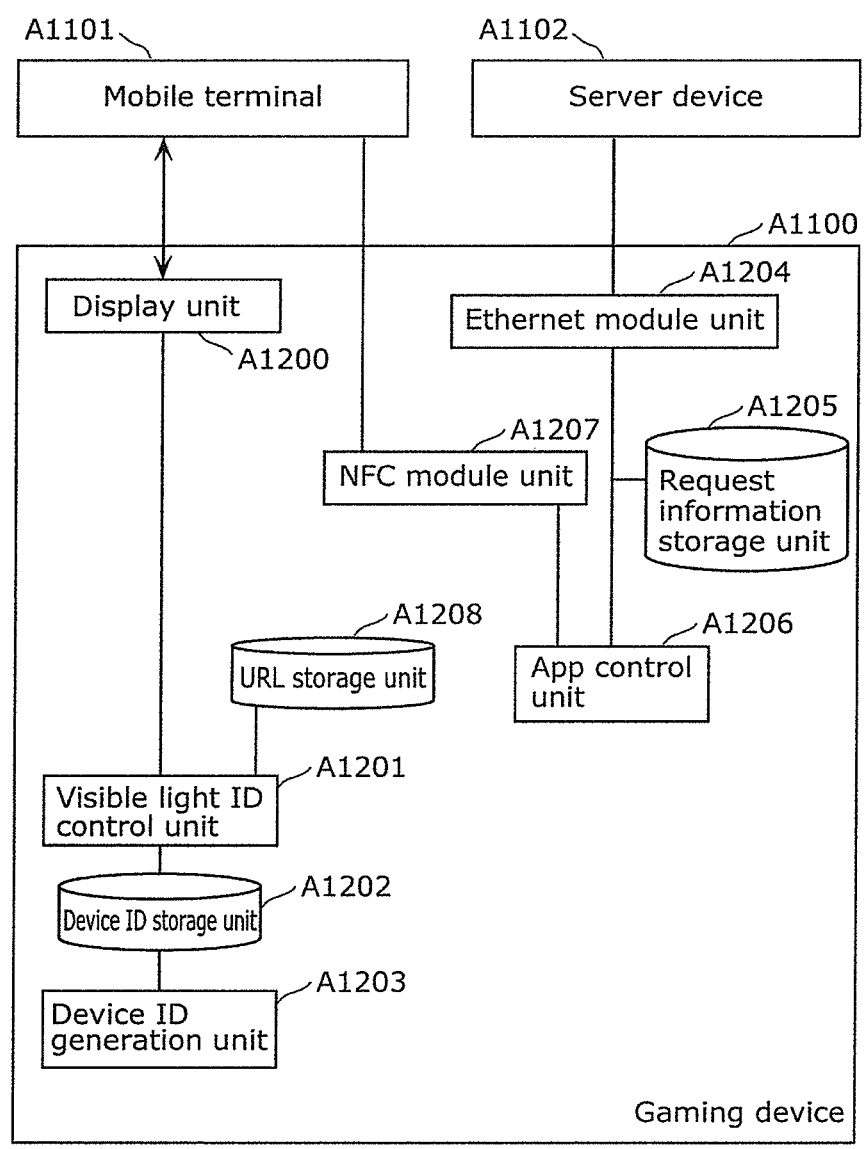
FIG. 46 illustrates an example of an internal structure of a gaming device in Embodiment 5.

FIG. 46 illustrates an example of an internal structure of the gaming device in Embodiment 5. FIG. 47 illustrates an example of information stored in a request information storage unit in Embodiment 5.

The gaming device A1100 illustrated in FIG. 46 includes a display unit A1200, a visible light ID control unit A1201, a device ID storage unit A1202, a device ID generation unit A1203, an Ethernet module unit A1204, a request information storage unit A1205, an app control unit A1206, an NFC module unit A1207, and a URL storage unit A1208 in which a URL identifying the server device A1102 is stored in advance.

Here, the request information storage unit A1205 has a ring buffer structure as illustrated in FIG. 47 and stores information indicating which user made a reservation. In other words, the request information storage unit A1205 is a standby queue having a ring buffer structure and holds a mobile terminal ID A1300, the number of rounds of play A1301, and the number of players A1302 as queue elements.

The following describes operations (behaviors) of the structural elements.

After the gaming device A1100 is started, the device ID generation unit A1203 generates a gaming device ID and stores the generated gaming device ID into the device ID storage unit A1202. In this embodiment, the gaming device ID is assumed to be "the unique identifier that can identify the gaming device A1100." More specifically, it is assumed to be an IP address allocated to the gaming device A1100.

Next, the visible light ID control unit A1201 reads the gaming device ID from the device ID storage unit A1202, reads a URL from the URL storage unit A1208, and obtains the number of waiting players having reservations from reservation information stored in the request information storage unit A1205. The visible light ID control unit A1201 generates a visible light ID by multiplexing the gaming device ID, the number of waiting players having reservations, the URL, the per-play charge, the maximum number of rounds of play, and the maximum number of players, and sends out, to the display unit A1200, an encoded signal resulting from encoding the visible light ID.

The display unit A1200 controls light emission based on the received encoded signal.

When receiving the mobile terminal ID, the number of rounds of play, and the number of players from the server device A1102, then the Ethernet module unit A1204 notifies the app control unit A1206 of the mobile terminal ID, the number of rounds of play, and the number of players.

The app control unit A1206 adds the mobile terminal ID, the number of rounds of play, and the number of players to the request information storage unit A1205. In this case, the request information storage unit A1205 functions as a standby queue. Immediately after the gaming device A1100 is started or at the time when the game is finished being played, the app control unit A1206 is placed in standby mode.

When the NFC module unit A1207 receives the mobile terminal ID from the mobile terminal while the app control unit A1206 is in standby mode, then the NFC module unit A1207 notifies the app control unit A1206 of the mobile terminal ID. When the received mobile terminal ID is equal to the mobile terminal ID A1300 at the head of a request queue in the request information storage unit A1205, the app control unit A1206 determines that a user holding the mobile terminal A1101 has issued a game start request, and starts the game.

[Internal Structure of Mobile Terminal A1101]

Subsequently, an internal structure of the mobile terminal A1101 is described with reference to FIG. 48.

Figure 48:
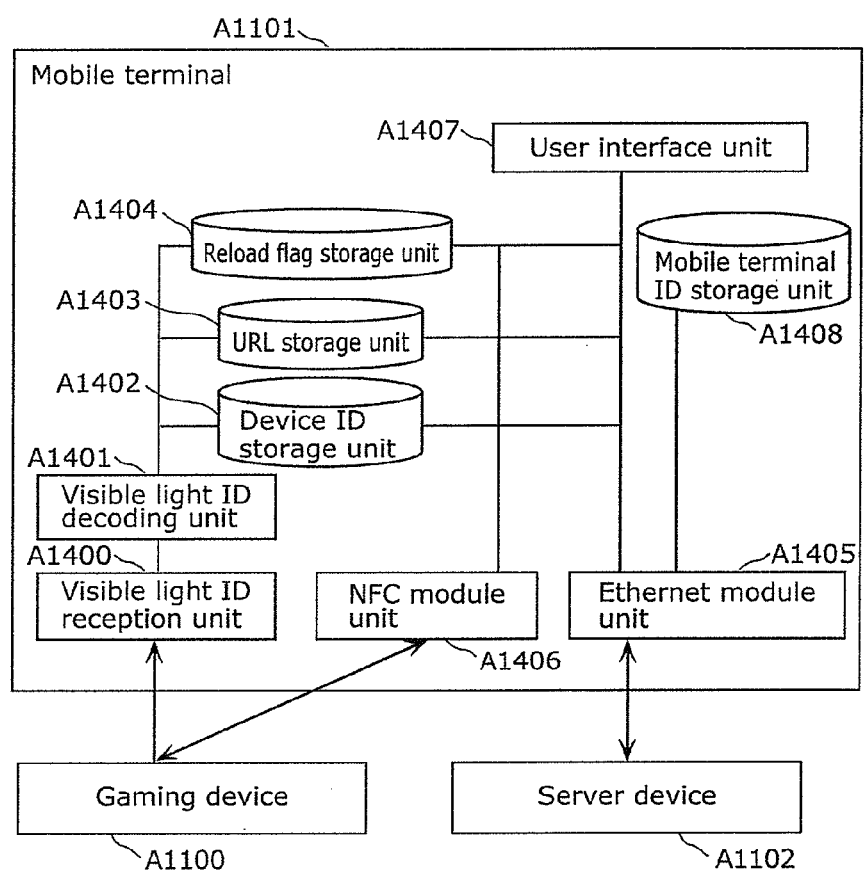
FIG. 48 illustrates an example of an internal structure of a mobile terminal in Embodiment 5.
Figure 49:
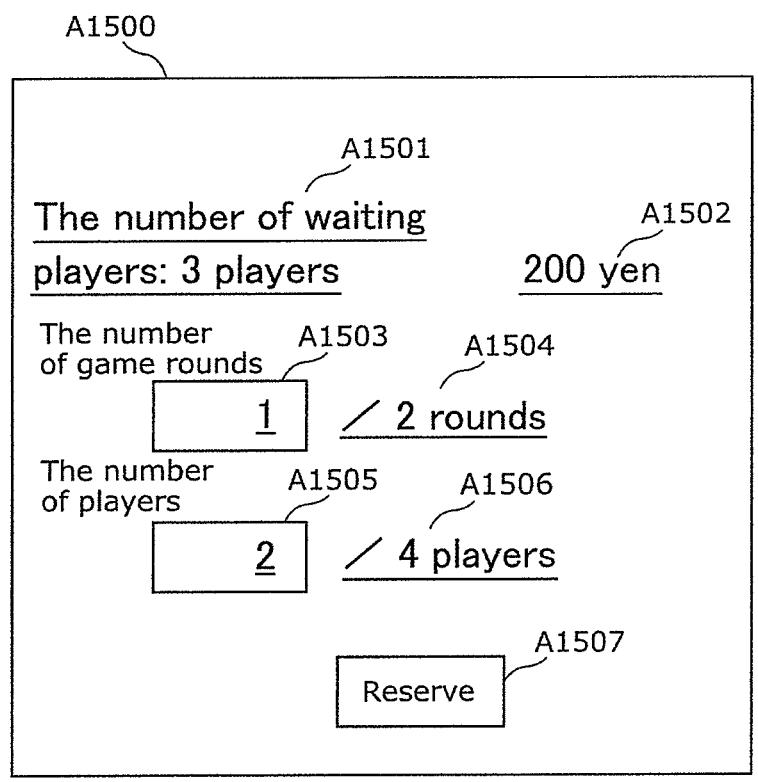
FIG. 49 illustrates an example of an overview of a game registration screen on a user interface unit in Embodiment 5.
Figure 50:
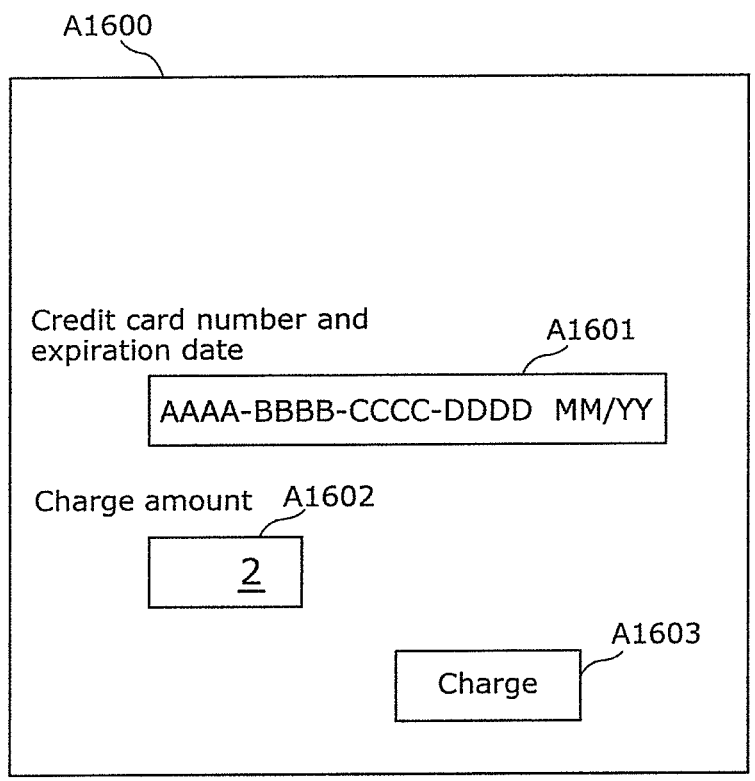
FIG. 50 illustrates an example of an overview of a charging screen on the user interface unit in Embodiment 5.

FIG. 48 illustrates an example of an internal structure of the mobile terminal in Embodiment 5. FIG. 49 illustrates an example of an overview of a game registration screen on a user interface unit in Embodiment 5. FIG. 50 illustrates an example of an overview of a charging screen on the user interface unit in Embodiment 5.

The mobile terminal A1101 illustrated in FIG. 48 includes a visible light ID reception unit A1400, a visible light ID decoding unit A1401, a device ID storage unit A1402, a URL storage unit A1403, a reload flag storage unit A1404 in which a load-incomplete flag is written with the mobile terminal A1101 being active, an Ethernet module unit A1405, an NFC module unit A1406, a user interface unit A1407, and a mobile terminal ID storage unit A1408.

Here, the user interface unit A1407 displays, as illustrated in FIG. 50, a fee-charging screen A1600 which includes at least a credit card information input unit A1601, a charge amount input unit A1602, and a charge button A1603. Here, the credit card information input unit A1601 is an entry field in which the number and the expiration date of a credit card are entered. The charge amount input unit A1602 is an entry field in which a charge amount is entered. The charge button A1603 is a button that serves as a trigger for executing a charging process.

Furthermore, as illustrated in FIG. 49, the user interface unit A1407 displays a game registration screen A1500 including a number-of-game-waiting-players display unit A1501, a per-play charge display unit A1502, a number-of-game-rounds input unit A1503, a maximum-number-of-rounds display unit A1504, a number-of-players input unit A1505, a maximum-number-of-players display unit A1506, and a reservation button A1507.

Here, the number-of-game-waiting-players display unit A1501 presents the number of other users who have already made play reservations in an attempt to play the game, and the per-play charge display unit A1502 displays a price for a single round of the game per person. The maximum-number-of-rounds display unit A1504 displays the allowable maximum number of rounds of the game per reservation, and the maximum-number-of-players display unit A1506 displays the allowable maximum number of players in the game at one time.

The number-of-game-rounds input unit A1503 is an entry field in which the number of rounds per reservation is entered, and the number-of-players input unit A1505 is an entry field in which the number of players who are playing the game at one time is entered. Text to be entered in the number-of-game-rounds input unit A1503 is a numerical value that is 1 or more, and is limited to less than the maximum number of rounds indicated in the maximum-number-of-rounds display unit A1504. Text to be entered in the number-of-players input unit A1505 is a numerical value that is 1 or more, and is limited to less than the maximum number of players indicated in the maximum-number-of-players display unit A1506.

The following describes behaviors of the structural elements.

A reservation button A1507 is a button for completing a reservation.

[Operations of Mobile Terminal A1101]

First, the operations (behaviors) of the mobile terminal A1101 seen at the time of adding an available fund to the server device are described.

The user interface unit A1407 displays the fee-charging screen A1600 illustrated in FIG. 50.

Next, suppose that the user interface unit A1407 detects a push on the charge button A1603 with the credit card information input unit A1601 filled in with the number and the expiration date of a credit card and the charge amount input unit A1602 filled in with a charge amount by a user. In this case, the user interface unit A1407 notifies the Ethernet module unit A1405 of the charge amount and the number and the expiration date of the credit card.

Next, the Ethernet module unit A1405 receives the notification and then transmits, to the server device A1102, the received number and expiration date of the credit card and the received charge amount along with the mobile terminal ID stored in the mobile terminal ID storage unit A1408.

After that, when the Ethernet module unit A1405 receives from the server device A1102 a notification that the payment has now been completed, then the user interface unit A1407 updates the content (rendering) displayed on the display to present that the payment transaction has now been completed.

Subsequently, the operations (behaviors) seen at the time when the mobile terminal A1101 receives visible light. Here, the visible light ID reception unit A1400 has a function equivalent to that of an imaging unit, and is rendered capable of visible light communication by setting its shutter speed to be fast after start up.

First, when receiving an encoded signal from the gaming device A1100, then the visible light ID reception unit A1400 sends out the received encoded signal to the visible light ID decoding unit A1401.

Next, the visible light ID decoding unit A1401 decodes the encoded signal and extracts the gaming device ID, the URL, the number of players waiting for the game, the per-play charge for the game, the maximum number of rounds of play, and the maximum number of players.

Next, when the extraction by the visible light ID decoding unit A1401 is completed, then the user interface unit A1407 reads a reload flag from the reload flag storage unit A1404. When the reload flag is a load-incomplete flag, the user interface unit A1407 issues a reload notification to the Ethernet module unit A1405 and writes a load-complete flag into the reload flag storage unit A1404.

Next, when receiving the reload notification, then the Ethernet module unit A1405 reads the URL from the URL storage unit A1403 and sends out an HTTP request to the address identified by the URL. When obtaining a response to the request, then the Ethernet module unit A1405 updates, based on content received in the response, the overview of the game registration screen A1500 to include the elements illustrated in FIG. 49. Here, in the process of updating the overview, the user interface unit A1407 displays the extracted number of players waiting for the game in the number-of-waiting-game-players display unit A1501, the extracted per-play charge for the game in the per-play charge display unit A1502, the extracted maximum number of rounds of play in A1505, and the extracted maximum number of players in the maximum-number-of-players display unit A1506.

Subsequently, suppose that a user pushes the reservation button A1507 with the number-of-game-rounds input unit A1503 and the number-of-players input unit A1505 filled in with numerical values by the user. The user interface unit A1407 then transmits, to the Ethernet module unit A1405, a notification that the button was pushed.

Next, when receiving the notification that the button was pushed, then the Ethernet module unit A1405 connects to the server device A1102 identified by the URL stored in the URL storage unit A1403. The Ethernet module unit A1405 transmits, to the server device A1102, the gaming device ID stored in the device ID storage unit A1402, the number of rounds of play entered in the number-of-game-rounds input unit A1503, the number of players entered in the number-of-players input unit A1505, the per-play charge received from the gaming device A1100, and the mobile terminal ID stored in the mobile terminal ID storage unit A1408.

Subsequently, when the Ethernet module unit A1405 receives from the server a notification that the payment has now been completed, the NFC module unit transitions to a state of waiting for the gaming device A1100 to become proximal thereto.

When sensing proximity of the gaming device A1100, then the NFC module unit A1406 sends out the gaming device ID to the gaming device A1100.

[Internal Structure of the Server Device A1102]

Subsequently, an internal structure of the server device A1102 is described with reference to FIG. 51.

Figure 51:
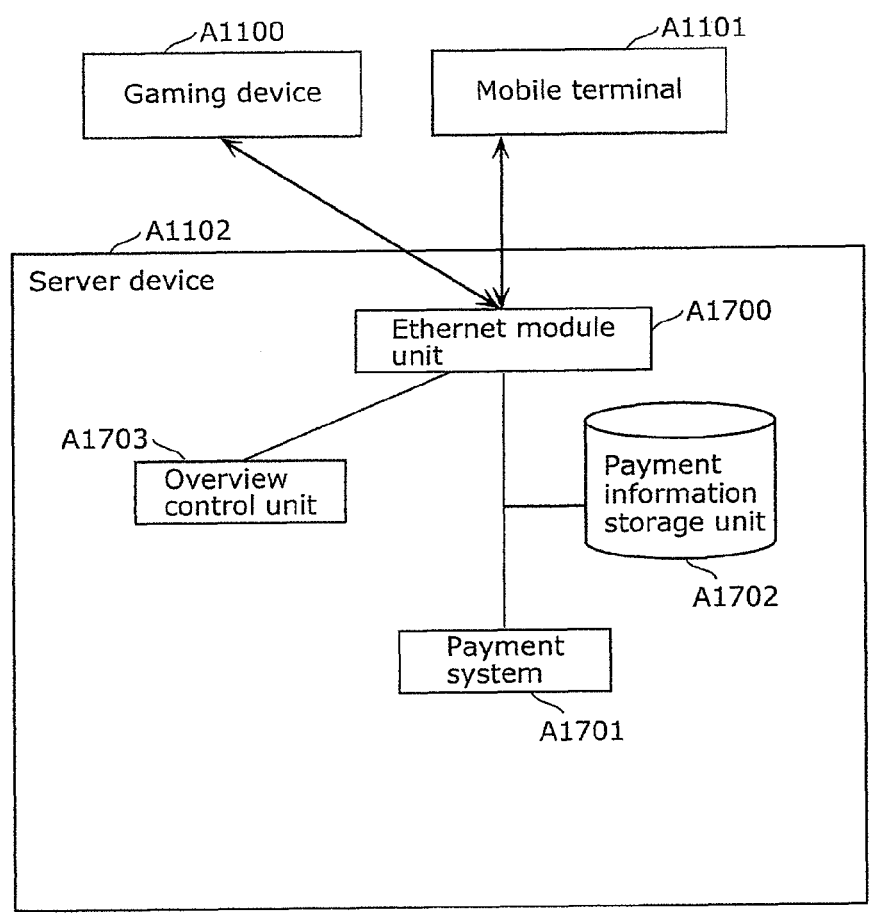
FIG. 51 illustrates an example of an internal structure of a server device in Embodiment 5.

FIG. 51 illustrates an example of the internal structure of the server device in Embodiment 5. FIG. 52 illustrates an example of information stored in a payment information storage unit in Embodiment 5.

The server device A1102 includes an Ethernet module unit A1700, a payment system A1701, a payment information storage unit 1702, and an overview control unit A1703 as illustrated in FIG. 51.

Here, the payment information storage unit A1702 has a structure as illustrated in FIG. 52, thereby storing information. Specifically, the payment information storage unit A1702 includes, for example: a mobile terminal ID column A1801 in which the mobile terminal ID is stored; a credit card information column A1802 in which the number and the expiration date of a credit card are stored; and a balance column A1803 in which the balance is stored.

[Operations of Server Device A1102]

First, the operations (behaviors) of the server device A1102 seen at the time of performing a charging process are described. Here, the charging process is a process of adding an available fund to a database inside the server based on transmission from the mobile terminal A1101.

First, suppose that the Ethernet module unit A1700 of the server device A1102 receives the mobile terminal ID, the number and the expiration date of a credit card, and the charge amount from the mobile terminal A1101

Next, the Ethernet module unit A1700 searches the payment information storage unit A1702 for a set of the received mobile terminal ID and the received number and expiration date of the credit card.

If a corresponding set is not retrieved, the Ethernet module unit A1700 newly adds the set of the mobile terminal ID and the number and the expiration date of the credit card and writes the charge amount into the balance column A1803 in the added row.

On the other hand, when a corresponding set is already present, the Ethernet module unit A1700 increases the content of the balance column A1803 in the corresponding row for the charge amount.

On completion of the above charging process, the server device A1102 notifies the communication originator, i.e., the mobile terminal A1101, that the charging has now been completed.

Subsequently, the operations (behaviors) of the server device A1102 are described which is seen at the time of accepting, from the mobile terminal A1101, a reservation to play the game.

First, when receiving the HTTP request from the mobile terminal A1101, then the Ethernet module unit A1700 transmits a notification to the overview control unit A1703.

Next, the overview control unit A1703 receives the above notification and then notifies the Ethernet module unit A1700 of HTML data which will be overview data.

Next, the Ethernet module unit A1700 receives the notification and then sends out the HTML data to the mobile terminal A1101.

Next, when receiving the gaming device ID, the per-play charge, the number of rounds of play, the number of players, and the mobile terminal ID from the mobile terminal A1101, then the Ethernet module unit A1700 searches the payment information storage unit A1702 for a corresponding mobile terminal ID.

If the corresponding mobile terminal ID is retrieved, the Ethernet module unit A1700 updates the charge amount associated with the mobile terminal ID in the balance column A1803 in the corresponding row in the payment information storage unit A1702 according to the per-play charge, the number of rounds of play, and the number of players.

Next, on completion of the updating process, the Ethernet module unit A1700 notifies the mobile terminal A1101 that the payment has now been completed. Furthermore, the Ethernet module unit A1700 identifies the gaming device A1101 that is subject to the play reservation, from the gaming device ID, that is, IP, received from the mobile terminal A1101, and transmits the mobile terminal ID, the number of rounds of play, and the number of players to the gaming device A1100.

[Flow for Processing in Billing System]

Subsequently, processing in the billing system in Embodiment 5 is described.

[Flow for Charging Fee]

Figure 53:
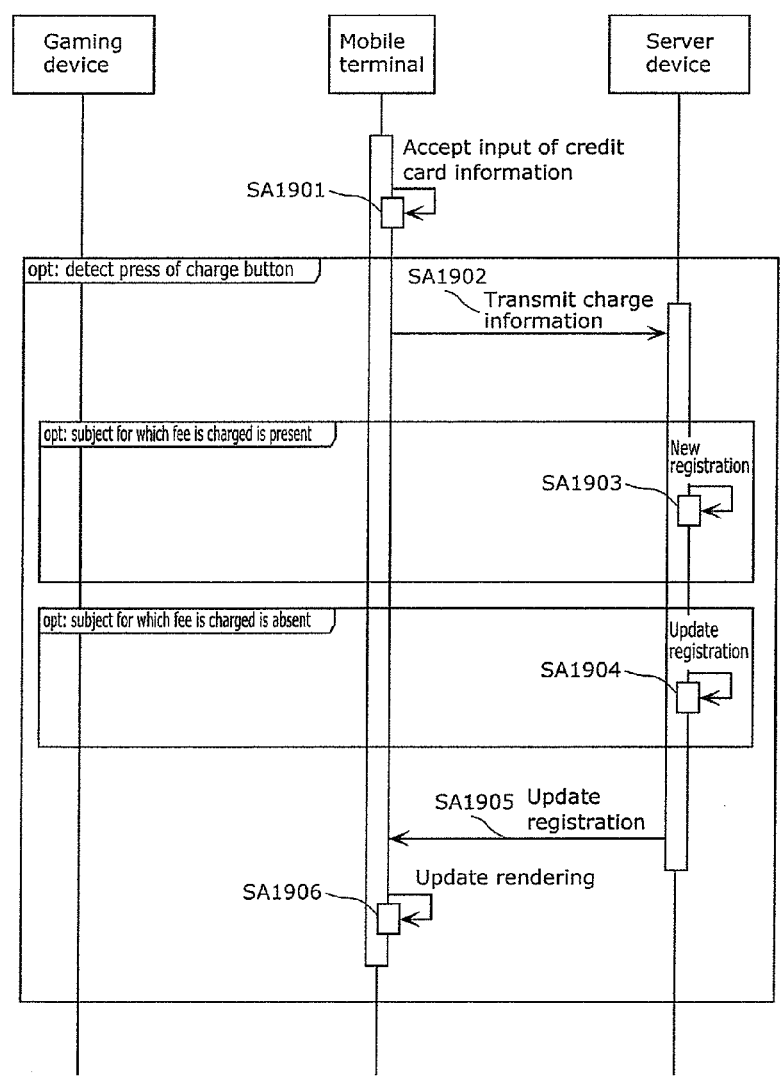
FIG. 53 illustrates an example of a flow for charging a fee in the billing system in Embodiment 5.

First, a flow for charging a fee for a game is described with reference to FIG. 53. Here, FIG. 53 illustrates an example of a flow for charging a fee in the billing system in Embodiment 5.

First, on the mobile terminal A1101, input of credit card information is accepted (Step SA1901). Specifically, the user interface unit A1407 detects a user's push on the charge button A1603 with the credit card information input unit A1601 filled in with the number and expiration date of a credit card and the charge amount input unit A1602 filled in with a charge amount by the user. The user interface unit A1407 then notifies the Ethernet module unit A1405 of the charge amount and the number and the expiration date of the credit card.

Next, the mobile terminal A1101 transmits charge information to the server device A1102 (Step SA1902). Specifically, the Ethernet module unit A1405 receives the notification and then transmits, to the server device A1102, the received number and expiration date of the credit card and the received charge amount along with the mobile terminal ID stored in the mobile terminal ID storage unit A1408.

Next, the server device A1102 processes a new registration (Step SA1903). Specifically, when receiving the mobile terminal ID, the number and the expiration date of the credit card, and the charge amount from the mobile terminal A1101, then the Ethernet module unit A1700 searches the payment information storage unit A1702 for a set of the received mobile terminal ID and the received number and expiration date of the credit card. If a corresponding set is not retrieved, the Ethernet module unit A1700 newly adds the set of the mobile terminal ID and the number and the expiration date of the credit card and writes the charge amount into the balance column A1803 in the added row.

On the other hand, when a corresponding set has already been registered, the server device A1102 updates the registration (Step SA1904). Specifically, the Ethernet module unit A1700 searches the payment information storage unit A1702 for a set of the received mobile terminal ID and the received number and expiration date of the credit card, and if a corresponding set is already present, increases the content of the balance column A1803 in the corresponding row for the charge amount.

Next, on completion of the above charging process, the server device A1102 notifies the communication originator, i.e., the mobile terminal A1101, of completion of the charging process (the registration update) (Step SA1905).

Next, the mobile terminal A1101 updates the rendering (Step SA1906). Specifically, when the Ethernet module unit A1405 receives from the server device A1102 a notification that the payment has now been completed, then the user interface unit A1407 updates the content (the rendering) displayed on the display to present that the payment transaction has now been completed.

[Flow for Updating UI]

Figure 54:
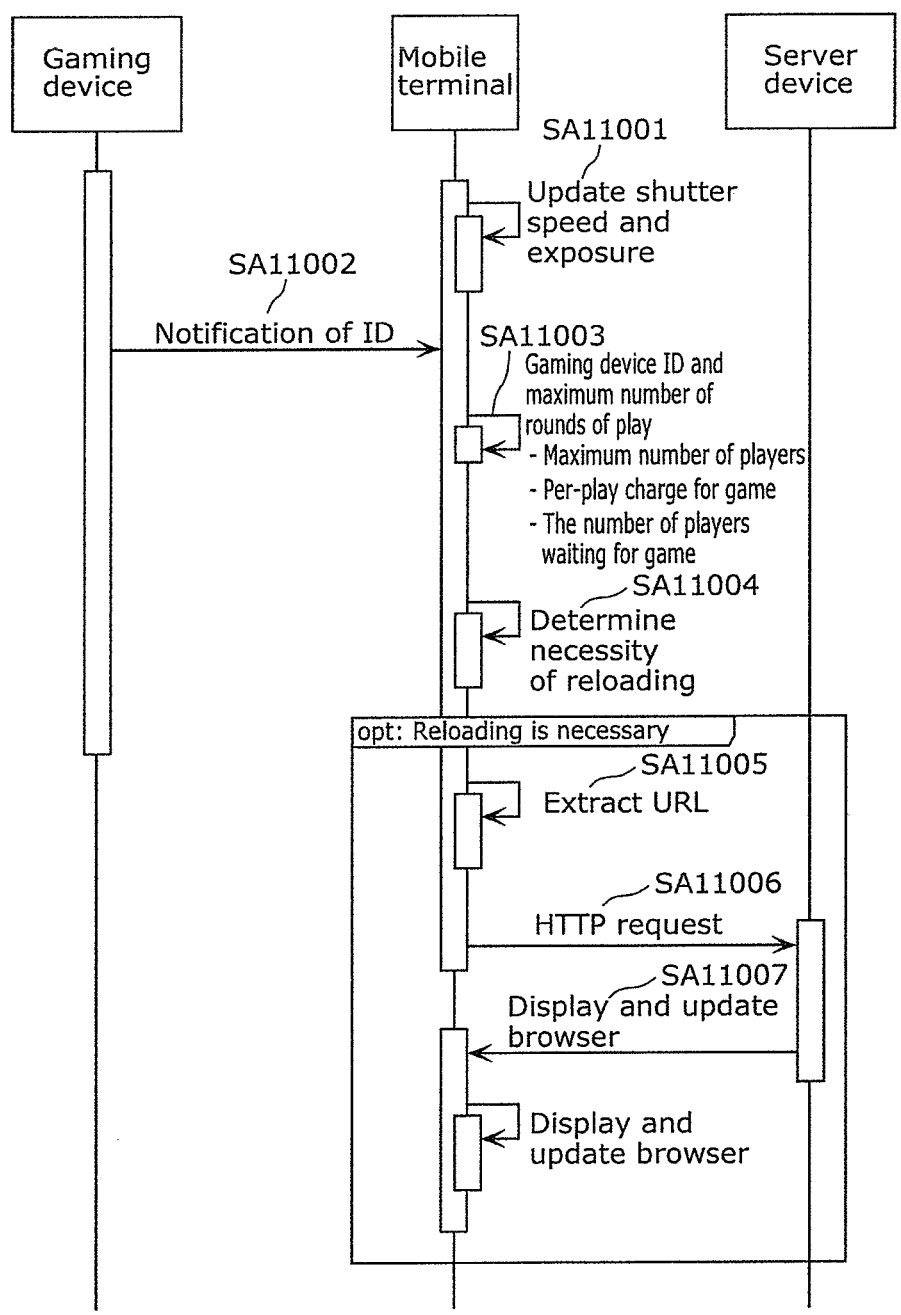
FIG. 54 illustrates an example of a flow for updating UI in the billing system in Embodiment 5.

Subsequently, a flow for updating UI is described with reference to FIG. 54. FIG. 54 illustrates an example of a flow for updating UI in the billing system in Embodiment 5. Updating UI means updating, by the mobile terminal A1101, the overview of the user interface unit A1407 as a result of the visible light ID being transmitted from the gaming device A1100.

First, the mobile terminal A1101 updates the shutter speed and the exposure (Step SA11001). Specifically, the visible light ID reception unit A1400 included in the mobile terminal A1101 has a function equivalent to that of an imaging unit, and is rendered capable of visible light communication by setting its shutter speed to be fast after start up.

Next, the gaming device A1100 transmits a notification of ID through the visible light communication (Step SA11002). Specifically, the device ID generation unit A1203 generates a gaming device ID and stores the generated gaming device ID into the device ID storage unit A1202. Here, the gaming device ID is, for example, "the unique identifier that can identify the gaming device A1100." In this embodiment, the gaming device ID is assumed to be an IP address allocated to the gaming device A1100. Subsequently, the visible light ID control unit A1201 reads the gaming device ID from the device ID storage unit A1202, reads a URL from the URL storage unit A1208, and generates a visible light ID by multiplexing the gaming device ID, the number of waiting players having reservations, the URL, the per-play charge, the maximum number of rounds of play, and the maximum number of players. The visible light ID control unit A1201 sends out, to the display unit A1200, an encoded signal resulting from encoding the visible light ID. The display unit A1200 then controls light emission based on the received encoded signal. Thus, the gaming device A1100 is capable of transmitting the gaming device ID through the visible light communication.

Next, the mobile terminal A1101 extracts the gaming device ID, the maximum number of rounds of play, and so on (Step SA11003). Specifically, when receiving an encoded signal from the gaming device A1100, then the visible light ID reception unit A1400 sends out the received encoded signal to the visible light ID decoding unit A1401. The visible light ID decoding unit A1401 decodes the encoded signal and extracts the gaming device ID, the URL, the number of players waiting for the game, the per-play charge for the game, the maximum number of rounds of play, and the maximum number of players (Step SA11003).

Next, the mobile terminal A1101 determines necessity of reloading (Step SA11004). Specifically, when the extraction is completed, then the user interface unit A1407 reads a reload flag from the reload flag storage unit A1404. When the read reload flag is a load-incomplete flag, the user interface unit A1407 issues a reload notification to the Ethernet module unit A1405 and writes a load-complete flag into the reload flag storage unit A1404.

Next, when it is determined that the reloading is necessary, then the mobile terminal A1101 extracts the URL (Step SA11005) and sends out an HTTP request to the server device A1102 (Step SA11006). Specifically, when receiving the reload notification, then the Ethernet module unit A1405 reads the URL from the URL storage unit A1403 and sends out the HTTP request to the address identified by the URL (the server device A1102).

Next, the server device A1102 sends out, to the mobile terminal A1101, HTML data for displaying or updating a browser (Step SA11007). Specifically, when receiving the HTTP request from the mobile terminal A1101, then the Ethernet module unit A1700 transmits a notification to the overview control unit A1703. The overview control unit A1703 receives the notification and then notifies the Ethernet module unit A1700 of the HTML data which will be overview data. The Ethernet module unit A1700 receives the notification and then sends out the HTML data to the mobile terminal A1101.

Next, the mobile terminal A1101 displays or updates the browser. Specifically, when obtaining a response from the server device A1102, then the user interface unit A1407 updates the overview of the game registration screen A1500 to include the elements illustrated in FIG. 49, based on content received in the response. In this embodiment, in the process of updating the overview, the user interface unit A1407 displays the extracted number of players waiting for the game in the number-of-waiting-game-players display unit A1501, the extracted per-play charge for the game in the per-play charge display unit A1502, the extracted maximum number of rounds of play in A1505, and the extracted maximum number of players in the maximum-number-of-players display unit A1506.

[Flow for Making Reservation to Play Game]

Figure 55:
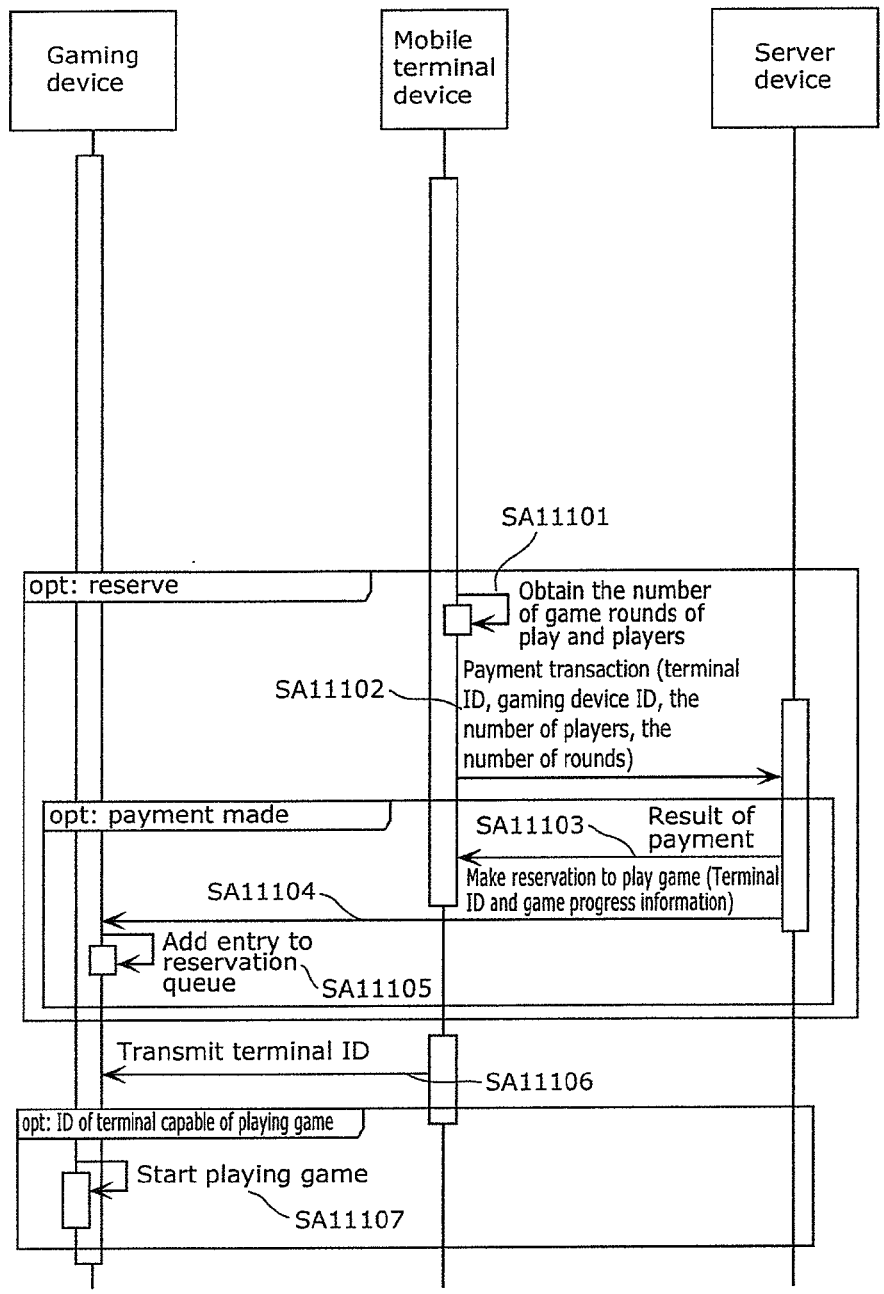
FIG. 55 illustrates an example of a flow for making a reservation to play a game in the billing system in Embodiment 5.

Subsequently, a flow in the case of making a reservation to play a game is described with reference to FIG. 55. FIG. 55 illustrates an example of a flow for making a reservation to play a game in the billing system in Embodiment 5.

First, the mobile terminal A1101 obtains the number of game rounds of play and the number of players (Step SA11101). Specifically, suppose that, first, the reservation button A1507 is pushed with the number-of-game-rounds input unit A1503 and the number-of-players input unit A1505 provided by the user interface unit A1407, filled in with numerical values by a user. The user interface unit A1407 then transmits, to the Ethernet module unit A1405, a notification that the button was pushed.

Next, the mobile terminal A1101 performs payment transaction (Step SA11102). Specifically, when receiving the notification that the button was pushed, then the Ethernet module unit A1405 connects to the server device A1102 identified by the URL stored in the URL storage unit A1403. The Ethernet module unit A1405 transmits, to the server device A1102, the gaming device ID stored in the device ID storage unit A1402, the number of rounds of play entered in the number-of-game-rounds input unit A1503, the number of players entered in the number-of-players input unit A1505, the per-play charge received from the gaming device A1100, and the mobile terminal ID (terminal ID in the drawing) stored in the mobile terminal ID storage unit A1408.

Next, the server device A1102 notifies the mobile terminal A1101 of a payment result (Step S11103). Specifically, when receiving the gaming device ID, the per-play charge, the number of rounds of play, the number of players, and the mobile terminal ID (payment transaction) from the mobile terminal A1101, then the Ethernet module unit A1700 searches the payment information storage unit A1702 for a corresponding mobile terminal ID. If the corresponding mobile terminal ID is retrieved, the Ethernet module unit A1700 updates the charge amount associated with the mobile terminal ID in the balance column A1803 in the corresponding row in the payment information storage unit A1702 according to the per-play charge, the number of rounds of play, and the number of players. On completion of the updating process, the Ethernet module unit A1700 notifies the mobile terminal A1101 that the payment has now been completed. Subsequently, in the mobile terminal A1101, when the Ethernet module unit A1405 receives from the server the notification that the payment has now been completed, the NFC module unit transitions to a state of waiting for the gaming device A1100 to become proximal thereto.

Next, the server device A1102 transmits, to the gaming device A1100, content of the reservation to play the game (Step S11104). Specifically, the server device A1102 identifies the gaming device A1100 that is subject to the play reservation, from the gaming device ID, that is, IP, received from the mobile terminal A1101, and transmits the mobile terminal ID, the number of rounds of play, and the number of players (the content of the reservation to play the game) to the gaming device A1100.

Next, the gaming device A1100 receives the reservation to play the game and adds an entry to a reservation queue (Step SA11105). Specifically, when receiving the mobile terminal ID, the number of rounds of play, and the number of players (the content of the reservation to play the game) from the server device A1102, then the Ethernet module unit A1204 notifies the app control unit A1206 of the mobile terminal ID, the number of rounds of play, and the number of players (the reservation to play the game). The app control unit A1206 adds the mobile terminal ID, the number of rounds of play, and the number of players (the content of the reservation to play the game) to the request information storage unit A1205. In this embodiment, the request information storage unit A1205 functions as a standby queue. Immediately after the gaming device A1100 is started or at the time when the game is finished being played, the app control unit A1206 is placed in standby mode.

Next, the mobile terminal A1101 transmits the terminal ID (the mobile terminal ID) to the gaming device A1100 (Step SA11106). Specifically, when sensing proximity (a touch operation) of the gaming device A1100, then the NFC module unit A1406 sends out the mobile terminal ID to the gaming device A1100.

Next, the gaming device A1100 starts the game for the user to play (Step SA11107). Specifically, when receiving the mobile terminal ID from the mobile terminal 1101 while the app control unit A1206 is in standby mode, then the NFC module unit A1207 notifies the app control unit A1206 of the mobile terminal ID. When the received mobile terminal ID is equal to the mobile terminal ID A1300 at the head of a request queue in the request information storage unit A1205, the app control unit A1206 determines that a user holding the mobile terminal A1101 has issued a game start request, and starts the game.

[Effect]

As above, the communication method in this embodiment is a communication method used by a billing system having a mobile terminal and a device, which includes: performing, by the mobile terminal, visible light communication with the device, thereby obtaining a device identifier uniquely identifying the device and an URL of a server for performing a billing process for a use of the device; establishing, by the mobile terminal, connection with the server at the obtained URL, using the device identifier obtained in the performing and a terminal identifier uniquely identifying the mobile terminal; and performing a billing process with the server at the URL with which the mobile terminal established the connection.

Furthermore, for example, in the communication method in this embodiment, the establishing may further include: inputting an ID uniquely identifying a user of the mobile terminal and a password for establishing the connection using the ID.

Therefore, the system or the like having the billing function in this embodiment allows a user to make a reservation to play the game, even in a situation where another user is using the gaming device A1100, by using the mobile terminal A1101 from a location a few or few dozens of meters away from the gaming device A1100 without inserting a coin into the gaming device A1100. Furthermore, according to the system or the like having the billing function in this embodiment, a touch operation starts the game, which makes it also possible to prevent a user who cannot view the gaming device A1100 from making an unnecessary play reservation for some mischievous purpose.

It is to be noted that although the gaming device ID is assumed to be an IP address allocated to the gaming device A1100 in this embodiment, this is not the only example. The gaming device ID may be anything including information like a MAC address, for example, as long as this is "the unique identifier that can identify the gaming device A1100."

Furthermore, in this embodiment, the server device A1102 stores the mobile terminal ID into the payment information storage unit A1702. This is originally not for identifying the mobile terminal, but for identifying a user using the mobile terminal. Therefore, in order that a particular user can play the game by entering the same user ID on a plurality of mobile terminals, a user ID for identifying the user may be used instead of mobile terminal IDs for identifying the mobile terminals.

Furthermore, although making a notification of the gaming device ID has been described herein as making a notification of an ID of a single type obtained by encoding all the gaming device ID, the number of waiting players having reservations, the URL, the per-play charge, the maximum number of rounds of play, and the maximum number of players, the embodiment is not limited to the constant use of the same ID in the communication through the visible light communication. For example, an exclusive URL for ranking may be encoded as an ID in the case of a game ranking screen, or modified content of the per-play charge, the maximum number of rounds of play, and the maximum number of players may be encoded as an ID in the case where an excessive number of reservations to play the game have been made. Limiting the number of playable rounds per reservation, that is, encoding with the maximum number of rounds of play set to a small value, according to a reservation status, will also solve over-crowded reservations.

Furthermore, it may be that when the server device A1102 transmits the reservation screen illustrated in FIG. 49 to the mobile terminal A1101, a reservation status is received from the gaming device A1100 so that the overview of FIG. 49 is changed to limit reservations for the mobile terminal ID with which no less than a predetermined number of play reservations has been stored in the request information storage unit A1205 of the gaming device A1100.

It is to be noted that this embodiment has described the case of using the mobile terminal to charge a fee for the gaming device such as an arcade game installed in an amusement arcade, a resort, and so on, the embodiment is not limited to the gaming device.

For example, the same may apply to fitness equipment such as a stationary bike in a fitness center or a pre-pay television device in a hotel.

Here, in the case of fitness equipment, it is sufficient that the billing system in this embodiment includes: fitness equipment; an NFC unit installed in the fitness equipment; a light emitting unit installed in a position in the fitness equipment that is easily visible from a user; the server; and the mobile terminal. Here, it is sufficient that the mobile terminal has functions of visible light communication and near field communication (NFC). Furthermore, as long as the light emitting unit is for visible light communication, it is irrelevant whether or not the light emitting unit is capable of displaying video.

This allows a user to use the mobile terminal to pair it with the fitness equipment and make a play (training) reservation through visible light communication by directing the mobile terminal to the light emitting unit installed in the fitness equipment. When a person ahead of the user in the queue is finished using the fitness equipment, the user can start the play by performing NFC using the mobile terminal in standby mode (the operation to place the mobile terminal over the light emitting unit). In addition, the fitness equipment may record a length of use and calories burned per user and accumulate them in the server.

Furthermore, in the case of the pre-pay television device, it is sufficient that the billing system in this embodiment includes: a television device; a light emitting unit, which is not a television image projection unit, but is something like a beacon; and the mobile terminal. Furthermore, it may also be possible to include the function described in Embodiment 2 and Embodiment 3 in which unauthorized login by a third party from outside the room where the television device is installed can be prevented.

This allows a user to feel at ease using the mobile terminal to pair it with the television device and power on the television device as well as to send a command to change television channels through visible light communication by directing the mobile terminal to the light emitting unit.

Embodiment 6

In this embodiment, a communication system or the like having a navigation function that uses visible light communication is described.

Figure 56:
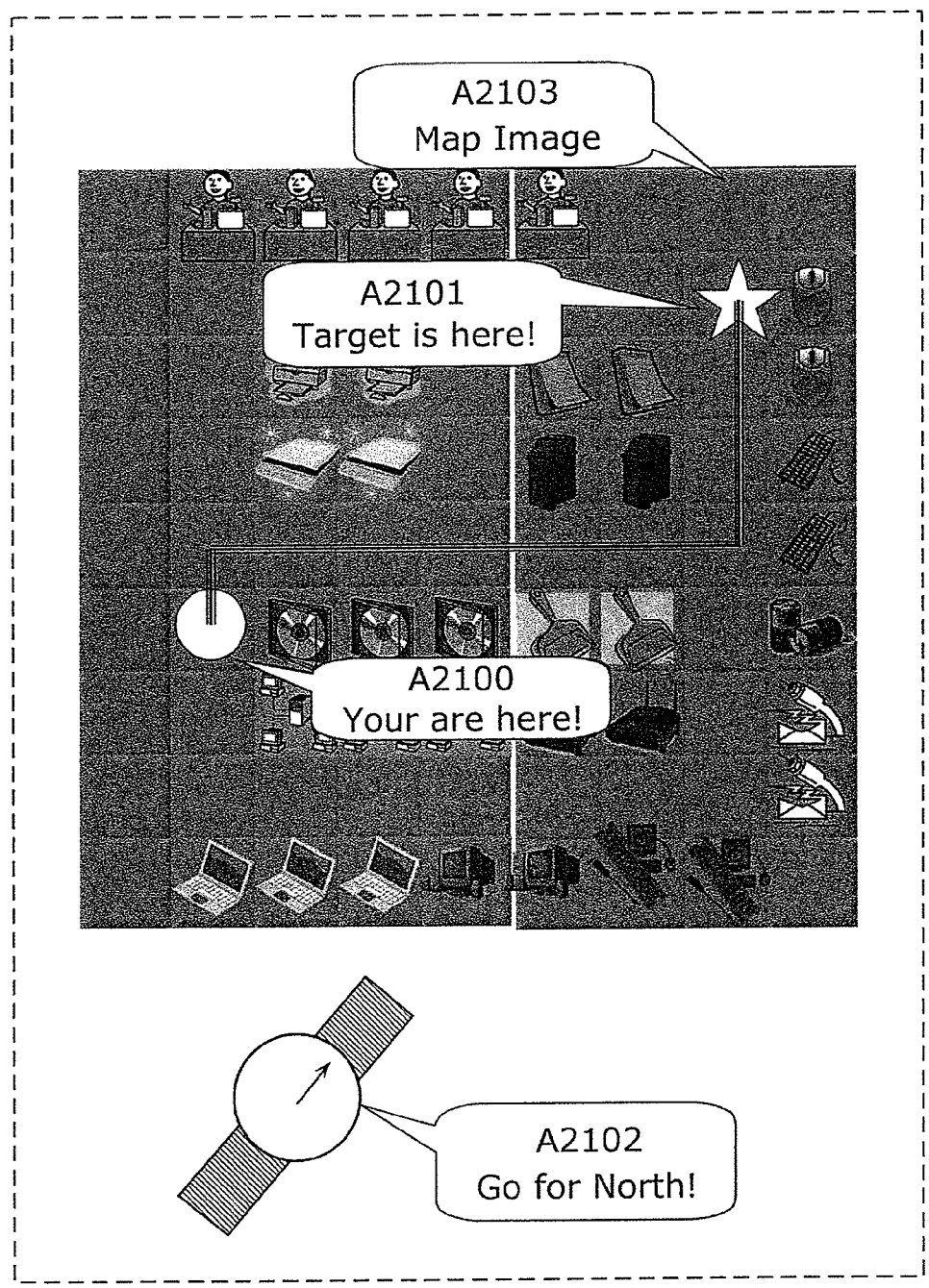
FIG. 56 conceptually illustrates detection of map locations in Embodiment 6.

FIG. 56 conceptually illustrates detection of map locations in Embodiment 6.

The communication system in this embodiment performs navigation in which a location of a user on a map A2103 (a location A2100) is detected, the location of the user and a target position (a location A2101) are presented, and a route from the location of the user to the target position is presented, as illustrated in FIG. 56, for example.

In the example illustrated in FIG. 56, the communication system in this embodiment detects the location A2100 of the user on the map A2103 representing an area inside a store and displays, on the map A2103, the location A2100 and the location A2101 indicating the target position. Here, in the case where the user aims to buy a mouse (a commodity), the location A2101 is a position of a shelf on which mouses (commodities) are placed. Furthermore, in FIG. 56, the communication system in this embodiment displays the shortest route which connects the two points, the location A2100 and the location A2101 indicating the target position, thereby performing the navigation. Furthermore, the communication system in this embodiment causes a device including a communication terminal, such as a watch device, to display, as illustrated in A2102, a direction in which the user needs to move, from the position and orientation of the user and the shortest route information.

A structure of the communication system in this embodiment is described below.

Figure 57:
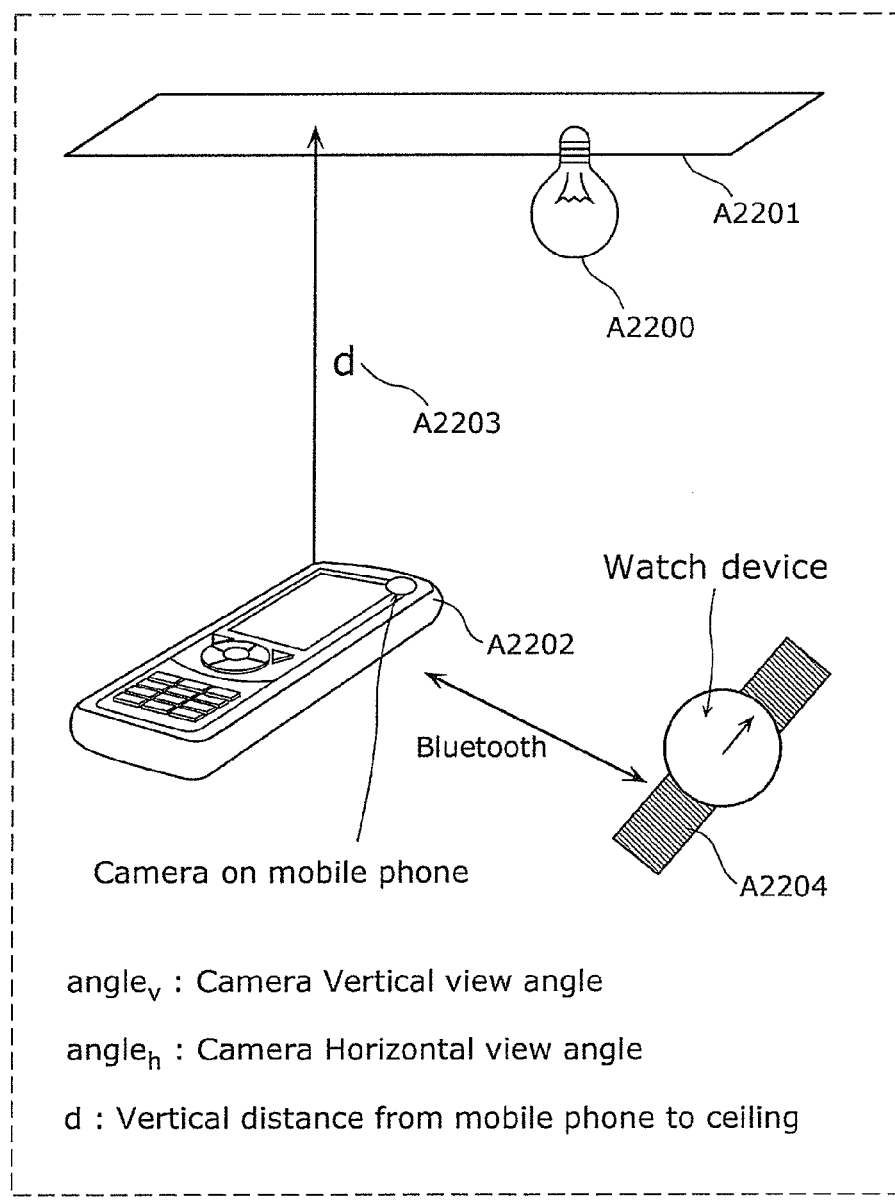
FIG. 57 illustrates an overall structure of a communication system in Embodiment 6.

FIG. 57 illustrates an overall structure of the communication system in Embodiment 6.

The communication system illustrated in FIG. 57 has a navigation function and includes a lighting device A2200, a mobile terminal A2202, and a watch device A2204.

The following describes the structural elements.
[Structure of Lighting Device]

Figure 58:
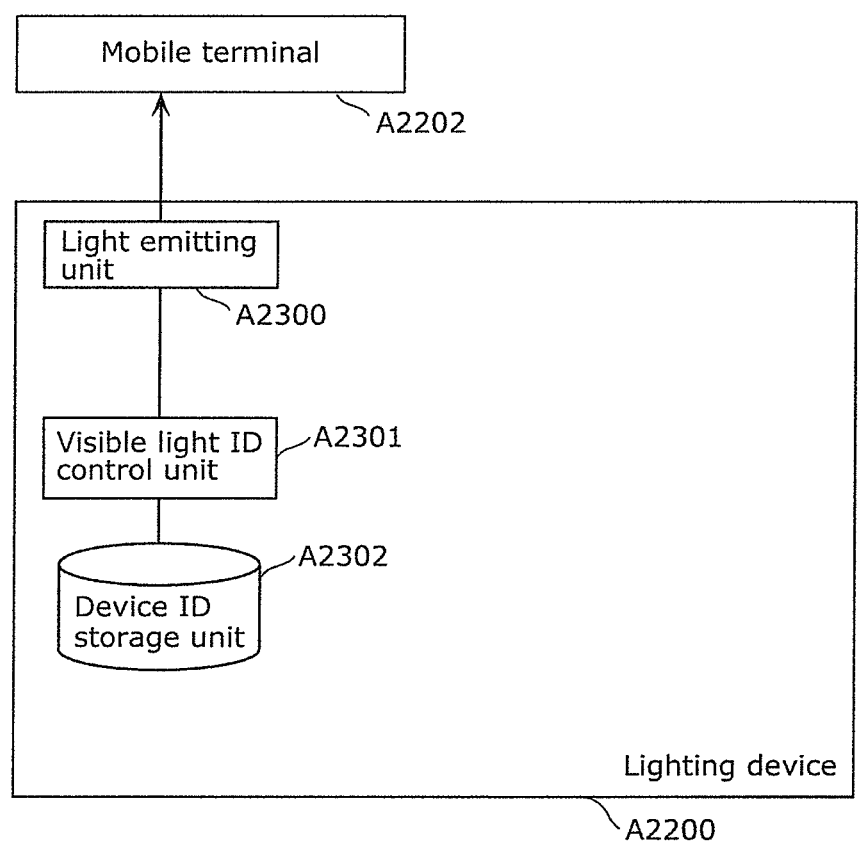
FIG. 58 illustrates an example of an internal structure of a lighting device in Embodiment 6.

FIG. 58 illustrates an example of an internal structure of the lighting device in Embodiment 6.

The lighting device A2200 illustrated in FIG. 58 includes a light emitting unit A2300, a visible light ID control unit A2301, and a device ID storage unit A2302.

A device ID storage unit 2402 stores a predetermined numerical value.

After the lighting device A2200 is powered on, the visible light ID control unit A2301 reads the device ID stored in the device ID storage unit A2302, multiplexes the device ID into a visible light ID. The visible light ID control unit A2301 sends out, to the light emitting unit A2300, an encoded signal obtained by encoding the visible light ID.

The light emitting unit A2300 controls light emission based on the received encoded signal, thereby performing the visible light communication with the mobile terminal A2202.

[Structure of Mobile Terminal]

Subsequently, an internal structure of the mobile terminal A2202 is described with reference to FIG. 59.

Figure 59:
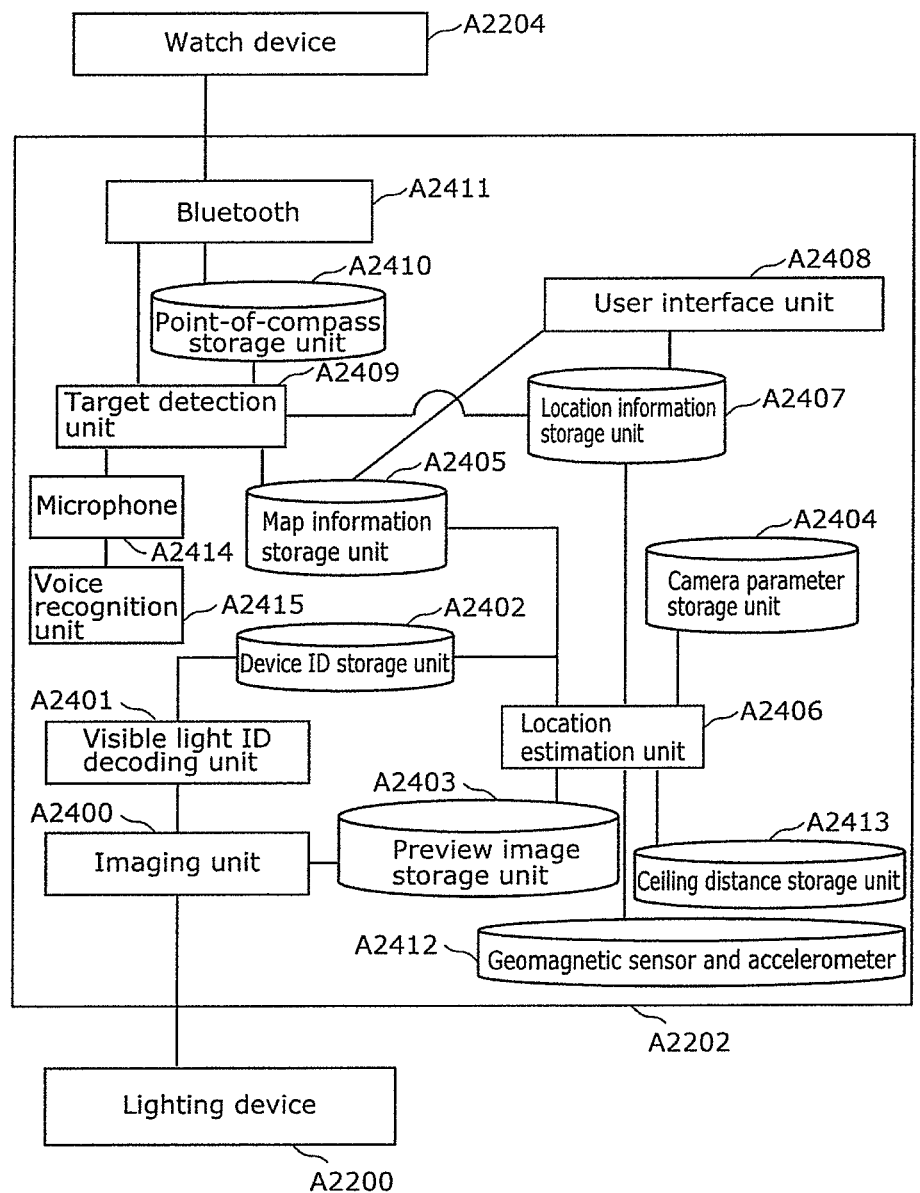
FIG. 59 illustrates an example of an internal structure of a mobile terminal in Embodiment 6.

FIG. 59 illustrates an example of an internal structure of the mobile terminal in Embodiment 6.

The mobile terminal A2202 illustrated in FIG. 59 includes an imaging unit A2400, a visible light ID decoding unit A2401, a device ID storage unit A2402, a preview image storage unit A2403, a camera parameter storage unit A2404, a map information storage unit A2405, a location estimation unit A2406, a location information storage unit A2407, a user interface unit A2408, a target detection unit A2409, a point-of-compass storage unit A2410, a Bluetooth A2411, a geomagnetic sensor and accelerometer A2412, a ceiling distance storage unit A2413, a microphone A2414, and a voice recognition unit A2415.

The following describes behaviors of the structural elements with reference to the drawings.

Figure 60:
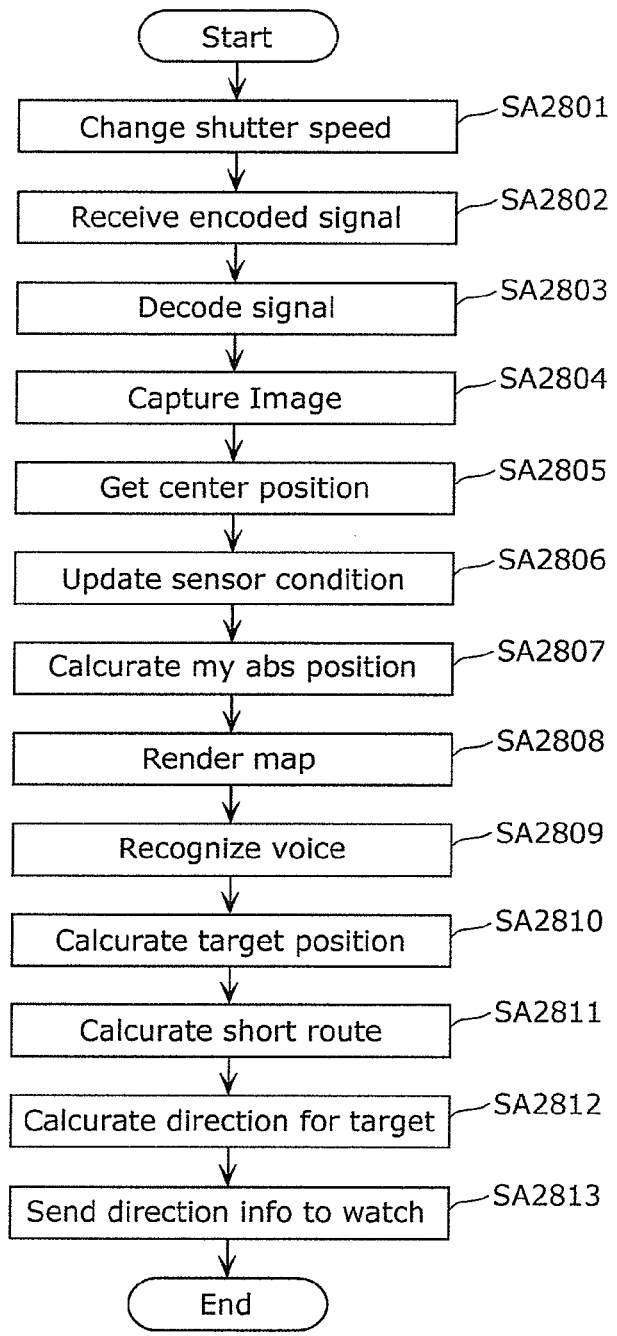
FIG. 60 is a flowchart illustrating an operation of a communication system in Embodiment 6.
Figure 61:
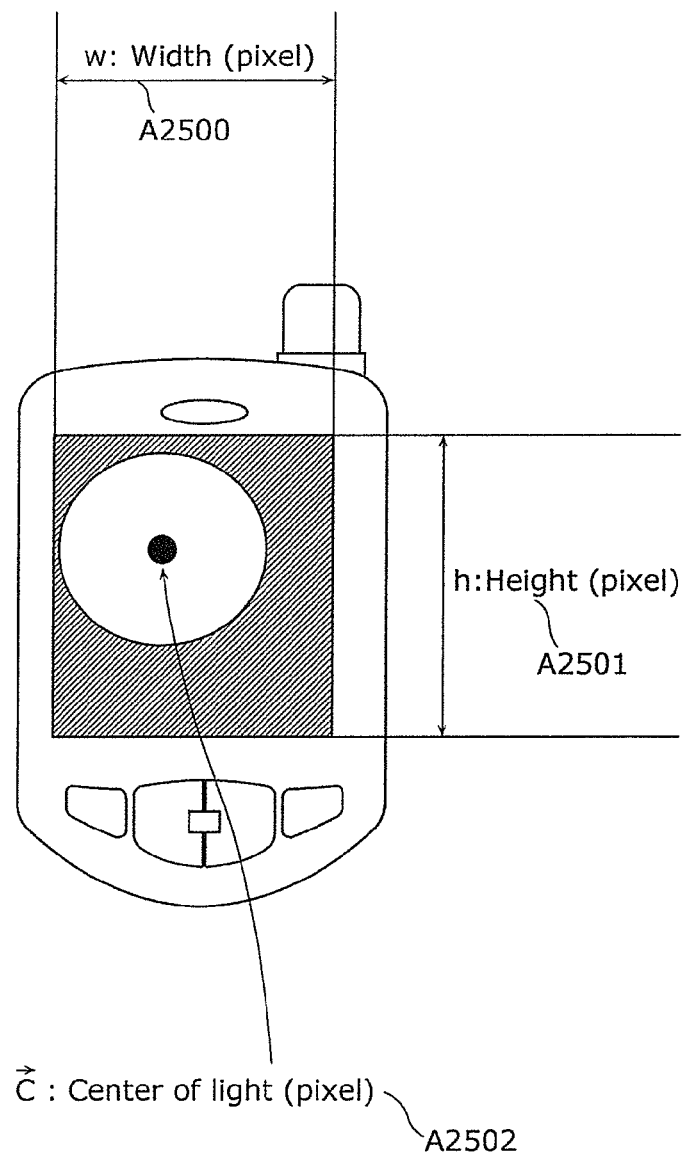
FIG. 61 illustrates an example of a preview image in Embodiment 6.
Figure 62:
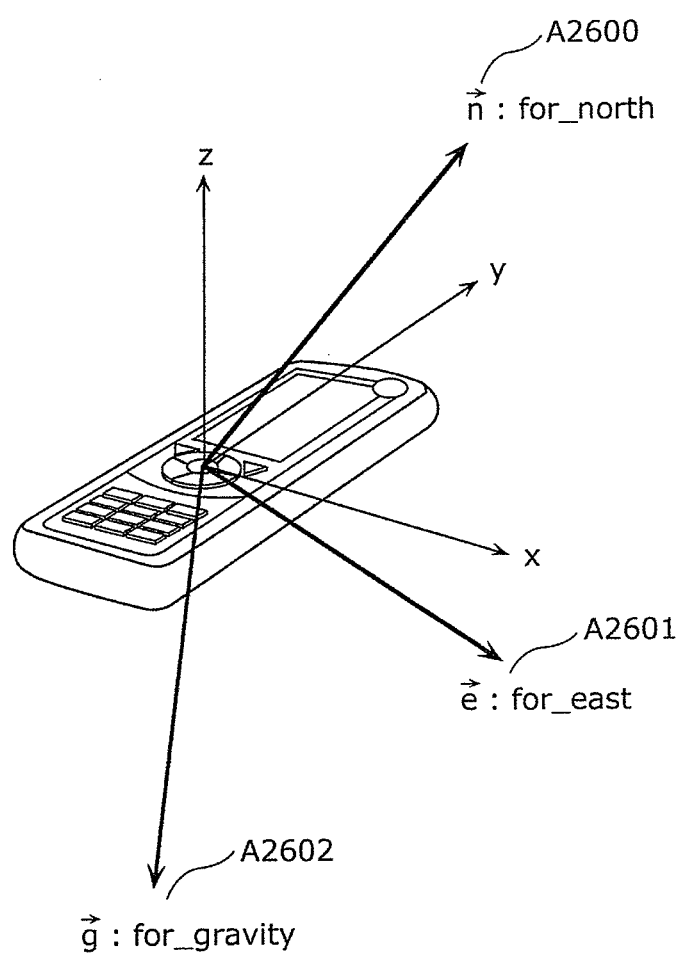
FIG. 62 illustrates geomagnetic and gravitational directions of a mobile terminal including a communication device in Embodiment 6.

FIG. 60 is a flowchart illustrating an operation of the communication system in Embodiment 6. FIG. 61 illustrates an example of a preview image in Embodiment 6. FIG. 62 illustrates geomagnetic and gravitational directions of a mobile terminal including a communication device in Embodiment 6. FIG. 63 illustrates an example of a computational expression for determining a relative location of the mobile terminal to a subject in Embodiment 6.

First, the ceiling distance storage unit A2413 stores, in advance, d indicated in A2203 in FIG. 57, that is, a value of "a vertical distance from the mobile terminal A2202 to the ceiling A2201" determined as a fixed value.

Next, the imaging unit A2400 is rendered capable of visible light communication by setting its shutter speed to be fast after start up (Step SA2801). When receiving an encoded signal from the lighting device A2200 (Step SA2802), then the imaging unit A2400 sends out the received encoded signal to the visible light ID decoding unit A2401.

Next, the visible light ID decoding unit A2401 decodes the encoded signal (Step SA2803), extracts the device ID, and stores the device ID into the device ID storage unit A2402.

Next, the imaging unit A2400 stores a captured preview image into the preview image storage unit A2403 (Step SA2804). Here, the preview image is an image with a width w (A2500) and a length h (A2501) displayed by the display unit as illustrated in FIG. 61, for example.

Next, the location estimation unit A2406 reads the preview image from the preview image storage unit A2403 and calculates center-of-gravity coordinates A2502 of a lighting part in the preview image (Step SA2805).

Subsequently, the location estimation unit A2406 reads a horizontal angle of view (angle_h in FIG. 57) and a vertical angle of view (angle _v in FIG. 57) of a camera from the camera parameter storage unit A2404 and reads a point of compass and a gravity direction from the geomagnetic sensor and accelerometer A2412 (Step SA2806).

Next, the location estimation unit A2406 calculates "an absolute position of the imaging unit A2400" and stores the calculated location information into the location information storage unit A2407 (Step SA2807).

Specifically, first, the location estimation unit A2406 determines a vector n which is directed north relative to a posture of a smartphone (A2600 in FIG. 62) and a vector e which is directed east relative to the posture of the smartphone (A2601 in FIG. 62) from a geomagnetic sensor in the geomagnetic sensor and accelerometer A2412.

Subsequently, the location estimation unit A2406 determines a vector g which is a gravity direction relative to the posture of the smartphone (A2602 in FIG. 62) using an accelerometer in the geomagnetic sensor and accelerometer A2412. Furthermore, the location estimation unit A2406 reads a ceiling distance d (A2203 in FIG. 57) from the ceiling distance storage unit A2413.

Subsequently, the location estimation unit A2406 reads the above vectors and calculates a vector p, that is, a relative position of the imaging unit A2400 to lighting, based on the expression indicated in FIG. 63. The meaning, etc., of Expression has been explained in the embodiment and therefore, an explanation thereof is omitted here.

Subsequently, the location estimation unit A2406 reads a device ID and absolute coordinates from the map information storage unit A2405 and determines absolute coordinates for the device ID stored in the device ID storage unit A2402, that is, an absolute position of the lighting device A2200.

Thus, the location estimation unit A2406 calculates "an absolute position of the imaging unit A2400" determined by adding the "relative position of the imaging unit A2400 to the lighting device A2200" to the "absolute position of the lighting device A2200" and stores resultant location information into the location information storage unit A2407.

Next, the user interface unit A2408 reads a map image from the map information storage unit and performs rendering, thus executing a rendering process of a map image. The map image is a map A2103 illustrated in FIG. 56, for example. Subsequently, the user interface unit A2408 calculates a rendering coordinate position of the location A2100 indicated by a present location icon on the map image, from the location information stored in the location information storage unit A2407, and renders the location A2100 indicated by the present location icon (Step SA2808).

Next, the Bluetooth A2411 receives a voice signal and posture information on the watch device from the watch device A2204 and transmits them to the target detection unit A2409; then, the target detection unit A2409 performs a voice recognition process (Step SA2809). Here, the target detection unit A2409 performs the voice recognition process in a manner that voice collected by the microphone A2414 is recognized and converted into text by the voice recognition unit A2415.

Next, the target detection unit A2409 reads a set of a commodity keyword and absolute position coordinates from the map information storage unit A2405 and associates the commodity keyword and a result of the voice recognition process. When the commodity keyword that corresponds to the text obtained by the conversion as a result of the voice recognition process is detected, the absolute coordinates associated with that commodity keyword are stored as "target coordinates" into the location information storage unit A2407 (Step SA2810).

Next, the user interface unit a2408 reads the target coordinates from the location information storage unit A2407 and performs a rendering process of the location A2101 indicated by a target icon A2101. Subsequently, the user interface unit A2408 reads aisle information from the map information storage unit and determines information on the shortest route which connects "the absolute position of the imaging unit A2400" and "the target coordinates" (Step SA2811)

Next, the user interface unit A2408 calculates, from the posture information on the watch device received from the watch device A2204 via the Bluetooth A2411, a point of compass which is to be displayed on the watch device A2204 to indicate the shortest route, and stores the point of compass into the point-of-compass storage unit A2410 (Step SA2812).

Next, the user interface unit A2408 reads point-of-compass information from the point-of-compass storage unit A2410 and sends out the point-of-compass information to the watch device A2204 (Step SA2813).

Next, the user interface unit A2408 performs a rendering process of the shortest route from "the absolute position of the imaging unit A2400" to "the target coordinates" based on the shortest-route information (Step SA2814).

Through the above processing, a user senses the imaging unit 2400, that is, a position of the user him or herself, using the visible light ID received from the lighting, and furthermore, can not only know, by the voice recognition, a route to a commodity the user is looking for, but also know, by looking at what is displayed on the mobile terminal such as the watch device, in which direction the user needs to move in this moment.

It is to be noted that although the watch device has bee described in this embodiment as an example of the mobile terminal including the communication device, this is not the only example. The mobile terminal including the communication device may be a smartphone or the like.

Furthermore, although the distance from the mobile terminal to the ceiling, stored in the ceiling distance storage unit A2413, is a fixed value in this embodiment, it may also be that the distance from the mobile terminal to the lighting is estimated from the size of the lighting in the preview image obtained from the imaging unit A2400, for example, and then is used as d' in the expression indicated in FIG. 63.

Furthermore, although the voice recognition is used to determine the target coordinates which are to be stored into the location information storage unit A2407 in this embodiment, it is not always necessary to perform the voice recognition process; for example, the target coordinates may be simply determined using a UI such as a touch panel.

Furthermore, although the mobile terminal A2202 and the watch device A2204 are separate structures in this embodiment, these may be combined as the watch device A2204.

Furthermore, it may also be possible to provide an embodiment in which the watch device A2204 is provided with an imaging unit to determine a position of the center of gravity of the lighting and the mobile terminal A2202 is notified of the determined position.

Furthermore, it may also be possible to provide an embodiment in which the watch device A2204 is provided with an LED light reception unit so that the watch device A2204 notifies the mobile terminal A2202 that a position of the center of gravity of the lighting has been detected at the center of the preview image.

Embodiment 7

The following describes Embodiment 7.
(Observation of Luminance of Light Emitting Unit)

Figure 64:
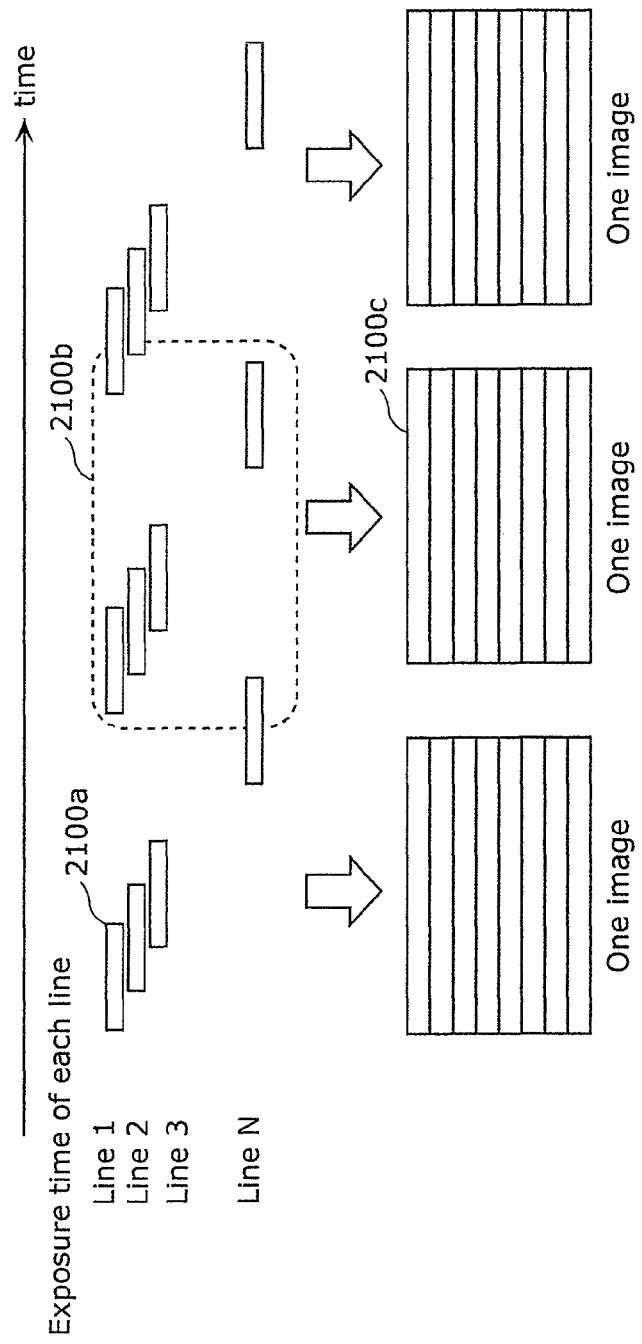
FIG. 64 illustrates an example of a situation where imaging elements arranged in a line are exposed simultaneously with an exposure start time being shifted in order of lines according to Embodiment 7.

An imaging method is proposed in which, when one image is to be captured, the exposure starts and ends at different points in time for each imaging element instead of exposure of all the imaging elements at the same timing. FIG. 64 illustrates an example where the imaging elements in one line are exposed at the same time, and the exposure start time is shifted in the order from the closest line in an imaging operation. Here, the imaging elements exposed at the same time are referred to as an exposure line, and a line of pixels on an image which corresponds to these imaging elements is referred to as a bright line.

Figure 65:
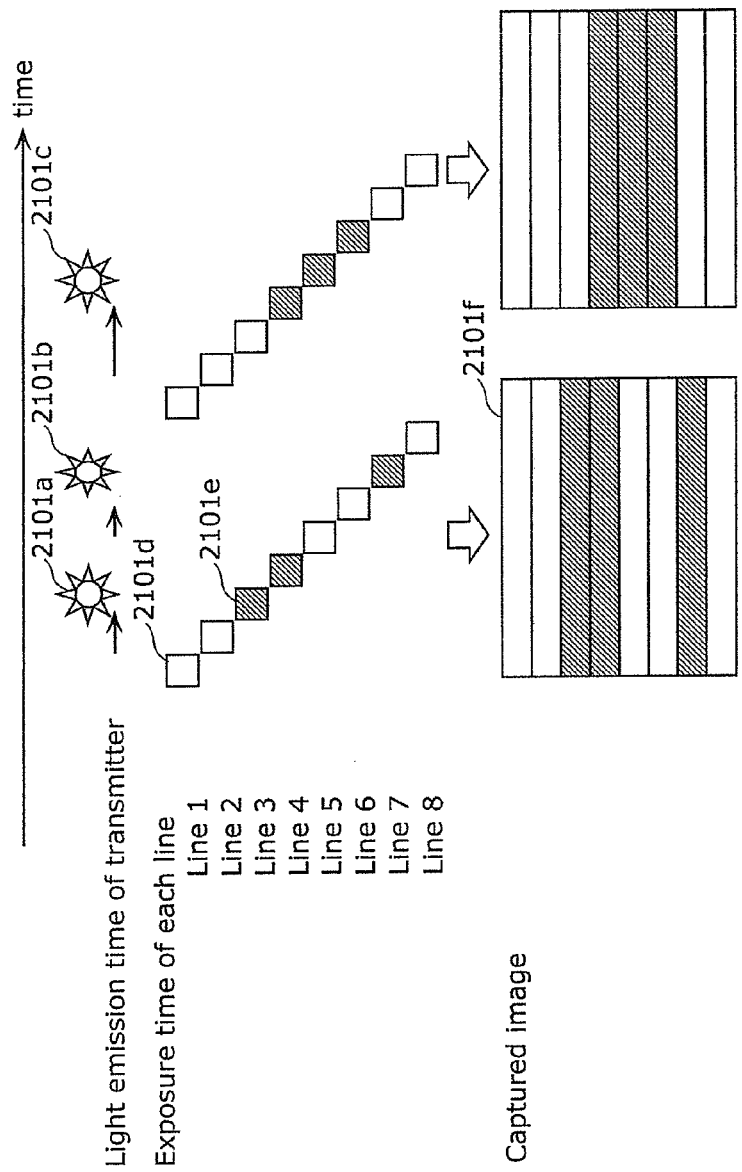
FIG. 65 illustrates a situation where, after exposure of one exposure line ends, exposure of a next exposure line starts according to Embodiment 7.

When an image is captured with the imaging elements the entire surfaces of which are illuminated with light from a flickering light source, a bright line (a line of brightness or darkness of pixel values) appears along an exposure line on the captured image as illustrated in FIG. 65. By recognizing this bright line pattern, it is possible to estimate a change in light source luminance at a speed which exceeds the imaging frame rate. This allows communication at a speed higher than or equal to the imaging frame rate by transmitting a signal as the change in light source luminance. In the case where the light source represents the signal with two kinds of luminance values, the lower one of the luminance values is referred to as LOW (LO), and the higher one of the luminance vales is referred to as HIGH (HI). It may be that LOW is a state in which the light source emits no light or in which the light source emits light weaker than in HIGH.

By this method, information transmission is performed at the speed higher than the imaging frame rate.

In the case where the number of exposure lines whose exposure times do not overlap each other is 20 in one captured image and the imaging frame rate is 30 fps, it is possible to recognize a luminance change in a period of 1 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 65 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and l is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 66:
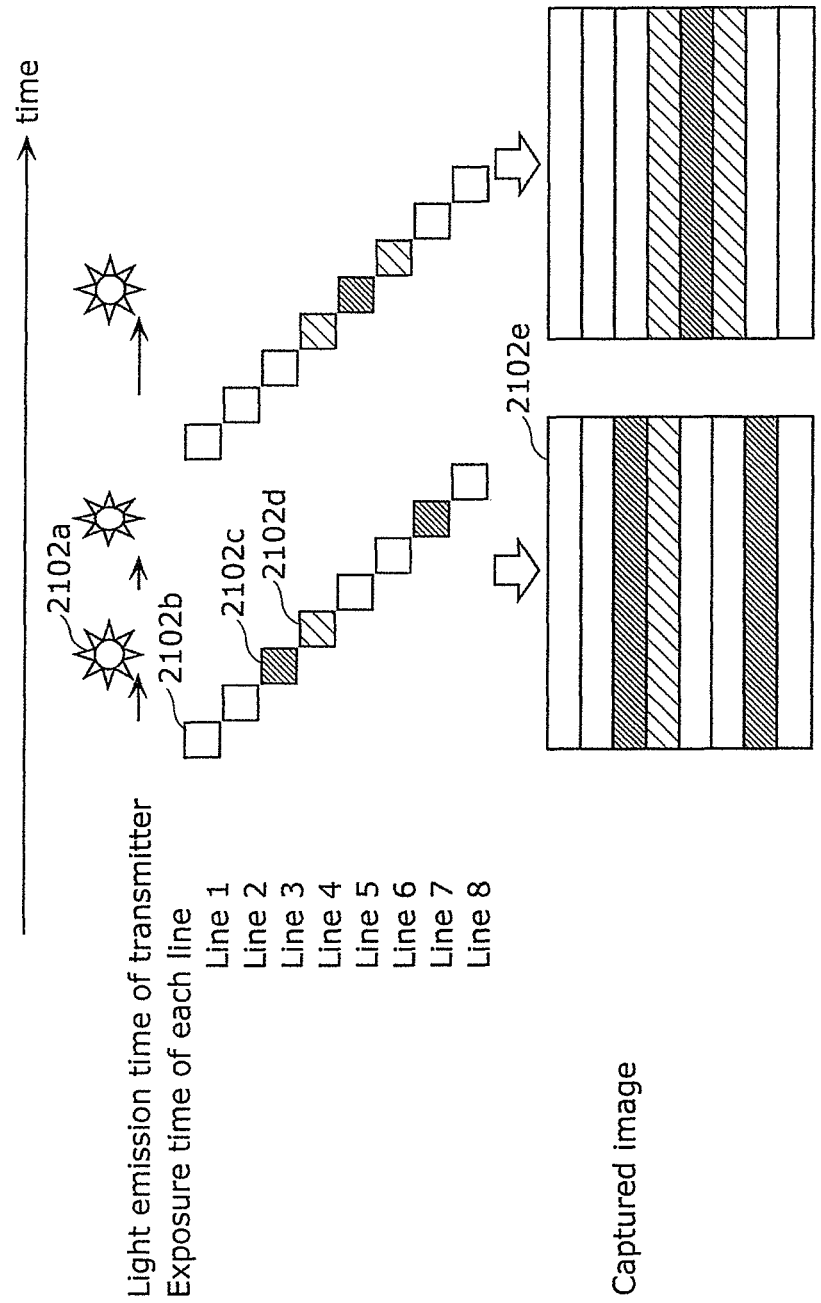
FIG. 66 illustrates a situation where, after exposure of one exposure line ends, exposure of a next exposure line starts according to Embodiment 7.

If the exposure state of each exposure line caused by the light emission of the light emitting unit is recognizable in a plurality of levels as illustrated in FIG. 66, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 67:
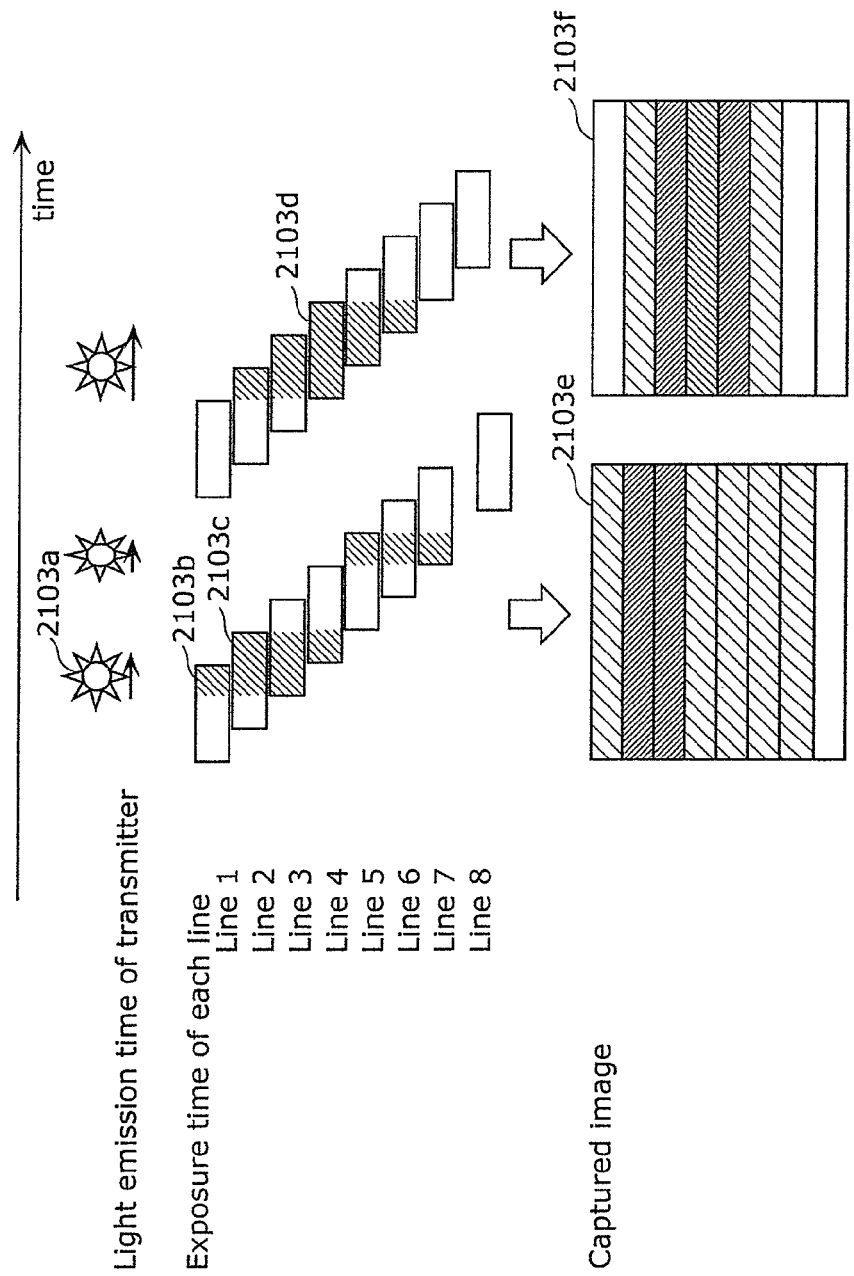
FIG. 67 illustrates a situation where, before exposure of one exposure line ends, exposure of a next exposure line starts according to Embodiment 7.

FIG. 67 illustrates a situation where, before the exposure of one exposure line ends, the exposure of the next exposure line starts. Specifically, this configuration is that the exposure times of adjacent exposure lines temporally partially overlap each other. With such a configuration, (1) the number of samples within a predetermined length of time can be set larger as compared to the case where it is not until the end of the exposure time of one exposure line that the exposure of the next exposure line starts. The increased number of samples within the predetermined length of time makes it possible to more appropriately detect a light signal generated by a light transmitter that is a subject. This means that the error rate in detection of the light signal can be reduced. Furthermore, (2) the exposure time of each exposure line can be set longer as compared to the case where it is not until the end of the exposure time of one exposure line that the exposure of the next exposure line starts, with the result that even in the case where the subject is dark, a brighter image can be obtained. In other words, the S/N ratio can be improved. Here, the structure in which the exposure times of adjacent exposure lines partially overlap each other does not need to be applied to all exposure lines, and part of the exposure lines may not have the structure of partially overlapping in exposure time. With the configuration in which the exposure times of part of the adjacent pairs of the exposure lines do not temporally partially overlap each other, the generation of an intermediate color due to the overlapped exposure times on the imaging screen can be reduced so that a bright line can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 68:
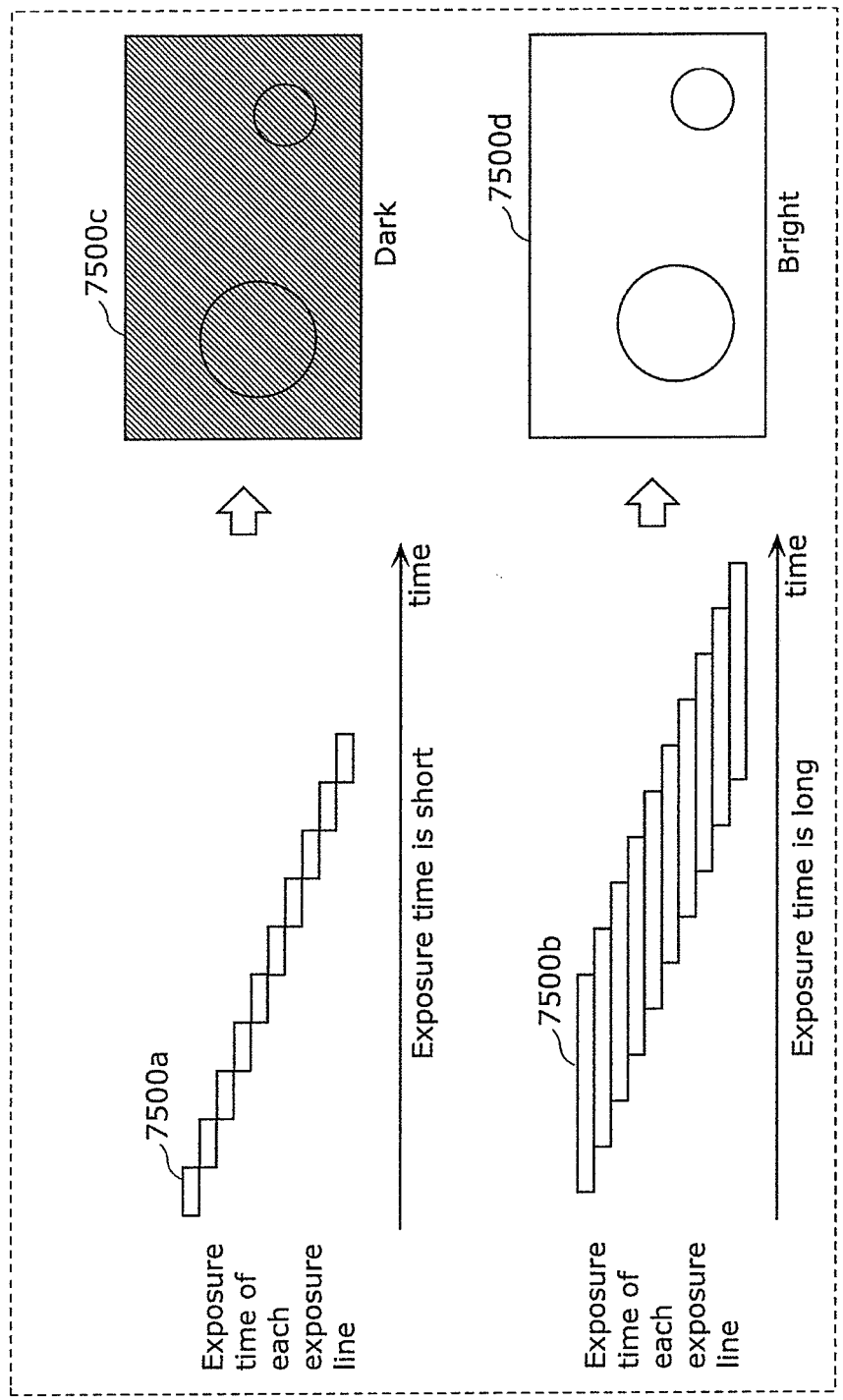
FIG. 68 illustrates the influence of a difference in exposure time in the case where an exposure start time of each exposure line is the same, according to Embodiment 7.

FIG. 68 illustrates the influence of the difference in exposure time in the case where the exposure start time of each exposure line is the same. In 7500a, the exposure end time of one exposure line and the exposure start time of the next exposure line are the same. In 7500b, the exposure time is longer than that in 7500a. The structure in which the exposure times of adjacent exposure lines partially overlap each other as in 7500b allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 69:
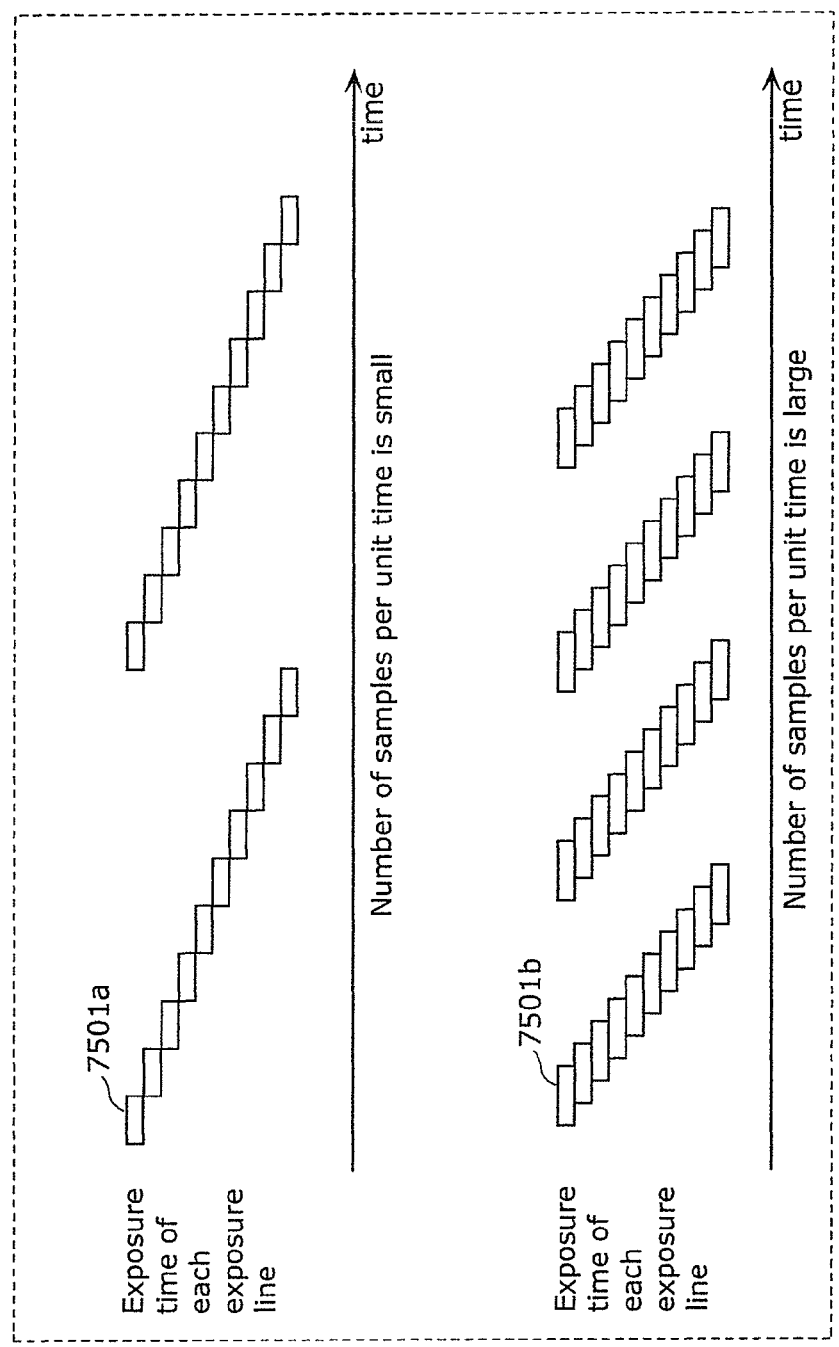
FIG. 69 illustrates the influence of a difference in exposure start time of each exposure line in the case where each exposure time is the same, according to Embodiment 7.

FIG. 69 illustrates the influence of the difference in exposure start time of each exposure line in the case where the exposure time is the same. In 7501a, the exposure end time of one exposure line and the exposure start time of the next exposure line are the same. In 7501b, the exposure of one exposure line ends after the exposure of the next exposure line starts. The structure in which the exposure times of adjacent exposure lines partially overlap each other as in 7501b allows more lines to be exposed per unit time. This increases the resolution, so that more information can be obtained. Since the sample interval (i.e. the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIG. 68 and FIG. 69, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time) <1/8×f, where f is the frame frequency. Blanking during imaging is half of one frame at the maximum. That is, the blanking time is less than or equal to half of the imaging time. The actual imaging time is therefore 1/2f at the shortest. Besides, since 4-value information needs to be received within the time of 1/2f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 70:
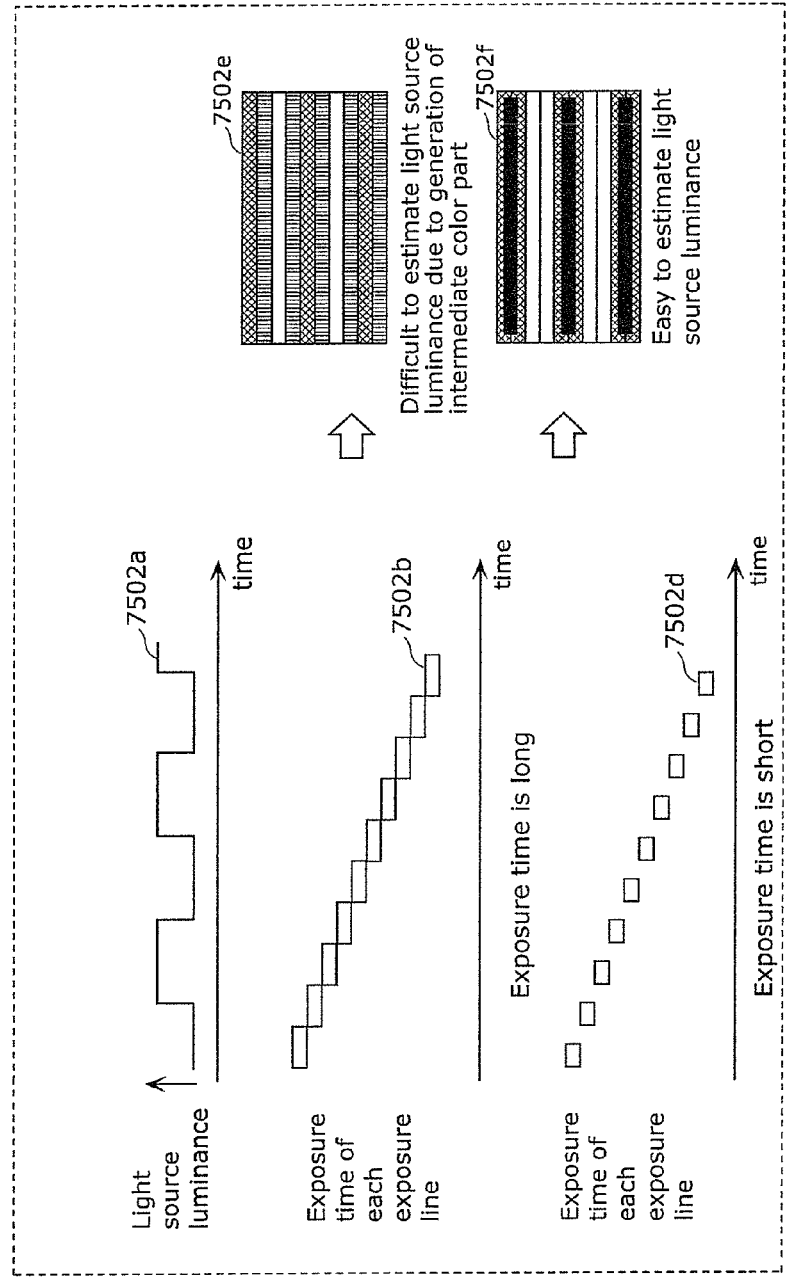
FIG. 70 illustrates the advantage of using a short exposure time in the case where each exposure line does not overlap in an exposure time, according to Embodiment 7.

FIG. 70 illustrates the advantage of using a short exposure time in the case where each exposure line does not overlap in exposure time. In the case where the exposure time is long, even when the light source changes in luminance in a binary fashion as in 7502a, an intermediate-color part tends to appear in the captured image as in 7502e, making it difficult to recognize the luminance change of the light source. By providing a predetermined non-exposure vacant time (predetermined wait time) $t_{D2}$ from when the exposure of one exposure line ends to when the exposure of the next exposure line starts as in 7502d, however, the luminance change of the light source can be recognized more easily. That is, a more appropriate bright line pattern can be detected as in 7502f. The provision of the predetermined non-exposure vacant time is possible by setting a shorter exposure time $t_E$ than the time difference $t_D$ between the exposure start times of the exposure lines, as in 7502d. In the case where the exposure times of adjacent exposure lines partially overlap each other in the normal imaging mode, the exposure time is shortened from the normal imaging mode so as to provide the predetermined non-exposure vacant time. In the case where the exposure end time of one exposure line and the exposure start time of the next exposure line are the same in the normal imaging mode, too, the exposure time is shortened so as to provide the predetermined non-exposure time. Alternatively, the predetermined non-exposure vacant time (predetermined wait time) $t_{D2}$ from when the exposure of one exposure line ends to when the exposure of the next exposure line starts may be provided by increasing the interval $t_D$ between the exposure start times of the exposure lines, as in 7502g. This structure allows a longer exposure time to be used, so that a brighter image can be captured. Moreover, a reduction in noise contributes to higher error tolerance. Meanwhile, this structure is disadvantageous in that the number of samples is small as in 7502h, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure vacant time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures.

Figure 71:
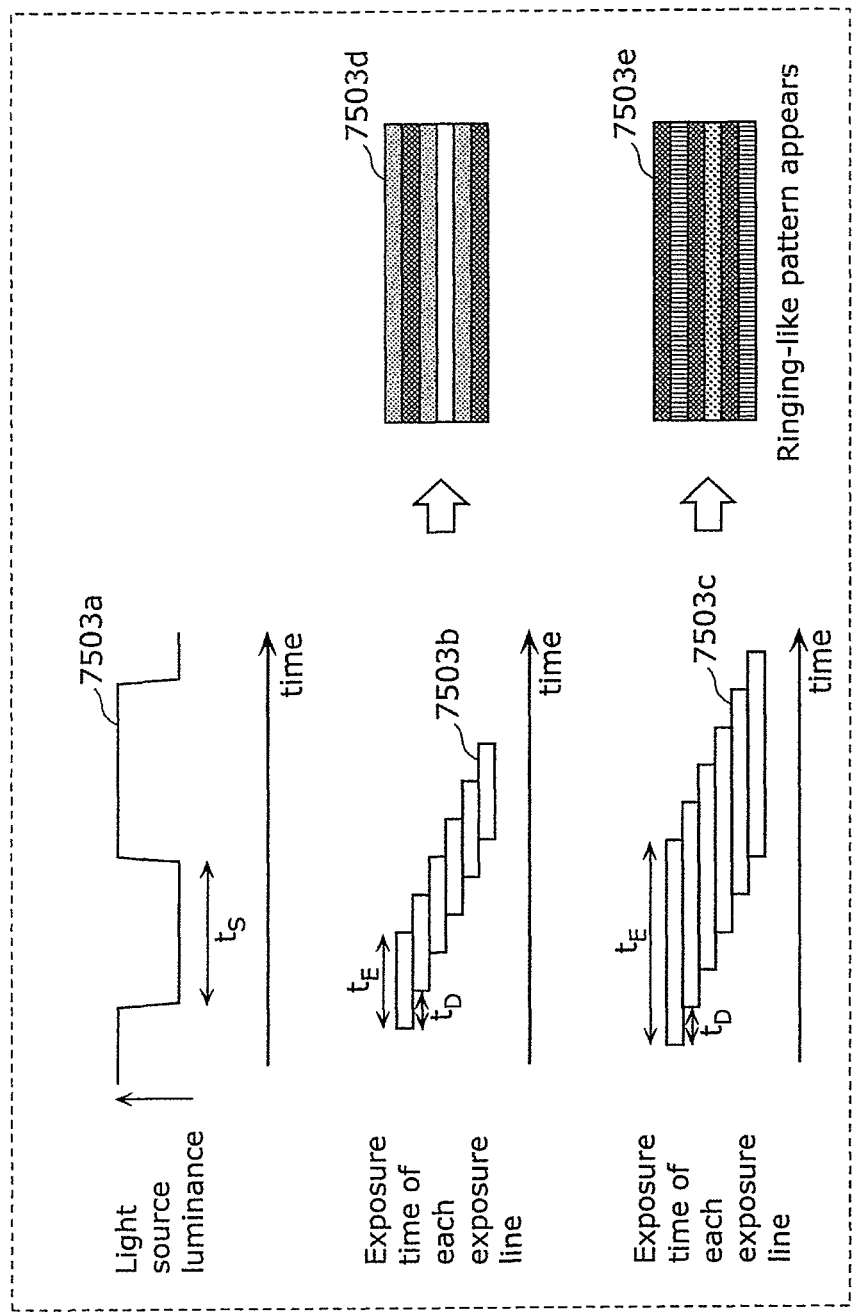
FIG. 71 illustrates the relation between a minimum change time of light source luminance, an exposure time, a time difference between exposure start times of the exposure lines, and a captured image, according to Embodiment 7.

FIG. 71 illustrates the relation between the minimum change time $t_S$ of light source luminance, the exposure time $t_E$, the time difference $t_D$ between the exposure start times of the exposure lines, and the captured image.< In the case where $t_E + t_D < t_S$, imaging is always performed in a state where the light source does not change from the start to end of the exposure of at least one exposure line. As a result, an image with clear luminance is obtained as in 7503d, from which the luminance change of the light source is easily recognizable. In the case where $2t_E > t_S$, a bright line pattern different from the luminance change of the light source might be obtained, making it difficult to recognize the luminance change of the light source from the captured image.

Figure 72:
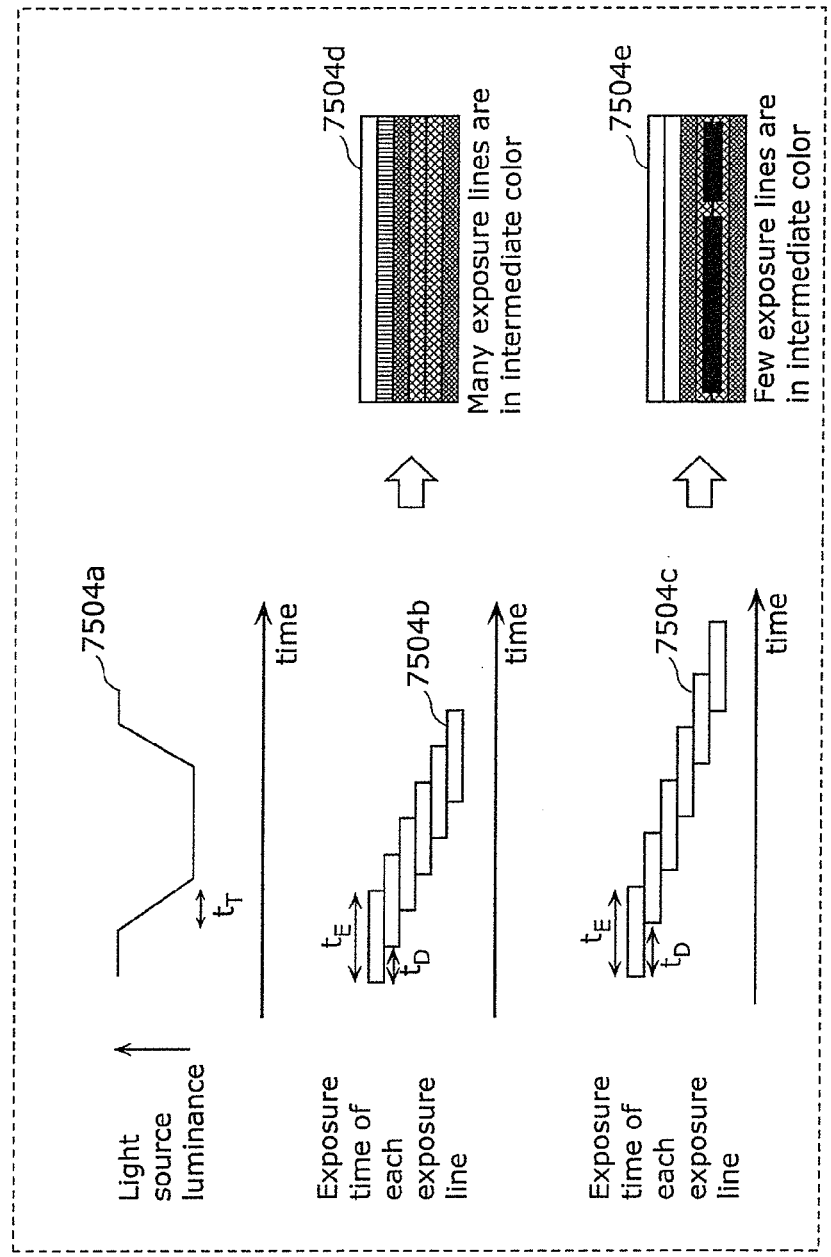
FIG. 72 illustrates the relation between a transition time of light source luminance and a time difference between exposure start times of the exposure lines, according to Embodiment 7.

FIG. 72 illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D > t_T$, because the number of exposure lines in the intermediate color is two or less consecutively. Since $t_T$ is less than or equal to 1 microsecond in the case where the light source is an LED and about 5 microseconds in the case where the light source is an organic EL device, setting $t_D$ to greater than or equal to 5 microseconds facilitates estimation of light source luminance.

Figure 73:
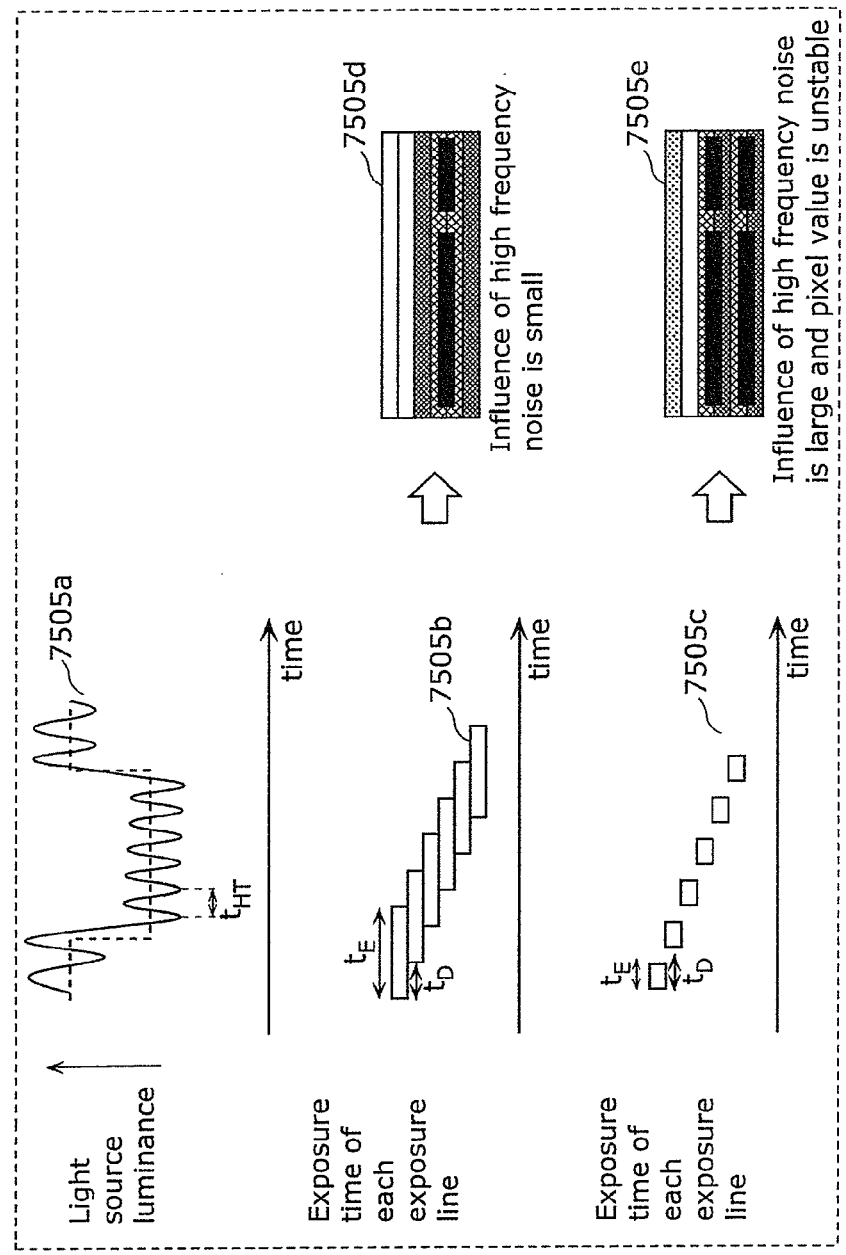
FIG. 73 illustrates the relation between a high frequency noise of light source luminance and an exposure time, according to Embodiment 7.

FIG. 73 illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E > t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 74:
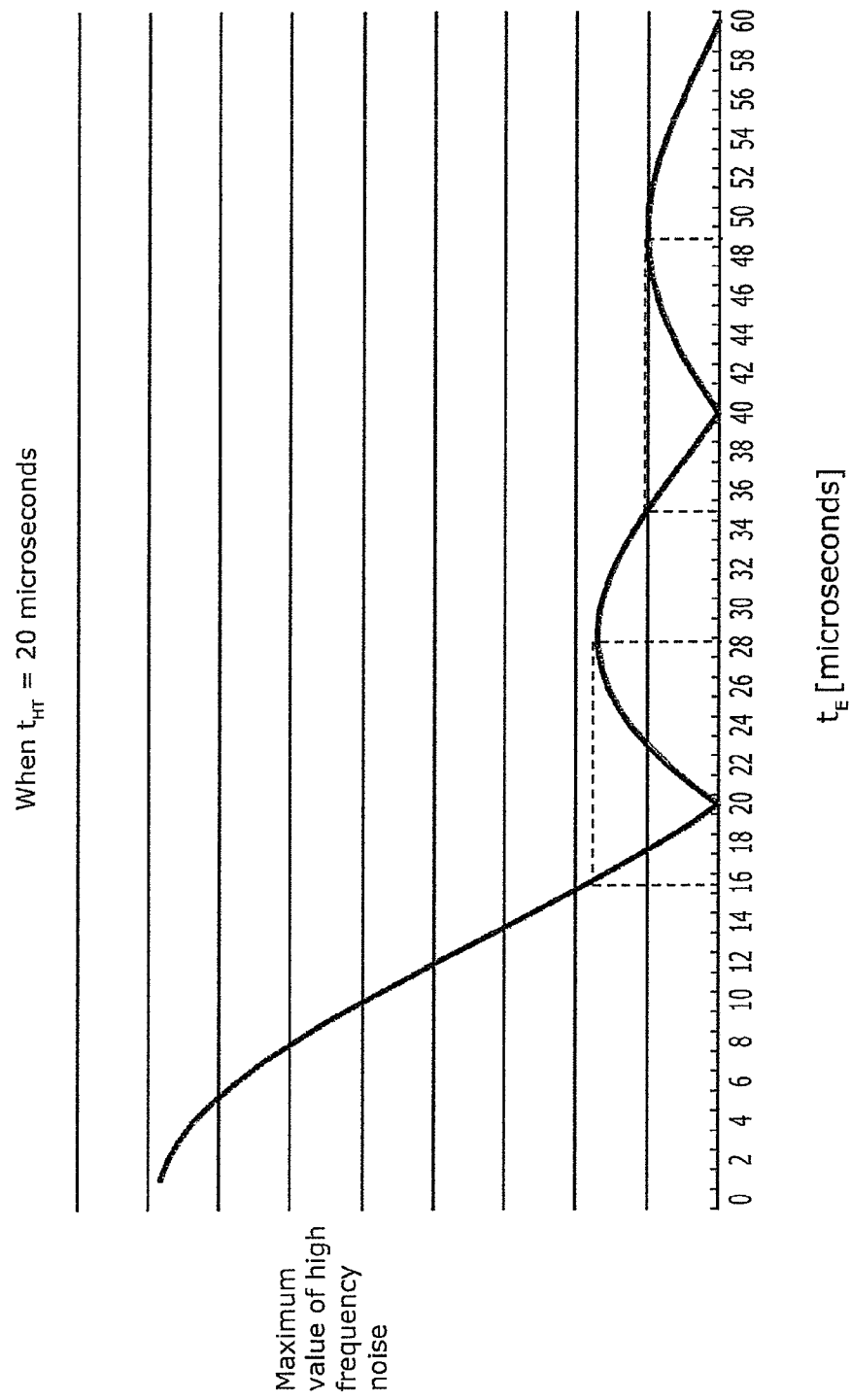
FIG. 74 is a graph representing the relation between an exposure time and a magnitude of high frequency noise when the high frequency noise of the light source luminance is 20 microseconds, according to Embodiment 7.

FIG. 74 is a graph representing the relation between the exposure time $t_E$ and the magnitude of high frequency noise when $t_{HT}$ of light source luminance is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 75:
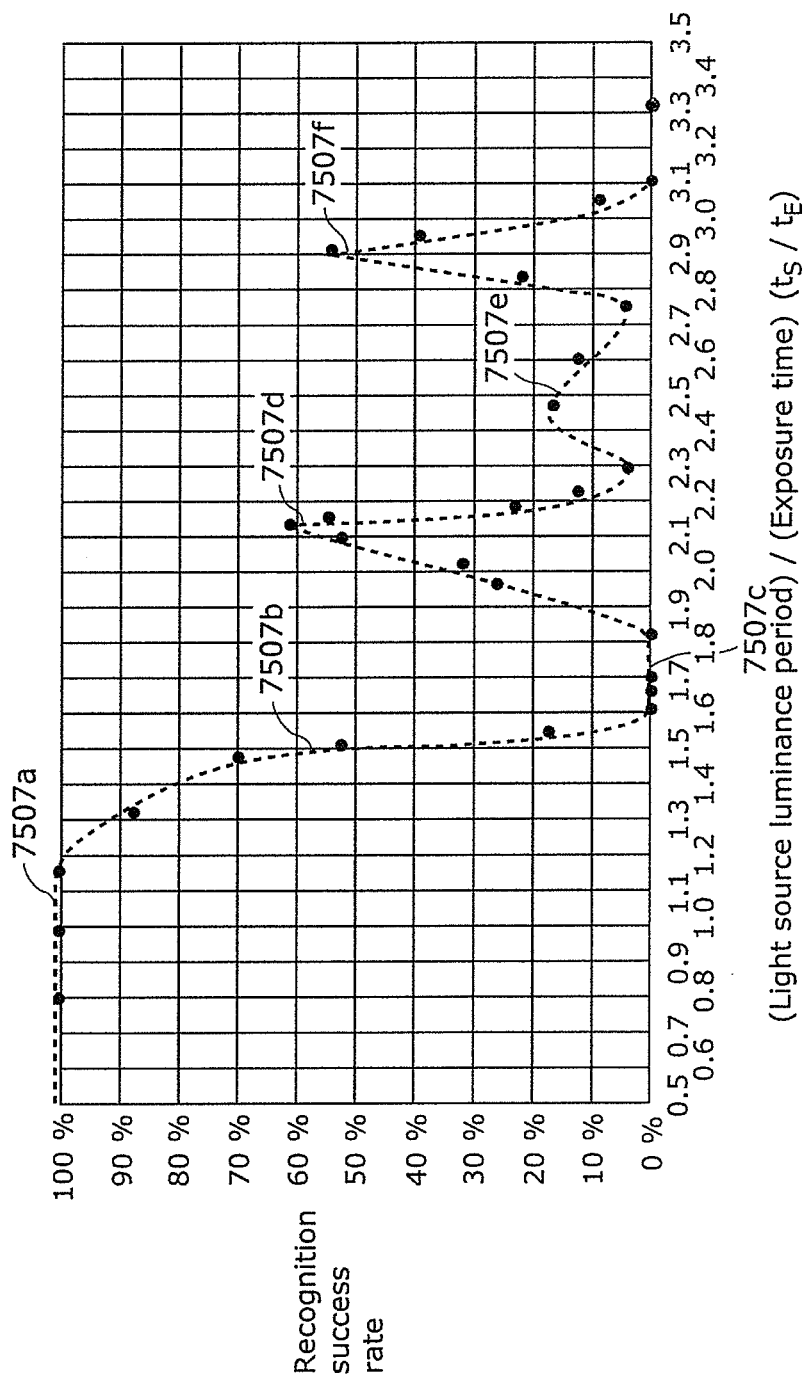
FIG. 75 illustrates a relation between an exposure time $t_E$ and a recognition success rate according to Embodiment 7.
Figure 76:
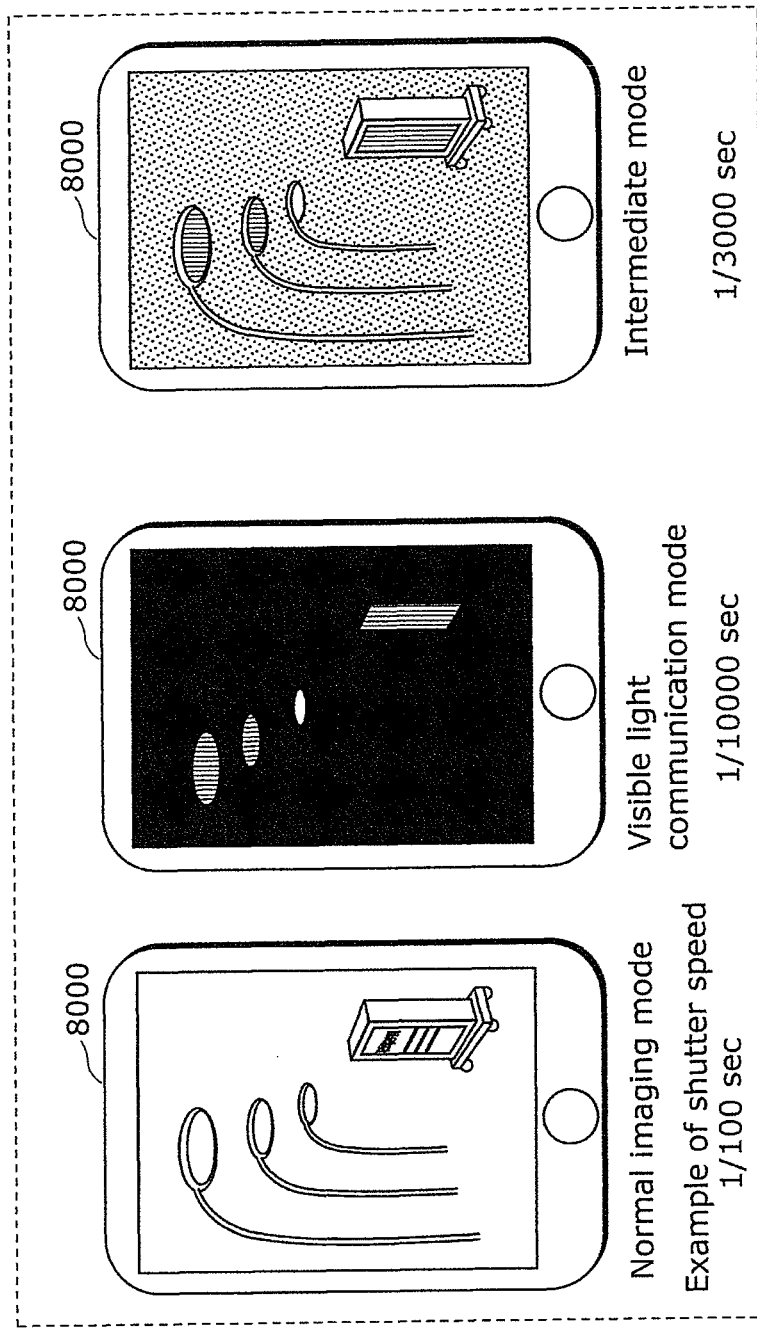
FIG. 76 illustrates an example of each mode of a receiving device according to Embodiment 7.

FIG. 75 illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $i_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507c, it increases again at 7507d, 7507e, and 7507f. >Accordingly, for example to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 76.

Figure 77:
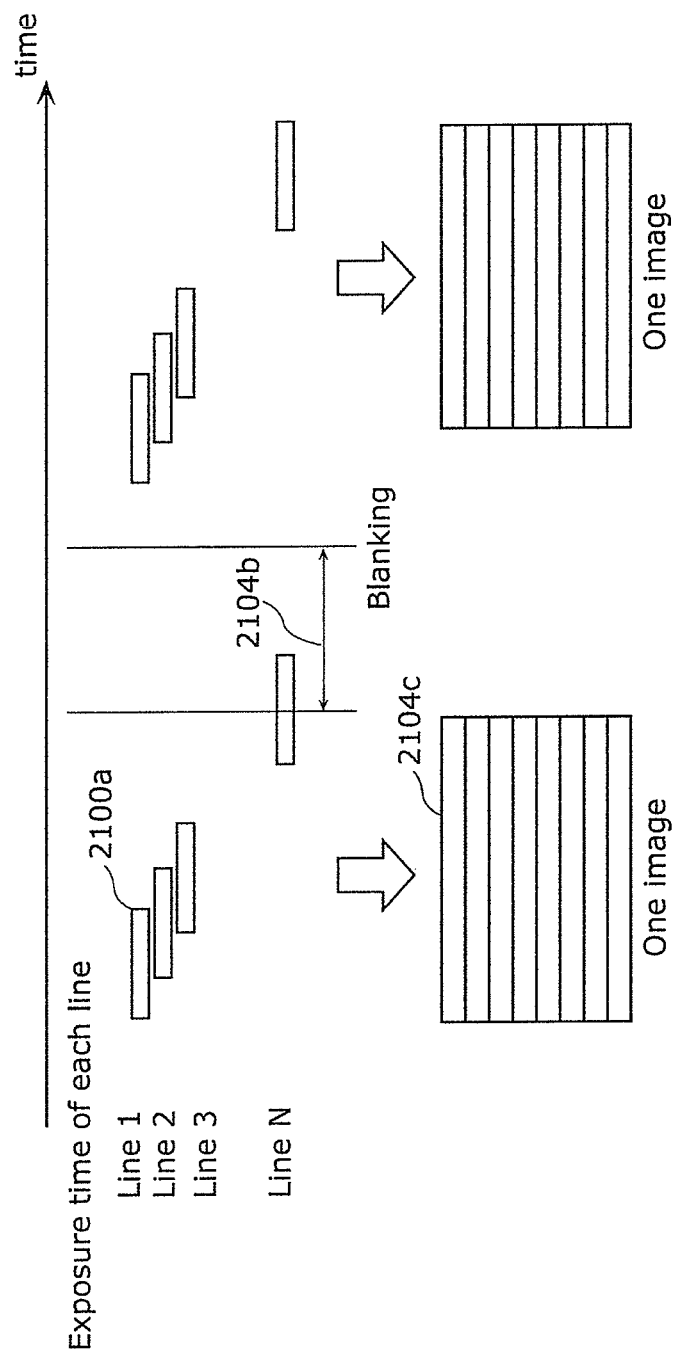
FIG. 77 illustrates an example of a method for observing luminance by a light emitting unit according to Embodiment 7.

Depending on imaging devices, there is a time (blanking) during which no exposure is performed, as illustrated in FIG. 77.

In the case where there is blanking, the luminance of the light emitting unit during the time cannot be observed.

A transmission loss caused by blanking can be prevented by the light emitting unit repeatedly transmitting the same signal two or more times or adding error correcting code.

To prevent the same signal from being transmitted during blanking every time, the light emitting unit transmits the signal in a period that is relatively prime to the period of image capture or a period that is shorter than the period of image capture.

Embodiment 8

Figure 78:
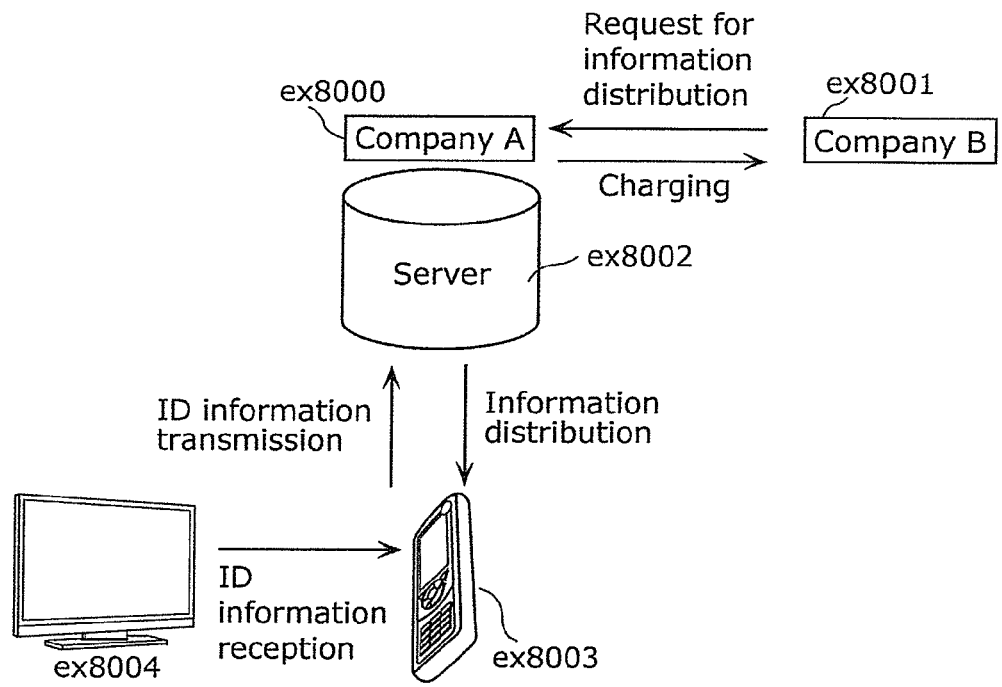
FIG. 78 illustrates a service provision system according to Embodiment 8.

FIG. 78 illustrates a service provision system using the reception method described in any of the foregoing embodiments.

First, a company A ex8000 managing a server ex8002 is requested to distribute information to a mobile terminal, by another company B or individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

Figure 79:
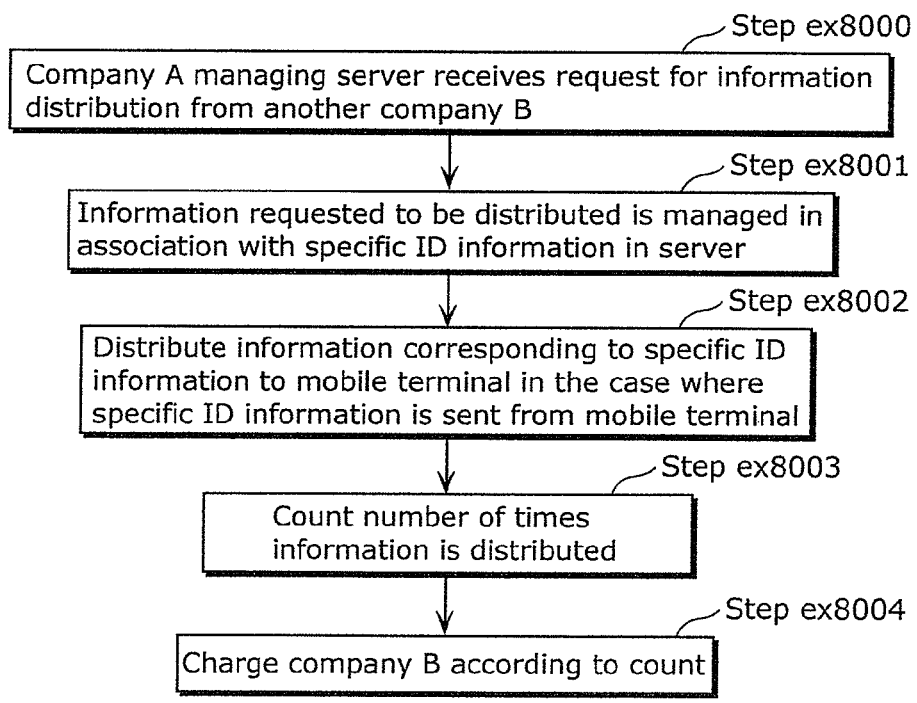
FIG. 79 is a flowchart of service provision according to Embodiment 8.

FIG. 79 illustrates service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

Figure 80:
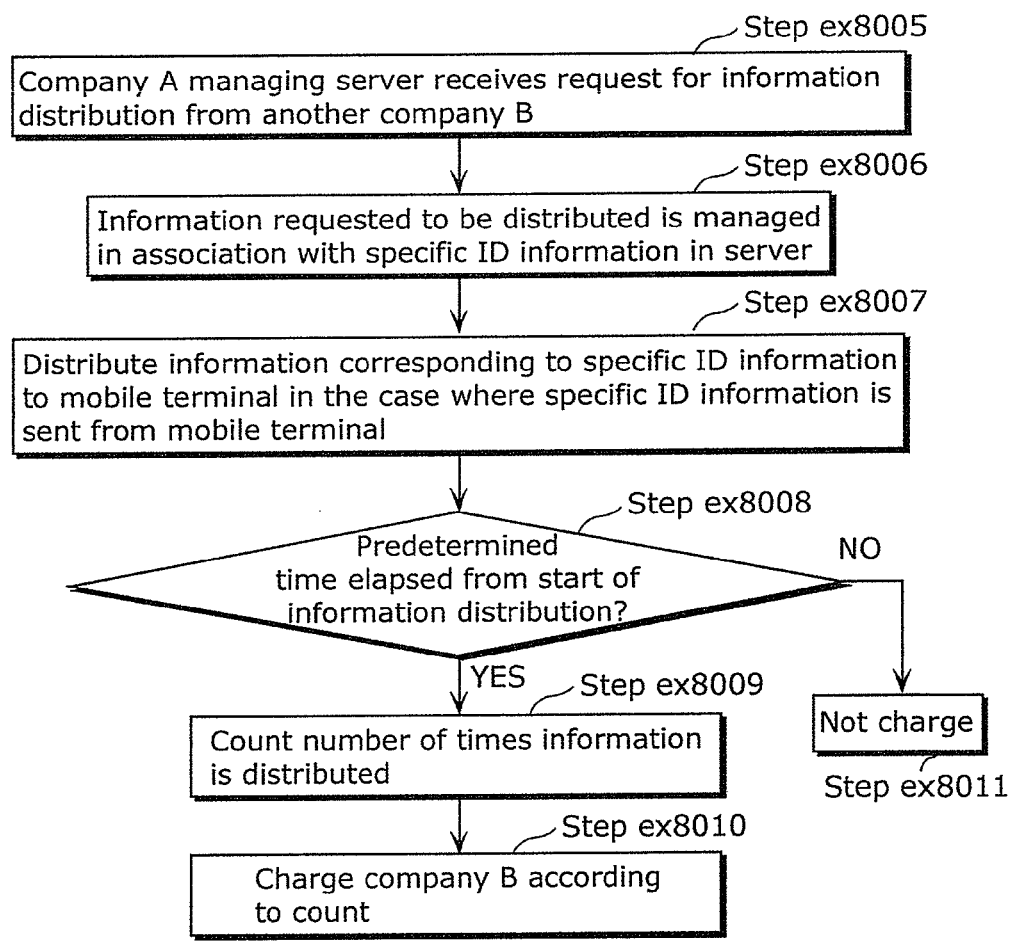
FIG. 80 is a flowchart of service provision according to a variation of Embodiment 8.

FIG. 80 illustrates service provision flow in another example. The description of the same steps as those in FIG. 79 is omitted here.

In Step ex8008, whether or not a predetermined time has elapsed from the start of the information distribution is determined.

In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

Figure 81:
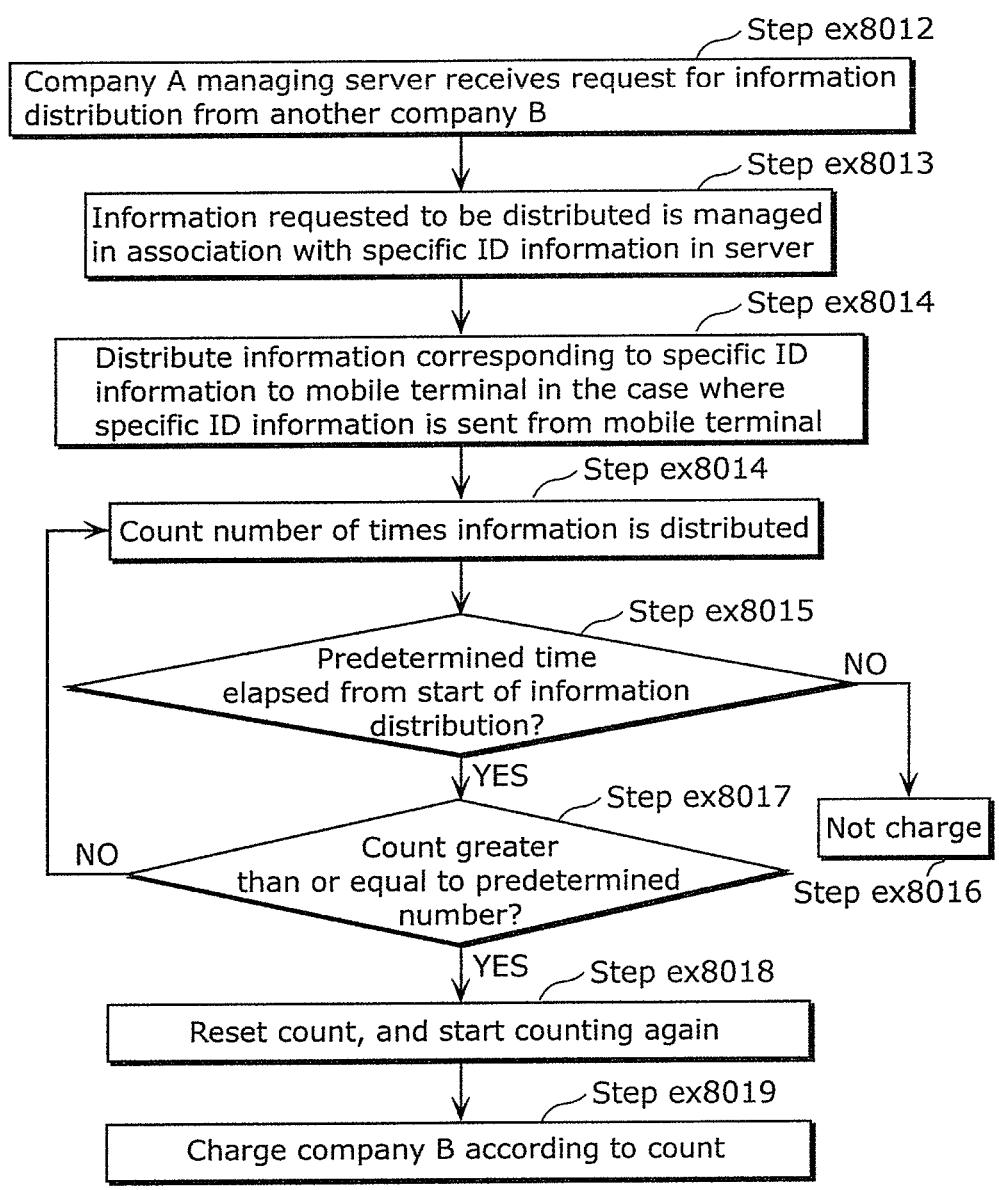
FIG. 81 is a flowchart of service provision according to another variation of Embodiment 8.

FIG. 81 illustrates service provision flow in another example. The description of the same steps as those in FIG. 80 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the information distribution count is charged to the company B. Thus, in the case where the count during the free distribution time is small, the free distribution time is provided again. This enables the company B to receive the accounting service at an appropriate time. Moreover, in the case where the count is small, the company A can analyze the information and, for example when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

INDUSTRIAL APPLICABILITY

The communication method or the like in the present disclosure enables safe and active acquisition of information other than images and is, therefore, usable in various applications such as the transfer of image-attached information and information transmission in various scenes in a sense that such active properties allow necessary information to be safely obtained as much as needed from signage, information terminals, and information display devices outside, let alone devices such as televisions, personal computers, and tablets in homes.

The invention claimed is:

1. A communication method for obtaining information from a subject, comprising:
   obtaining image information of the subject in an image information-taking mode;
   obtaining visible light data of the subject in a visible light communication mode, the visible light communication mode being a different mode from the image information-taking mode; and
   setting a shutter speed and an international organization for standardization (ISO) speed rating or a gain value for the visible light communication mode,
   wherein in the setting, the shutter speed for the visible light communication mode is set to be faster than a shutter speed for the image information-taking mode, and the ISO speed rating or the gain value for the visible light communication mode is set to be greater than an ISO speed rating or a gain value for the image information-taking mode.

2. The communication method according to claim 1, further comprising:
   selecting the image information-taking mode,
   wherein, when the image-taking mode is selected, the obtaining of the image information of the subject is performed.

3. The communication method according to claim 1, wherein the image information-taking mode and the visible light communication mode are switchable with one another, and
   when the image-taking mode is selected, the obtaining of the image information of the subject is performed, and
   when the visible light communication mode is selected, the obtaining of the visible light data of the subject is performed.

4. A communication apparatus for obtaining information from a subject, comprising:
   a processor; and
   a memory storing a computer program, wherein the computer program, when executed by the processor, causes the processor to perform operations comprising:
   obtaining image information of the subject in an image information-taking mode;
   obtaining visible light data of the subject in a visible light communication mode, the visible light communication mode being a different mode from the image information-taking mode; and
   setting a shutter speed and an international organization for standardization (ISO) speed rating or a gain value for the visible light communication mode,
   wherein in the setting, the shutter speed for the visible light communication mode is set to be faster than a shutter speed for the image information-taking mode, and the ISO speed rating or the gain value for the visible light communication mode is set to be greater than an ISO speed rating or a gain value for the image information-taking mode.

5. A non-transitory computer-readable recording medium that stores a computer program, when executed by a processor, causes a computer to execute a communication method for obtaining information from a subject, the communication method including:
   obtaining image information of the subject in an image information-taking mode;
   obtaining visible light data of the subject in a visible light communication mode, the visible light communication mode being a different mode from the image information-taking mode; and
   setting a shutter speed and an international organization for standardization (ISO) speed rating or a gain value for the visible light communication mode,
   wherein in the setting, the shutter speed for the visible light communication mode is set to be faster than a shutter speed for the image information-taking mode, and the ISO speed rating or the gain value for the visible light communication mode is set to be greater than an ISO speed rating or a gain value for the image information-taking mode.

6. The communication method according to claim 1, further comprising:
   selecting the visible light communication mode,
   wherein when the visible light communication mode is selected, the obtaining of the visible light data of the subject is performed.

* * * * *